(12) United States Patent
Koreeda et al.

(10) Patent No.: US 7,839,752 B2
(45) Date of Patent: Nov. 23, 2010

(54) OPTICAL DISC DRIVE AND OBJECTIVE LENS FOR THE SAME

(75) Inventors: Daisuke Koreeda, Saitama (JP); Koichi Maruyama, Tokyo (JP); Shuichi Takeuchi, Saitama (JP); Yoshiyuki Tashiro, Tokyo (JP)

(73) Assignee: Hoya Corporation, Tokyo (JP)

( * ) Notice: Subject to any disclaimer, the term of this patent is extended or adjusted under 35 U.S.C. 154(b) by 985 days.

(21) Appl. No.: 11/536,004

(22) Filed: Sep. 28, 2006

(65) Prior Publication Data

US 2007/0070860 A1    Mar. 29, 2007

(30) Foreign Application Priority Data

Sep. 28, 2005    (JP) .......................... P2005-282361

(51) Int. Cl.
    *G11B 7/135*    (2006.01)
(52) U.S. Cl. .............................. 369/112.08; 369/112.01
(58) Field of Classification Search ............. 369/112.08
    See application file for complete search history.

(56) References Cited

U.S. PATENT DOCUMENTS

| | | | |
|---|---|---|---|
| 2004/0047269 A1 | 3/2004 | Ikenaka et al. | |
| 2005/0270958 A1* | 12/2005 | Ikenaka | 369/112.23 |
| 2005/0281172 A1* | 12/2005 | Wachi | 369/112.23 |
| 2006/0114796 A1 | 6/2006 | Maruyama et al. | |

FOREIGN PATENT DOCUMENTS

| | | |
|---|---|---|
| JP | 8-240718 | 9/1996 |
| JP | 2004-247025 | 9/2004 |

OTHER PUBLICATIONS

English Language Abstract of JP 2004-247025.
U.S. Appl. No. 11/456,943 to Koreeda et al., filed Jul. 12, 2006.
U.S. Appl. No. 11/419,810 to Koreeda et al., filed Mar. 23, 2006.
English Language Abstract of JP 8-240718.

* cited by examiner

*Primary Examiner*—Joseph H Feild
*Assistant Examiner*—Nicholas Lee
(74) *Attorney, Agent, or Firm*—Greenblum & Bernstein P.L.C.

(57) ABSTRACT

There is provided an optical disc drive for recordation/reproduction for three types of optical discs by selectively using one of three types of light beams. The optical disc drive comprises an objective lens. The objective lens has a step structure which gives an optical path length difference to an incident beam at each step. When the third laser beam passes through the objective lens, the objective lens produces normal diffraction order light converging to a recording surface of the third optical disc and undesired diffraction order light converging to a point deviating from the recording surface of the third optical disc. A distance from a point to which the normal diffraction order light converges to a point to which the undesired diffraction order light converges is larger than or equal to twice a pull-in range of a focus error signal obtained when the third optical disc is used.

42 Claims, 13 Drawing Sheets

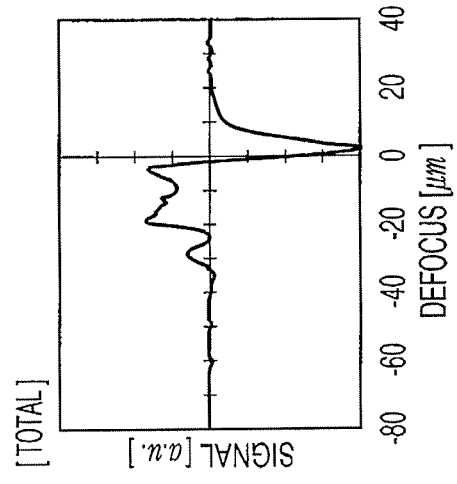
FIG.4A [NORMAL DIFFRACTION ORDER LIGHT]
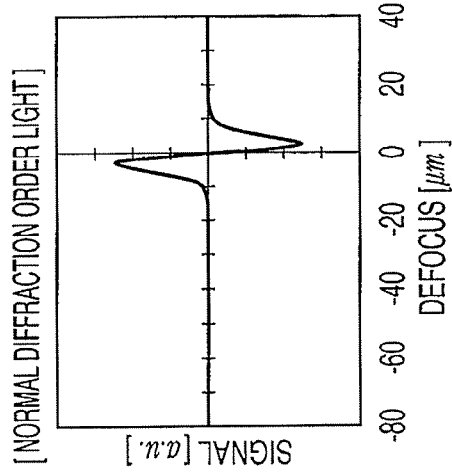
FIG.4B [UNDESIRED DIFFRACTION ORDER LIGHT]
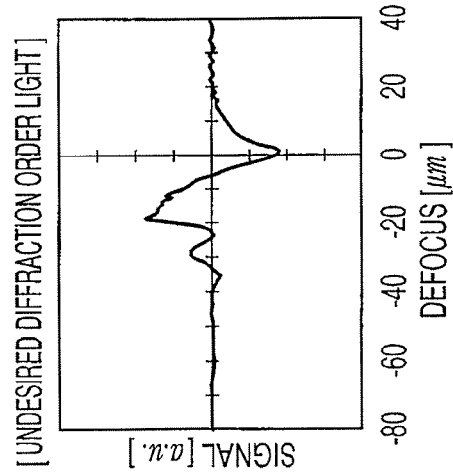
FIG.4C [TOTAL]

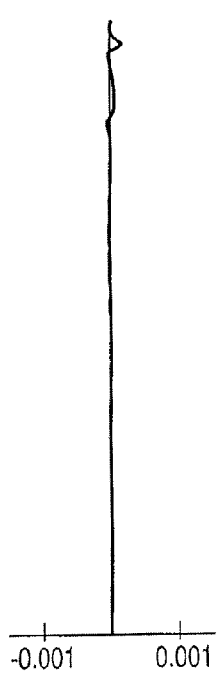 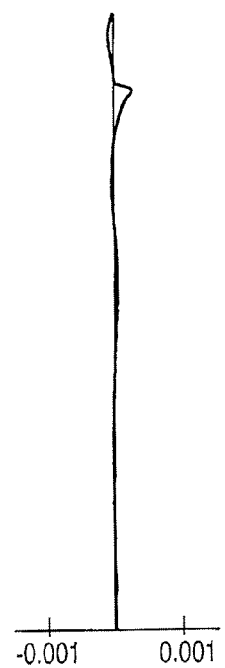 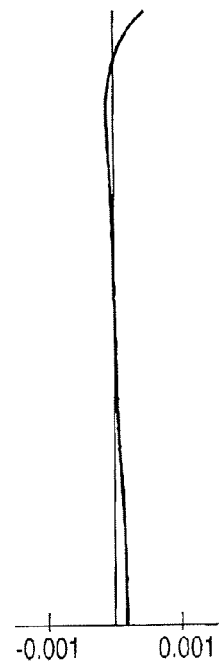
FIG.13A    FIG.13B    FIG.13C
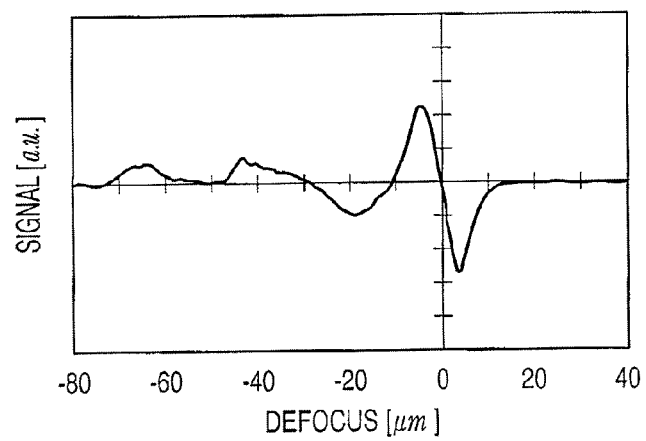
FIG.14

OPTICAL DISC DRIVE AND OBJECTIVE LENS FOR THE SAME

BACKGROUND OF THE INVENTION

The present invention relates to an optical disc drive for recording information to reproducing information from a plurality of types of optical discs having different recording densities.

There are various types of technical standards for optical discs, such as a CD and a DVD, having different recording densities. In Japanese Patent Provisional Publication No. HEI 8-240718A, an optical disc drive supporting a recording operation and/or a reproduction operation for two types of optical discs is disclosed. The optical disc drive disclosed in HEI 8-240718A is configured to keep focal points of diffracted light beams separated along an optical axis so that the effect of diffracted light beams not contributing to the recording and reproducing operations can be sufficiently reduced.

Recently, a new technical standard optical disc, such as an HD DVD or a BD (Blue-ray Disc), having a recording density higher than that of the DVD is becoming commercially practical. Such a new technical standard optical disc has a cover layer thickness smaller than or equal to that of the DVD. Considering a usability for a user of these types of optical discs (i.e., three types of optical discs), an optical disc drive (i.e., an optical system for the optical disc drive) capable of supporting all of the three types of optical discs (i.e., to have compatibility with the three types of optical discs) is desirable.

The term "optical disc drive" as used herein includes an optical disc drive designed specifically for recording information to an optical disc, an optical disc drive specifically designed for reproducing information from an optical disc, and an optical disc drive having both of functions of recording information to and reproducing information from an optical disc. The expression "an optical disc drive has compatibility with the three types of optical discs" as used herein means that a recording operation and/or a reproducing operation are guaranteed for all of the three types of optical discs, without the need for replacement of parts in the optical disc drive.

In order to support a plurality of types of optical discs of different technical standards, it is required to change a numerical aperture (NA) of light used for recordation or reproduction of information while compensating for spherical aberration which varies depending on a thickness of a cover layer of an optical disc being used so that a beam spot having a diameter suitable for a recording density of an optical disc being used can be achieved. A beam spot diameter decreases as a wavelength of a laser beam decreases. Therefore, an optical disc drive generally uses a plurality of types of laser beams having different wavelengths.

For example, a laser beam having a wavelength of approximately 790 nm is used for the CD, and a laser beam having a wavelength of approximately 660 nm which is shorter than that for the CD is used for the DVD. A laser beam having a shorter wavelength (e.g., approximately 408 nm which is so-called blue laser) than that for the DVD is used for the new technical standard optical disc because of its recording density higher than that of the DVD.

In order to converge a laser beam onto a recording surface of each of the plurality of types of optical discs, one or a plurality of optical elements forming an optical system of an optical disc drive is provided with an annular zone structure on one lens surface in the optical system. The annular zone structure formed on the lens surface includes minute steps formed between adjacent annular zones so that each of the laser beams having different wavelengths can be converged onto a recording surface of each of the plurality of types of optical discs by the effect of the annular zone structure.

It is preferable that the optical element provided with the annular zone structure has a function of compensating for spherical aberration caused when a wavelength of a laser beam shifts from its design wavelength due to, for example, temperature change, environmental variation, or individual differences of light source devices. The term design wavelength means a wavelength of a laser beam suitable for recordation or reproduction of information for each of the plurality of types of optical discs.

In Japanese Patent Provisional Publication No. 2004-247025, an optical pick-up supporting all of the CD, DVD and HD DVD is disclosed. In the optical pick-up disclosed in the publication, an objective lens is provided with an annular zone structure, for which third-order diffracted light is used for recordation or reproduction of information for an optical disc having the highest recording density and second-order diffracted light is used for recordation or reproduction of information for the DVD or CD. By employing such an objective lens, the optical pick-up is able to form a beam spot suitable for recordation or reproduction of information for each of the plurality of types of optical discs. By this configuration, the optical pick-up achieves the function of supporting the three types of optical discs having different recording densities.

However, the optical pick-up disclosed in the publication has a drawback that the optical pick-up can achieve only 40% usage efficiency of light for recordation or reproduction of information for the CD and undesired diffraction order light (e.g., first-order diffracted light in this case) having the light quantity corresponding to 40% usage efficiency of light is undesirably generated. By such a drawback, a waveform of a focus error signal may be deformed, thereby decreasing focusing performance. Further, in this case a suitable beam spot diameter can not be achieved.

SUMMARY OF THE INVENTION

The present invention is advantageous in that it provides an objective lens capable of forming a suitable beam spot while suppressing spherical aberration for each of three types of optical discs, preventing deterioration of focusing performance even when a step structure which produces undesirable diffraction order light for a lower recording density optical disc (e.g., the CD) is formed thereon, reducing a beam spot diameter to a desired level, and keeping high efficiency of light for a relatively high recording density optical disc (e.g, the HD DVD).

According to an aspect of the invention, there is provided an optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams. The optical disc drive comprising an objective lens. At least one of surfaces of the objective lens comprises a step structure which has a plurality of concentric refractive surface zones and gives an optical path length difference to an incident beam at each step formed between adjacent refractive surface zones. In this configuration, when the third laser beam passes through the objective lens, the objective lens produces normal diffraction order light converging to a recording surface of the third optical disc and undesired diffraction order light converging to a point deviating from the recording surface of the third optical disc. A distance from a point to which the normal diffraction order light converges to a point to which the undesired diffraction order light converges is larger than or equal to twice a pull-in range of a focus error signal obtained when a recording operation or a reproducing operation for the third optical disc is performed.

With this configuration, even if the objective lens has the step structure configured such that, when the third light beam is used, a point to which undesired diffraction order light converges deviates from a point to which normal diffraction order light converges, a suitable beam spot can be formed for each of the first to third optical discs by setting a distance (from a point to which the normal diffraction order light converges to a point to which the undesired diffraction order light converges) for a value larger than or equal to twice a pull-in range of a focus error signal. It is also possible to prevent a focus error signal from being deteriorated and to keep performance of a focusing function at a high level when the third optical disc is used.

In at least one aspect, the step structure has a step giving an optical path length difference substantially equal to an odd multiple of a wavelength of the first light beam, to the first light beam, the step structure has a region converging the third light beam onto the recording surface of the third optical disc, and a paraxial power component is set in the region such that the point to which the undesired diffraction order light converges deviates from the recording surface of the third optical disc.

In at least one aspect, when a wavelength of the first light beam is represented by %1 (nm), an optical path length difference given by each step to the first light beam is represented by $\Delta OPD$ (nm), the step structure satisfies a condition:

$$2N+0.70<|\Delta OPD/\lambda 1|<2N+1.30 \tag{1}$$

where N represents an integer.

When an optical path difference function defining the step structure is expressed by an equation:

$$\phi(h)=(P_2 h^2+P_4 h^4+P_6 h^6+P_8 h^8+P_{10} h^{10}+P_{12} h^{12})m\lambda \tag{2}$$

where $P_2$, $P_4$ and $P_6$ ... are coefficients of second, fourth, sixth ... orders, h represents a height from an optical axis, m represents a diffraction order at which diffraction efficiency is maximized, and λ represents a working wavelength of a light beam being used, the objective lens satisfies a condition:

$$-20.00<(f1 \times P_2)/(t3-t1)<0.00 \tag{3}$$

where f1 represents a focal length of the objective lens defined when the first light beam is used, and t1 and t3 (where t1<t3) respectively represent thicknesses of cover layers of the first and third optical discs.

In at least one aspect, the objective lens satisfies a condition:

$$-15.00<(f1 \times P_2)/(t3-t1)<-2.50 \tag{4}$$

According to another aspect of the invention, there is provided an optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams. The optical disc drive comprises an objective lens. When wavelengths of the first to third light beams are respectively represented by λ1 (nm), λ2 (nm) and λ3 (nm), a relationship λ1<λ2<λ3 is satisfied. When a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 is satisfied. When a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm are satisfied. Each of the first and second light beams being incident on the objective lens as a substantially collimated beam, and the third light beam is incident on the objective lens as a diverging beam. At least one of surfaces of the objective lens comprises a first region converging the third light beam on a recoding surface of the third optical disc. The first region comprises a step structure which has a plurality of concentric refractive surface zones and gives an optical path length difference to an incident beam at each step formed between adjacent refractive surface zones.

In the first region, at least a boundary part of the step structure satisfies a condition:

$$2N+0.70<|\Delta OPD/\lambda 1|<2N+1.30 \tag{1}$$

where N represents an integer, and $\Delta OPD$ (nm) represents an optical path length difference given by the at least a boundary part of the first region to the first light beam. When an optical path difference function $\phi(h)$ defining the step structure is expressed by an equation:

$$\phi(h)=(P_2 h^2+P_4 h^4+P_6 h^6+P_8 h^8+P_{10} h^{10}+P_{12} h^{12})m\lambda \tag{2}$$

where $P_2$, $P_4$ and $P_6$ ... are coefficients of second, fourth, sixth ... orders, h represents a height from an optical axis; m represents a diffraction order at which diffraction efficiency is maximized, and λ represents a working wavelength of a light beam being used, the objective lens satisfies a condition:

$$-20.00<(f1 \times P_2)/(t3-t1)<0.00 \tag{3}$$

where f1 represents a focal length of the objective lens defined when the first light beam is used.

With this configuration, it is possible to sufficiently reduce aberrations for each of the first to third optical discs. It is also possible to prevent a focus error signal from being deteriorated by undesired diffraction order light during use of the third optical disc while sufficiently suppressing a spherical aberration.

In at least one aspect, the objective lens further satisfies a condition:

$$-15.00<(f1 \times P_2)/(t3-t1)<-2.50 \tag{4}$$

In at least one aspect, the objective lens is a single element lens having Abbe number satisfying a condition:

$$40 \leq vd \leq 80 \tag{5}$$

The step structure in the first region satisfies a condition:

$$2.70<|\Delta OPD/\lambda 1|<3.30 \tag{6}$$

When a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02 < f1 \times M1 < 0.02 \qquad (7),$$

$$-0.02 < f2 \times M2 < 0.02 \qquad (8), \text{ and}$$

$$-0.12 < f3 \times M3 < -0.04 \qquad (9).$$

In at least one aspect, the objective lens is a single element lens having Abbe number satisfying a condition:

$$20 \leq vd \leq 40 \qquad (10).$$

The step structure in the first region satisfies a condition:

$$2.70 < |\Delta OPD/\lambda 1| < 3.30 \qquad (6).$$

When a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02 < f1 \times M1 < 0.02 \qquad (7),$$

$$-0.02 < f2 \times M2 < 0.02 \qquad (8), \text{ and}$$

$$-0.38 < f3 \times M3 < -0.30 \qquad (11).$$

In at least one aspect, the objective lens satisfies a condition:

$$1.32 < |\Delta OPDc/\lambda 3| < 1.62 \qquad (12)$$

where $\Delta OPDc$ (nm) represents an optical path length difference given by each step in the step structure to the third laser beam.

In at least one aspect, the objective lens includes a second region which is formed outside the first region and is configured to converge the first and second light beams on the recording surfaces of the first and second optical discs, respectively, and not to contribute to converging the third light beam. The second region gives at least an optical path length difference to an incident beam at each step formed between adjacent refractive surface zones. Further, an absolute value of an optical path length difference given by each step in the second region is different from an absolute value of an optical path length difference given by each step in the first region.

According to another aspect of the invention, there is provided an optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams. The optical disc drive comprises an objective lens. Each of the first to third light beams is incident on the objective lens as a substantially collimated beam. When the wavelengths of the first to third light beams are respectively represented by $\lambda 1$ (nm), $\lambda 2$ (nm) and $\lambda 3$ (nm), a relationship $\lambda 1 < \lambda 2 < \lambda 3$ is satisfied. When a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 is satisfied. When a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm are satisfied. At least one of surfaces of the objective lens comprises a first region converging the third light beam on a recoding surface of the third optical disc. The first region comprises a step structure which has a plurality of concentric refractive surface zones and has at least two types of steps formed between adjacent ones of the plurality of concentric refractive surface zones, the at least two types of steps giving different optical path length differences to an incident beam.

In the first region, at least one step type of the two types of steps satisfies a condition:

$$2N + 0.70 < |\Delta OPD1/\lambda 1| < 2N + 1.30 \qquad (13)$$

where $\Delta OPD1$ (nm) represents an optical path length difference given by the at least one step to the first light beam, and N is an integer. When the step structure is defined by at least two types of optical path difference functions expressed by:

$$\phi i(h) = (P_2 i h^2 + P_4 i h^4 + P_6 i h^6 + P_8 i h^8 + P_{10} i h^{10} + P_{12} i h^{12}) m\lambda \qquad (14)$$

where $\phi i(h)$ represents an i-th optical path difference function (i: an integer), $P_2 i$, $P_4 i$ and $P_6 i$ . . . are coefficients of second, fourth, sixth . . . orders of the i-th optical path difference function, h represents a height from an optical axis of the objective lens, m represents a diffraction order at which diffraction efficiency of the incident beam is maximized, and $\lambda$ represents a working wavelength of the incident beam, a condition:

$$-20.00 < (f1 \times P_2 1)/(t3 - t1) < 0.00 \qquad (15)$$

is satisfied for a first optical path difference function, where f1 represents a focal length of the objective lens for the wavelength of the first light beam.

With this configuration, it is possible to sufficiently reduce aberrations for each of the first to third optical discs. It is also possible to prevent a focus error signal from being deteriorated by undesired diffraction order light during use of the third optical disc while sufficiently suppressing a spherical aberration.

In at least one aspect, with regard to the first optical path difference function, the objective lens satisfies a condition:

$$-15.00 < (f1 \times P_2 1)/(t3 - t1) < -2.50 \qquad (16).$$

In at least one aspect, the step structure in the first region satisfies a condition:

$$2.70 < |\Delta OPD1/\lambda 1| < 3.30 \qquad (17).$$

In at least one aspect, the objective lens satisfies a condition:

$$1.32 < |\Delta OPDc1/\lambda 3| < 1.62 \qquad (18)$$

where $\Delta OPDc1$ (nm) represents an optical path length difference given by each step in the step structure to the third laser beam.

In at least one aspect, the step structure in the first region satisfies a condition:

$$4.70 < |\Delta OPD1/\lambda 1| < 5.30 \qquad (19).$$

In at least one aspect, the objective lens satisfies a condition:

$$2.30 < |\Delta OPDc1/\lambda 3| < 2.60 \qquad (20)$$

where OPDc1 (nm) represents an optical path length difference given by the step structure in the first region to the third light beam.

In at least one aspect, when an optical path length difference given by another step of the at least two types of steps different from the at least one step to the first light beam is represented by $\Delta OPD2$ (nm), the objective lens satisfies a condition:

$$2L-0.20 < |\Delta OPD2/\lambda 1| < 2L+0.20 \qquad (21)$$

where L is an integer.

In at least one aspect, the objective lens satisfies a condition:

$$1.80 < |\Delta OPD2/\lambda 1| < 2.20 \qquad (22).$$

In at least one aspect, the objective lens includes a second region which is formed outside the first region and is configured to converge the first and second light beams on the recording surfaces of the first and second optical discs, respectively, and not to contribute to converging the third light beam. The second region gives at least an optical path length difference to an incident beam at each step formed between adjacent refractive surface zones. Further, an absolute value of an optical path length difference given by each step in the second region to the first light beam is different from $|\Delta OPD2/\lambda 1|$ where $\Delta OPD2$ (nm) is an optical path length difference given by another step of the at least two types of steps different from the at least one step to the first light beam.

With regard to the above mentioned aspects regarding the optical disc drive, the optical disc drive may satisfy a condition:

$$f1 \times NA1 > f2 \times NA2 \qquad (23).$$

In this case, the objective lens includes a third region which is formed outside the second region and is configured to converge only the first light beam on the recording surface of the first optical disc and not to contribute to converging the second and third light beams, the third region gives at least an optical path length difference to an incident beam at each step formed between adjacent refractive surface zones, an absolute value of an optical path length difference given by each step in the third region is different from an absolute value of an optical path length difference given by each step in the second region.

With regard to the above mentioned aspects regarding the optical disc drive, the optical disc drive may satisfy a condition:

$$f1 \times NA1 < f2 \times NA2 \qquad (24).$$

In this case, the objective lens includes a third region which is formed outside the second region and is configured to converge only the second light beam on the recording surface of the second optical disc and not to contribute to converging the first and third light beams, the third region gives at least an optical path length difference to an incident beam at each step formed between adjacent refractive surface zones, and an absolute value of an optical path length difference given by each step in the third region is different from an absolute value of an optical path length difference given by each step in the second region.

According to another aspect of the invention, there is provided an objective lens used for an optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams. When wavelengths of the first to third light beams are respectively represented by $\lambda 1$ (nm), $\lambda 2$ (nm) and $\lambda 3$ (nm), a relationship $\lambda 1 < \lambda 2 < \lambda 3$ is satisfied. When a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 is satisfied. When a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm are satisfied. Each of the first and second light beams is incident on the objective lens as a substantially collimated beam, and the third light beam is incident on the objective lens as a diverging beam. At least one of surfaces of the objective lens comprises a first region converging the third light beam on a recoding surface of the third optical disc. The first region comprises a step structure which has a plurality of concentric refractive surface zones and gives an optical path length difference to an incident beam at each step formed between adjacent refractive surface zones.

In the first region, at least a boundary part of the step structure satisfies a condition:

$$2N+0.70 < |\Delta OPD/\lambda 1| < 2N+1.30 \qquad (1)$$

where N represents an integer, and $\Delta OPD$ (nm) represents an optical path length difference given by the at least a boundary part of the first region to the first light beam. When an optical path difference function $\phi(h)$ defining the step structure is expressed by an equation:

$$\phi(h) = (P_2 h^2 + P_4 h^4 + P_6 h^6 + P_8 h^8 + P_{10} h^{10} + P_{12} h^{12}) m\lambda \qquad (2)$$

where $P_2$, $P_4$ and $P_6$ ... are coefficients of second, fourth, sixth ... orders, h represents a height from an optical axis, m represents a diffraction order at which diffraction efficiency is maximized, and $\lambda$ represents a working wavelength of a light beam being used, the objective lens satisfies a condition:

$$-20.00 < (f1 \times P_2)/(t3-t1) < 0.00 \qquad (3)$$

where f1 represents a focal length of the objective lens defined when the first light beam is used.

With this configuration, it is possible to sufficiently reduce aberrations for each of the first to third optical discs. It is also possible to prevent a focus error signal from being deteriorated by undesired diffraction order light during use of the third optical disc while sufficiently suppressing a spherical aberration.

In at least one aspect, the objective lens further satisfies a condition:

$$-15.00 < (f1 \times P_2)/(t3-t1) < -2.50 \qquad (4).$$

In at least one aspect, the objective lens is a single element lens having Abbe number satisfying a condition:

$$40 \leq vd \leq 80 \qquad (5).$$

The step structure in the first region satisfies a condition:

$$2.70 < |\Delta OPD/\lambda 1| < 3.30 \quad (6),$$

wherein when a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02 < f1 \times M1 < 0.02 \quad (7)$$

$$-0.02 < f2 \times M2 < 0.02 \quad (8), \text{ and}$$

$$-0.12 < f3 \times M3 < -0.04 \quad (9),$$

In at least one aspect, the objective lens is a single element lens having Abbe number satisfying a condition:

$$20 \leq vd \leq 40 \quad (10).$$

The step structure in the first region satisfies a condition:

$$2.70 < |\Delta OPD/\lambda 1| < 3.30 \quad (6),$$

wherein when a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02 < f1 \times M1 < 0.02 \quad (7),$$

$$-0.02 < f2 \times M2 < 0.02 \quad (8), \text{ and}$$

$$-0.38 < f3 \times M3 < -0.30 \quad (11).$$

In at least one aspect, the objective lens satisfies a condition:

$$1.32 < |\Delta OPDc/\lambda 3| < 1.62 \quad (12)$$

where $\Delta OPDc$ (nm) represents an optical path length difference given by each step in the step structure to the third laser beam.

In at least one aspect, the objective lens includes a second region which is formed outside the first region and is configured to converge the first and second light beams on the recording surfaces of the first and second optical discs, respectively, and not to contribute to converging the third light beam. The second region gives at least an optical path length difference to an incident beam at each step formed between adjacent refractive surface zones. Further, an absolute value of an optical path length difference given by each step in the second region is different from an absolute value of an optical path length difference given by each step in the first region.

According to another aspect of the invention, there is provided an objective lens used for an optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams. Each of the first to third light beams is incident on the objective lens as a substantially collimated beam. When the wavelengths of the first to third light beams are respectively represented by λ1 (nm), λ2 (nm) and λ3 (nm), a relationship λ1<λ2<λ3 is satisfied. When a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 is satisfied. When a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm is satisfied. At least one of surfaces of the objective lens comprises a first region converging the third light beam on a recoding surface of the third optical disc. The first region comprises a step structure which has a plurality of concentric refractive surface zones and has at least two types of steps formed between adjacent ones of the plurality of concentric refractive surface zones, the at least two types of steps giving different optical path length differences to an incident beam.

In the first region, at least one step type of the two types of steps satisfies a condition:

$$2N+0.70 < |\Delta OPD1/\lambda 1| < 2N+1.30 \quad (13)$$

where $\Delta OPD1$ (nm) represents an optical path length difference given by the at least one step to the first light beam, and N is an integer. When the step structure is defined by at least two types of optical path difference functions expressed by:

$$\phi i(h) = (P_2 i h^2 + P_4 i h^4 + P_6 i h^6 + P_8 i h^8 + P_{10} i h^{10} + P_{12} i h^{12}) m\lambda \quad (14)$$

where $\phi i(h)$ represents an i-th optical path difference function (i: an integer), $P_2 i$, $P_4 i$ and $P_6 i$ ... are coefficients of second, fourth, sixth ... orders of the i-th optical path difference function, h represents a height from an optical axis of the objective lens, m represents a diffraction order at which diffraction efficiency of the incident beam is maximized, and λ represents a working wavelength of the incident beam, a condition:

$$-20.00 < (f1 \times P_2 1)/(t3-t1) < 0.00 \quad (15)$$

is satisfied for a first optical path difference function, where f1 represents a focal length of the objective lens for the wavelength of the first light beam.

With this configuration, it is possible to sufficiently reduce aberrations for each of the first to third optical discs. It is also possible to prevent a focus error signal from being deteriorated by undesired diffraction order light during use of the third optical disc while sufficiently suppressing a spherical aberration.

In at least one aspect, with regard to the first optical path difference function, the objective lens satisfies a condition:

$$-15.00 < (f1 \times P_2 1)/(t3-t1) < -2.50 \quad (16).$$

In at least one aspect, the step structure in the first region satisfies a condition:

$$2.70 < |\Delta OPD1/\lambda 1| < 3.30 \quad (17).$$

In at least one aspect, the objective lens satisfies a condition:

$$1.32 < |\Delta OPDc1/\lambda 3| < 1.62 \quad (18)$$

where $\Delta OPDc1$ (nm) represents an optical path length difference given by each step in the step structure to the third laser beam.

In at least one aspect, the step structure in the first region satisfies a condition:

$$4.70 < |\Delta OPD1/\lambda 1| < 5.30 \quad (19).$$

In at least one aspect, the objective lens satisfies a condition:

$$2.30 < |\Delta OPDc1/\lambda 3| < 2.60 \quad (20)$$

where $OPDc1$ (nm) represents an optical path length difference given by the step structure in the first region to the third light beam.

In at least one aspect, when an optical path length difference given by another step of the at least two types of steps different from the at least one step to the first light beam is represented by $\Delta OPD2$ (nm), the objective lens satisfies a condition:

$$2L - 0.20 < |\Delta OPD2/\lambda 1| < 2L + 0.20 \quad (21)$$

where L is an integer.

In at least one aspect, the objective lens satisfies a condition:

$$1.80 < |\Delta OPD2/\lambda 1| < 2.20 \quad (22).$$

In at least one aspect, the objective lens includes a second region which is formed outside the first region and is configured to converge the first and second light beams on the recording surfaces of the first and second optical discs, respectively, and not to contribute to converging the third light beam. The second region gives at least an optical path length difference to an incident beam at each step formed between adjacent refractive surface zones. Further, an absolute value of an optical path length difference given by each step in the second region to the first light beam is different from $|\Delta OPD2/\lambda 1|$ where $\Delta OPD2$ (nm) is an optical path length difference given by another step of the at least two types of steps different from the at least one step to the first light beam.

With regard to the above mentioned aspects regarding the objective lens, the objective lens may satisfy a condition:

$$f1 \times NA1 > f2 \times NA2 \quad (23).$$

In this case, the objective lens includes a third region which is formed outside the second region and is configured to converge only the first light beam on the recording surface of the first optical disc and not to contribute to converging the second and third light beams, the third region gives at least an optical path length difference to an incident beam at each step formed between adjacent refractive surface zones, and an absolute value of an optical path length difference given by each step in the third region is different from an absolute value of an optical path length difference given by each step in the second region.

With regard to the above mentioned aspects regarding the objective lens, the objective lens may satisfy a condition:

$$f1 \times NA1 < f2 \times NA2 \quad (24).$$

In this case, the objective lens includes a third region which is formed outside the second region and is configured to converge only the second light beam on the recording surface of the second optical disc and not to contribute to converging the first and third light beams, the third region gives at least an optical path length difference to an incident beam at each step formed between adjacent refractive surface zones, and an absolute value of an optical path length difference given by each step in the third region is different from an absolute value of an optical path length difference given by each step in the second region.

BRIEF DESCRIPTION OF THE ACCOMPANYING DRAWINGS

FIG. 4A shows a focus error signal component obtained from a normal beam of a diffraction order used for the third optical disc when a comparative objective lens not satisfying a condition required in an embodiment is used.

FIG. 4B shows a focus error signal component obtained from undesired diffraction order light when the comparative objective lens is used.

FIG. 4C shows a focus error signal obtained by summing both of the components shown in FIGS. 4A and 4B.

FIG. 13A is a graph illustrating spherical aberration caused when the first laser beam is used in the optical disc drive according to the third example.

FIG. 13B is a graph illustrating the spherical aberration caused when the second laser beam is used in the optical disc drive according to the third example.

FIG. 13C is a graph illustrating the spherical aberration caused when the third laser beam is used in the optical disc drive according to the third example.

FIG. 14 illustrates a focus error signal detected by a photoreceptor when the third optical disc is used in the optical disc drive according to a fourth example.

DETAILED DESCRIPTION OF THE EMBODIMENTS

Hereinafter, embodiments according to the invention are described with reference to the accompanying drawings.

Hereinafter, an objective lens for an optical disc drive configured to support three types of optical discs based on different technical standards is described. In the following, an optical disc (e.g., an HD DVD or BD) having the highest recording density is referred to as an optical disc D1, an optical disc (e.g., a DVD or DVD-R) having a recording density lower than that of the first optical disc is referred to as an optical disc D2, and an optical disc (e.g., a CD or CD-R) having the lowest recording density is referred to as an optical disc D3. In this embodiment, the optical discs D1, D2 and D3 have the following thicknesses of cover layers t1, t2 and t3, respectively.

$t1 \approx 0.6$ mm $t2 \approx 0.6$ mm $t3 \approx 1.2$ mm

In order to record information to or reproduce information from each of the optical discs D1, D2 and D3, it is required to change an NA (numerical aperture) in accordance with a recording density of an optical disc being used so that a beam spot suitable for recordation or reproduction of information for the optical disc being used is achieved. If design numerical apertures suitable for recordation or reproduction of information for optical discs D1, D2 and D3 are represented by NA1, NA2, and NA3, respectively, the following relationship holds.

NA1>NA3 and NA2>NA3

That is, since a smaller beam spot is required for the optical discs D1 and D2 having relatively high recording densities, relatively high numerical apertures are used for the optical discs D1 and D2. By contrast, a required NA for the optical disc D3 is relatively small because of its lower recording density. The optical disc drive includes a turn table (not shown) on which an optical disc is placed.

In order to support the three types of optical discs having different recording densities, the optical disc drive according to the embodiments is configured to emit laser beams having different wavelengths. More specifically, a laser beam (hereafter, referred to as a first laser beam) having the shortest wavelength is used to form a small beam spot suitable for recordation or reproduction of information for the optical disc D1, a laser beam (hereafter, referred to as a third laser beam) having the longest wavelength is used to form a large beam spot suitable for recordation or reproduction of information for the optical disc D3, and a laser beam (hereafter, referred to as a second laser beam) having a wavelength, which is longer than that of the first laser beam and shorter than that of the third laser beam, is used to form a relatively small beam spot suitable for recordation or reproduction of information for the optical disc D2.

First Embodiment

Figure 1:
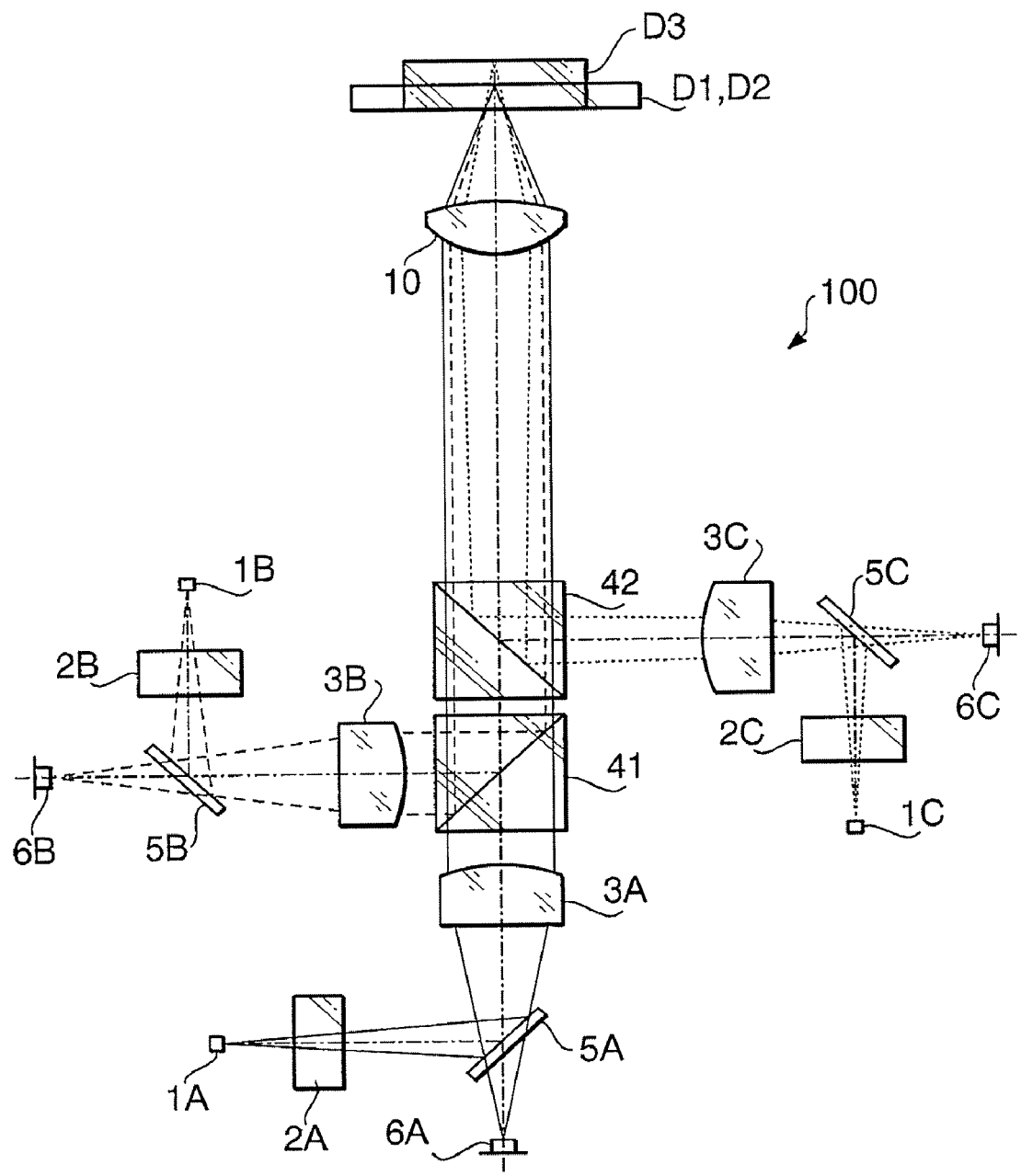
FIG. 1 is a block diagram of an optical disc drive including an objective lens according to a first embodiment of the invention.

FIG. 1 is a block diagram of an optical disc drive 100 including an objective lens 10 according to a first embodiment of the invention. As shown in FIG. 1, the optical disc drive 100 includes a light source 1A which emits the first laser beam, a light source 1B which emits the second laser beam, a third light source 1C which emits the third laser beam, diffraction gratings 2A, 2B and 2C, coupling lenses 3A, 3B and 3C, beam splitters 41 and 42, half mirrors 5A, and 5C, and photoreceptors 6A, 6B and 6C. In order to change the size of a numerical aperture in accordance with the type of an optical disc being used, the optical disc drive 100 may be configured to have an aperture stop defining a beam size of the third laser beam.

As shown in FIG. 1, the first laser beam emitted by the light source 1A is directed to the objective lens 10 via a common optical path after passing through the diffraction grating 2A, the coupling lens 3A and the beam splitters 41 and 42, the second laser beam emitted by the light source 1B is directed to the objective lens 10 via the common optical path after passing through the diffraction grating 2B, the coupling lens 3B and the beam splitters 41 and 42, and the third laser beam emitted by the light source 1C is directed to the objective lens 10 via the common optical path after passing through the diffraction grating 2C, the coupling lens 3C and the beam splitter 42. The first to third laser beams returning from a recording surface of an optical disc being used are detected by the photoreceptors 6A, 6B and 6C after passing through the half mirrors 5A, 5B and 5C, respectively.

Figure 2A:
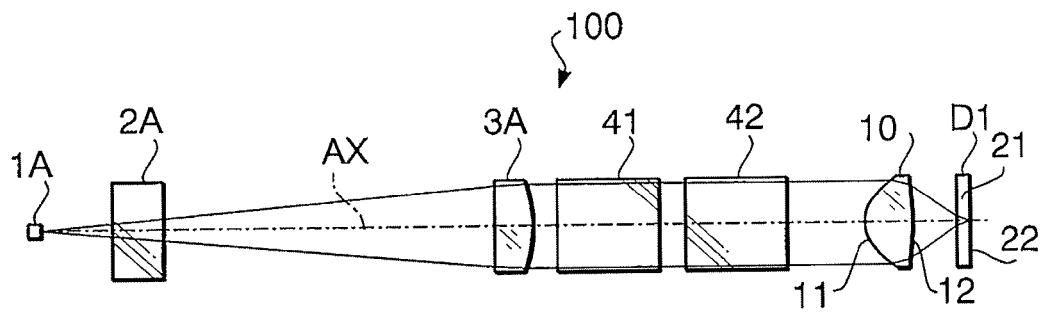
FIG. 2A is a partial optical block diagram of the optical disc drive illustrating an optical system for a first optical disc having the highest recording density.
Figure 2B:
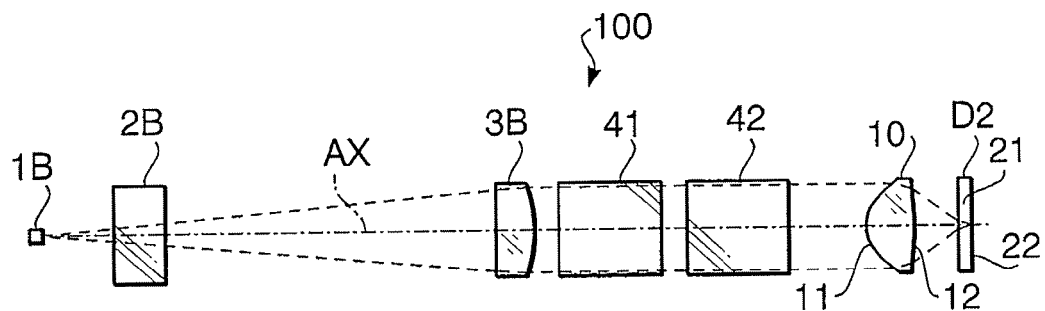
FIG. 2B is a partial optical block diagram of the optical disc drive illustrating an optical system for a second optical disc having the second highest recording density.
Figure 2C:
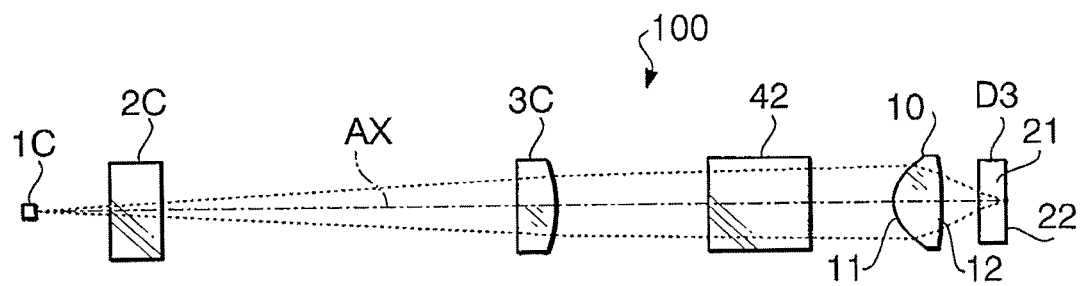
FIG. 2C is a partial optical block diagram of the optical disc drive illustrating an optical system for a third optical disc having the lowest recording density.

FIG. 2A is a partial optical block diagram of the optical disc drive 100 illustrating an optical system (an optical path) for the optical disc D1, FIG. 2B is a partial optical block diagram of the optical disc drive 100 illustrating an optical system (an optical path) for the optical disc D2, and FIG. 2C is a partial optical block diagram of the optical disc drive 100 illustrating an optical system (an optical path) for the optical disc D3. In each of FIGS. 2A, 2B and 2C, a reference axis AX of the optical disc drive 100 is represented by a chain line. Although each of FIGS. 2A to 2C represents a state where an optical axis of the objective lens 10 coincides with the reference axis AX, there is a case where the optical axis of the objective lens 10 shifts from the reference axis AX, for example, during a tracking operation. Such a relationship between the optical axis of the objective lens 10 and the reference axis AX also applies to representation of an optical system in a second embodiment.

The objective lens 10 has a surface 11 located on a light source side and a surface 12 located on an optical disc side. The objective lens 10 is a single element lens made of plastic.

Each of the surfaces 11 and 12 of the objective lens 10 is an aspherical surface. The aspherical surface is expressed by a following equation (10):

$$X(h) = \frac{ch^2}{1+\sqrt{1-(1+K)c^2h^2}} + A_4h^4 + A_6h^6 + A_8h^8 + A_{10}h^{10} + A_{12}h^{12} + \ldots \quad (10)$$

where, X(h) represents a SAG amount which is a distance between a point on the aspherical surface at a height of h from the optical axis and a plane tangential to the aspherical surface at the optical axis, symbol c represents curvature (1/r) on the optical axis, K is a conical coefficient, and $A_4$, $A_6$, $A_8$, $A_{10}$ and $A_{12}$ are aspherical coefficients of fourth, sixth, eighth, tenth and twelfth orders, respectively.

Reference numbers 21 and 22 respectively represent a cover layer and a recording surface of each of the optical discs D1, D2 and D3. Practically, the recording surface 22 is sandwiched between the cover layer 21 and a substrate layer or a label layer (not shown).

If laser beams having different wavelengths are used for the optical discs D1 to D3, spherical aberration changes depending on change of a refractive index of the objective lens 10 and the difference of thicknesses of cover layers of the optical discs D1 to D3. In order to support the optical discs D1 to D3, the optical disc drive 100 is required to compensate for spherical aberration for each of the optical discs D1 to D3. For this reason, a step structure (hereafter, referred to as a phase shift structure), including minute steps formed between adjacent refractive surface zones concentrically formed about the reference axis, is formed on at least one of the surfaces 11 and 12 of the objective lens 10. That is, in this embodiment, the surface 11 of the objective lens 10 is divided into a plurality of concentric refractive surface zones. Each step functions to give an optical path length difference for a beam impinging thereon.

Figure 3:
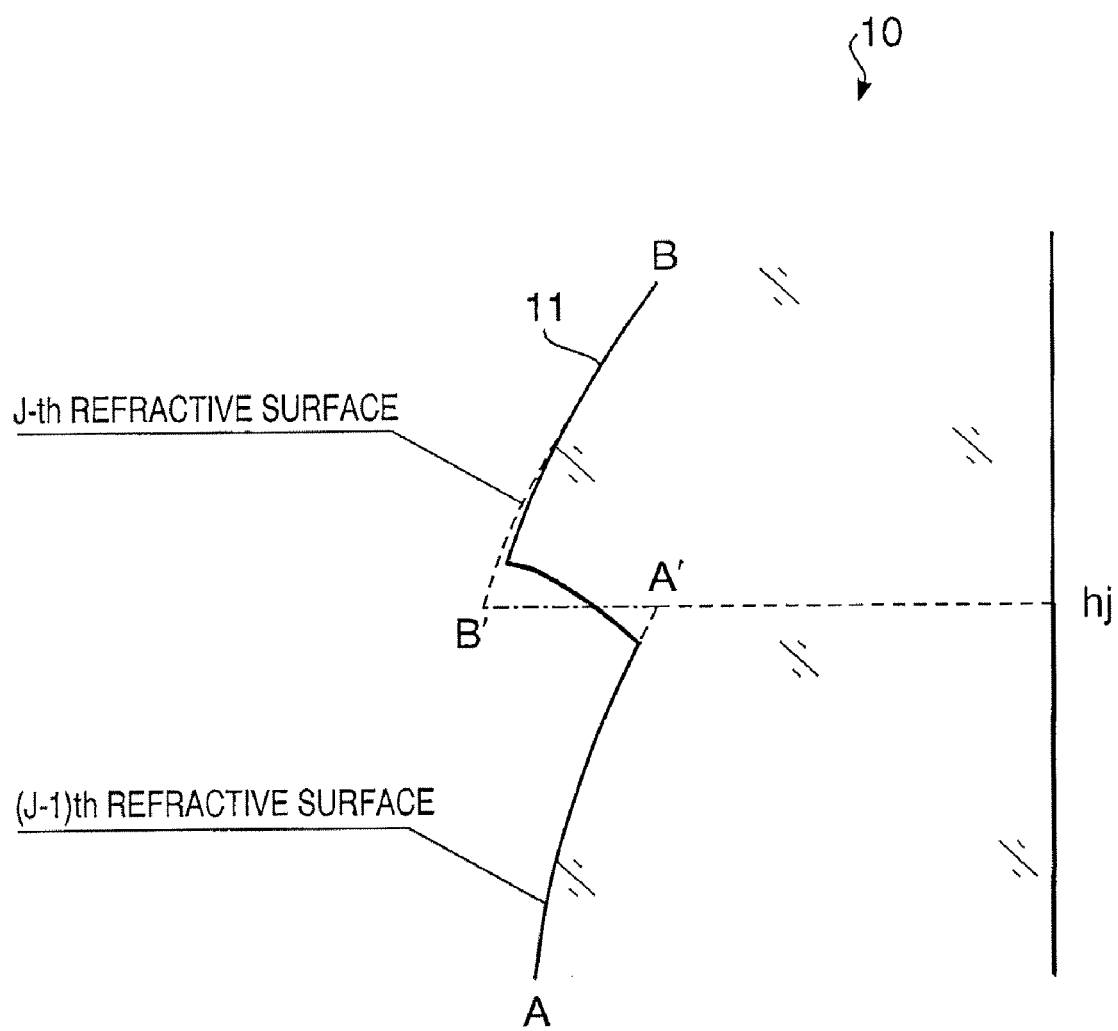
FIG. 3 is a partial cross section of the objective lens illustrating an enlarged view of a phase shift structure.

FIG. 3 is a partial cross section of the objective lens 10 illustrating an enlarged view of the phase shift structure. An optical path length difference means a difference between an optical path length determined by evaluating, to an image plane, light which is refracted at a boundary position hj by a hypothetical extended surface (an A-A' surface) obtained by extending the (j–1)-th refractive surface in a direction deviating from the optical axis and an optical path length determined by evaluating, to an image plane, light which is refracted at a boundary position hj by a hypothetical extended surface (an B-B' surface) obtained by extending the j-th refractive surface in a direction approaching to the optical axis.

The phase shift structure shown in FIG. 3 is configured to have a property of controlling the spherical aberration caused in a refractive lens part of the objective lens 10 by a difference between the wavelengths of the first and second laser beams. On the objective lens 10, the phase shift structure is formed in a region (hereafter, referred to as a first region) which contributes to convergence of each of the first to third laser beams and includes an intersection between the optical axis and the objective lens 10. In the first region, the phase shift structure has steps, each of which gives an optical path length difference substantially equal to an odd multiple of a wavelength of the first laser beam to the first laser beam.

More specifically, the optical path length difference (substantially equal to an odd multiple of a wavelength of the first laser beam) given by each step of the phase shift structure is defined by a condition:

$$2N+0.70<|\Delta OPD/\lambda 1|<2N+1.30 \quad (1)$$

where λ1 represents the wavelength of the first laser beam, ΔOPD [nm] represents an optical path length difference given by a step to the first laser beam, and N represents an integer.

By satisfying the condition (1), it is possible to suitably perform the recording or reproducing operation for the optical discs D1 and D2 having relatively high recoding densities. If |ΔOPD/λ1| gets larger than the upper limit of the condition (1), the diffraction efficiency of the first laser beam decreases. If |ΔOPD/λ1| gets lower than the lower limit of the condition (1), the diffraction efficiency of the second laser beam decreases.

The phase shift structure which is formed in the first region and satisfies the condition (1) is expressed by an optical path difference function φ(h):

$$\phi(h)=(P_2h^2+P_4h^4+P_6h^6+P_8h^8+P_{10}h^{10}+P_{12}h^{12})m\lambda \quad (2)$$

where $P_2$, $P_4$ and $P_6$ ... are coefficients of second, fourth, sixth ... orders, h represents a height from the optical axis, m represents a diffraction order at which the diffraction efficiency is maximized, and λ represents a working wavelength of a laser beam being used. The optical path difference function φ(h) represents the function of the objective lens 10 as a diffraction lens by an additional optical path length and defines a position and a height at which the steps of the phase shift structure are provided.

The phase shift structure which is formed in the first region and is represented by the expression (2) is configured to satisfy a condition:

$$-20.00<(f1\times P_2)/(t3-t1)<0.00 \quad (3)$$

where f1 represents a focal length of the objective lens 10 when the first laser beam is used.

Figure 5C:
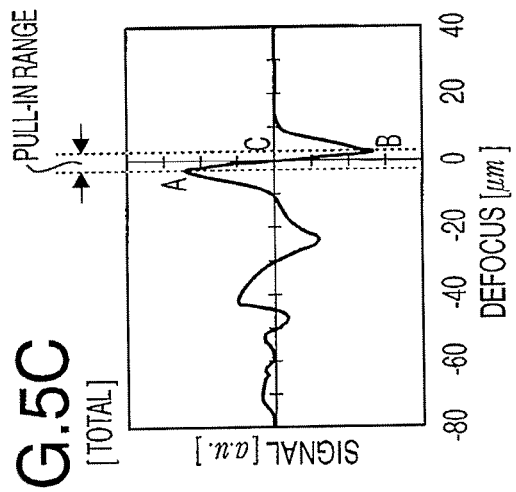
FIG. 5C shows a focus error signal obtained by summing both of the components shown in FIGS. 5A and 5B.
Figure 5A:
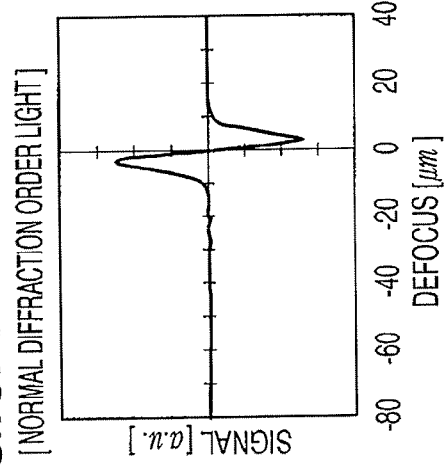
FIG. 5A shows a focus error signal component obtained from a normal beam of a diffraction order used for the third optical disc when the objective lens according to the embodiment is used.
Figure 5B:
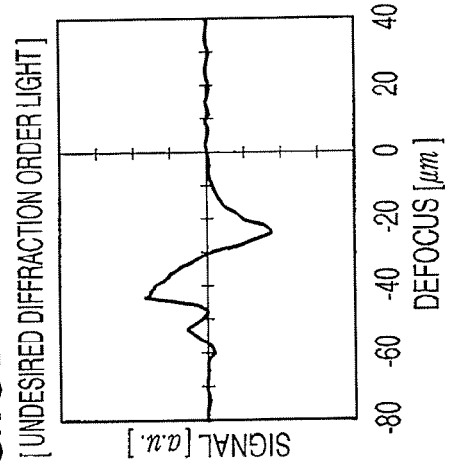
FIG. 5B shows a focus error signal component obtained from undesired diffraction order light when the objective lens according to the embodiment is used.

Hereafter, the advantage in satisfying the condition (3) is explained with reference to FIGS. 4A to 4C and 5A to 5C. FIGS. 5A, 5B and 5C represent a focus error signal obtained in the recording or reproducing operation for the optical disc D3 performed in the optical disc drive 100 by using the objective lens 10 satisfying the condition (3). By contrast, if the objective lens 10 does not satisfy the condition (3) (i.e., if (f1×P$_2$)/(t3−t1) gets larger than the upper limit of the condition (3)), a focus error signal shown in FIGS. 4A, 4B and 4C is obtained. That is, FIGS. 4A, 4B and 4C represent a focus error signal obtained in the recording or reproducing operation for the optical disc D3 performed in an optical disc drive by using an objective lens not satisfying the condition (3).

More specifically, FIG. 5A shows a focus error signal component obtained from light (hereafter, referred to as normal diffraction order light) corresponding to a diffraction order used for the recording and reproducing operations for the optical disc D3, FIG. 5B shows a focus error signal component obtained from light (hereafter, referred to as undesired diffraction order light) corresponding to a diffraction order not used for the recording and reproducing operations for the optical disc D3, and FIG. 5C shows a focus error signal obtained by summing both of the components shown in FIGS. 5A and 5B. As a comparative example, FIG. 4A shows a focus error signal component obtained from normal diffraction order light generated when the objective lens 10 does not satisfies the condition (3), FIG. 4B shows a focus error signal component obtained from undesired diffraction order light generated when the objective lens 10 does not satisfies the condition (3), and FIG. 4C shows a focus error signal obtained by summing both of the components shown in FIGS. 4A and 4B.

In each of FIGS. 4A to 4C and 5A to 5C (and in the following similar drawings regarding a focus error signal), a vertical axis represents a level of a focus error signal, and a horizontal axis represents a defocus amount of the objective lens.

As shown in FIGS. 4A to 4C, when (f1×P$_2$)/(t3−t1) exceeds the upper limit of the condition (3), a zero crossing point of the focus error signal component corresponding to the normal beam (see FIG. 4A) is relatively near to a zero crossing point of the focus error signal component corresponding to the undesired diffraction order light (see FIG. 4B). In this case, as shown in FIG. 4C, a waveform of the focus error signal formed as a total of the components shown in FIGS. 4A and 4B is deformed (see FIG. 4C).

By contrast, the objective lens 10 according to the embodiment is configured such that a distance between a point at which the undesired diffraction order light converges and the recording surface (i.e., a point at which the normal diffraction order light converges) of the optical disc D3 becomes relatively large. More specifically, the objective lens 10 is configured such that the distance is larger than or equal to twice a pull-in range of a focus error signal obtained when a recording operation or a reproducing operation of the optical disc D3 is performed.

The term "pull-in range" means a range in which an actuator is able to perform a focusing operation in accordance with a control voltage. More specifically, the pull-in range is defined as a distance from a point A to a point B in a horizontal direction on the total focus error signal shown in FIG. 5A. When the detected focus error signal takes a value outside the pull-in range, a correction operation is conducted so that the focus error signal takes a value inside the pull-in range.

For achieving a configuration concerning the above mentioned pull-in range, the objective lens 10 is configured in a region, which converges the third laser beams onto the optical disc D3 and is formed in the phase shift structure of surface 11 of the objective lens 10, a paraxial power component is set such that a point at which the undesired diffraction order light is converged deviates from the recording surface of the optical disc D3. The paraxial power component is a component for controlling an axial chromatic aberration of the undesired diffraction order light. Specifically, the P$_2$h$^2$ of the equation (2) corresponds to the axial power component.

By satisfying the condition (3), in the recording operation or the reproducing operation for the optical disc D3, a zero crossing point of the focus error signal based on the undesired diffraction order light can be placed sufficiently away from the zero crossing point of the focus error signal based on the normal diffraction order light. Consequently, it is possible to keep a waveform of the focus error signal in a form of a letter S required for performing appropriately a focus detection function. When (f1×P$_2$)/(t3−t1) gets lower than the lower limit of the condition (3), the number of annular zones increases and thereby the loss of light quantity is increased.

The phase shift structure in the first region may be configured to satisfy a condition (4).

$$-15.00 < (f1 \times P_2)/(t3-t1) < -2.50 \tag{4}$$

By satisfying the condition (4), a waveform of the focus error signal can be made further excellent.

When Abbe number vd of the objective lens (10) satisfies a condition:

$$40 \leq vd \leq 80 \tag{5},$$

the phase shift structure in the first region is configured such that the optical path length difference ΔOPD given by each step to the first laser beam satisfies a following condition (6).

$$2.70 < |\Delta OPD/\lambda 1| < 3.30 \tag{6}$$

If |ΔOPD/λ1| exceeds the upper limit of the condition (6), the light quantity of the first laser beam decreases undesirably. If |ΔOPD/λ1| gets lower than the lower limit of the condition (6), the light quantity of the undesired diffraction order light of the third laser beam increases and thereby the performance of the focusing function is deteriorated.

In a normal state, the objective lens 10 is placed on the reference axis AX. However, there is a case where the objective lens 10 deviates from the reference axis AX during the tracking operation. Hereafter such a situation Where the objective lens 10 deviates from the reference axis AX by the tracking operation is referred to as "tracking shift". During the tracking shift, aberrations are not caused if a collimated beam is incident on the objective lens 10, but off-axis aberrations (e.g., astigmatism or a coma) is caused if a non-collimated beam (e.g., a diverging beam or a converging beam) is incident on the objective lens 10.

In general, the larger a numerical aperture required for recording or reproducing information for an optical disc becomes, the narrower a tolerance to aberrations of the optical disc becomes. Therefore, it is desired that a substantially collimated beam is incident on the objective lens 10 when an optical disc drive requiring a high numerical aperture for the recording operation or the reproducing operation is used so that the aberrations caused by off-axis light can be reduced even if the objective lens 10 shifts from the reference axis Ax by tracking operation.

The objective lens 10 having the phase shift structure satisfying the condition (6) in the first region is configured to further satisfy the following conditions (7) and (8):

$$-0.02 < f1 \times M1 < 0.02 \qquad (7)$$

$$-0.02 < f2 \times M2 < 0.02 \qquad (8)$$

where M1 and f1 respectively represent magnification and a focal length of the objective lens 10 when the optical disc D1 is used, and M2 and f2 respectively represent magnification and a focal length of the objective lens 10 when the optical disc D2 is used. By satisfying the conditions (7) and (8), a substantially collimated beam is used for each of the optical discs D1 and D2. Therefore, it is possible to reduce the aberrations (e.g., a coma or astigmatism) caused during the tracking shift to a negligible level.

In this embodiment, the light sources 1A and 1B are located so that the first and second laser beams emitted by the light sources 1A and 1B are converted to the collimated beams by the coupling lenses 3A and 3B, respectively. By this configuration, the magnifications M1 and M2 becomes equal to zero. In other words, the coupling lenses 3A and 3B are function as collimator lenses.

If the phase shift structure configured to effectively reduce the aberrations caused when the optical disc D1 or D2 is used is formed in the first region of the objective lens 10, a spherical aberration may remain when the optical disc D3 is used. In this embodiment, in order to correct the spherical aberration caused when the optical disc D3 is used, a diverging beam is incident on the objective lens 10 when the optical disc D3 is used (see FIGS. 1 and 2C). Specifically, the objective lens 10 is configured to satisfy a condition:

$$-0.12 < f3 \times M3 < -0.04 \qquad (9)$$

where M3 and f3 respectively represent magnification and a focal length of the objective lens 10 when the optical disc D3 is used.

If (f3×M3) exceeds the upper limit of the condition (9), an overcorrected spherical aberration remains when the optical disc D3 is used. If (f3×M3) gets lower than the lower limit of the condition (9), an undercorrected spherical aberration is caused when the optical disc D3 is used. By satisfying the condition (9), it is possible to sufficiently reduce the spherical aberration when the optical disc D3 is used.

If the phase shift structure is designed such that an optical path length difference given by each step is substantially equal to a triple of the wavelength of the first laser beam, a spherical aberration caused by a difference in thickness between the optical discs D1 and D3 can be corrected to some extent. Therefore, it is possible to reduce an angle of divergence of the third laser beam incident on the objective lens 10 in comparison with a case where an optical path length difference given by each step to the first laser beam is substantially equal to 2Jλ1 (where J is an integer and λ1 is the wavelength of the first laser beam).

When Abbe number vd of the objective lens (10) satisfies a condition:

$$20 \leq vd \leq 40 \qquad (10),$$

the phase shift structure in the first region of the objective lens 10 is configured such that the optical path length difference ΔOPD given by each step to the first laser beam satisfies the condition (6). As described above, when an optical disc requiring a relatively high NA is used, it is desirable that the substantially collimated beam is used. Therefore, the objective lens is configured to satisfy the conditions (7) and (8).

The objective lens 10 satisfying the condition (10) is further configured to satisfy the following condition (11) to the spherical aberration caused when the optical disc D3 is used.

$$-0.38 < f3 \times M3 < -0.30 \qquad (11)$$

In order that the normal diffraction order light has a higher diffraction efficiency than the undesired diffraction order light in regard to the third laser beam, the phase shift structure satisfying the condition (6) is configured such that a optical path length difference ΔOPDc given to the third laser beam satisfies a condition:

$$1.32 < |\Delta OPDc/\lambda 3| < 1.62 \qquad (12).$$

According to the first embodiment, it is possible to prevent the focusing error signal from being deformed during the recordation or reproduction for the optical disc D3 and to keep a proper focusing function. By employing the above mentioned configuration depending on a value of Abbe number vd, the first to third laser beams passing through the coupling lenses 3A to 3C, the beam splitters 41 and 42 and the objective lens 10 form suitable beam spots on the respective recording surfaces of the optical discs D1 to D3.

Second Embodiment

Hereafter, an optical disc drive 100B employing an objective lens 10B according to a second embodiment of the invention is described. Since the optical disc drive 100B according to the second embodiment has substantially the same structure as that of the first embodiment shown in FIG. 1, explanation of the entire structure of the optical disc drive 100B will not be repeated.

Figure 6A:
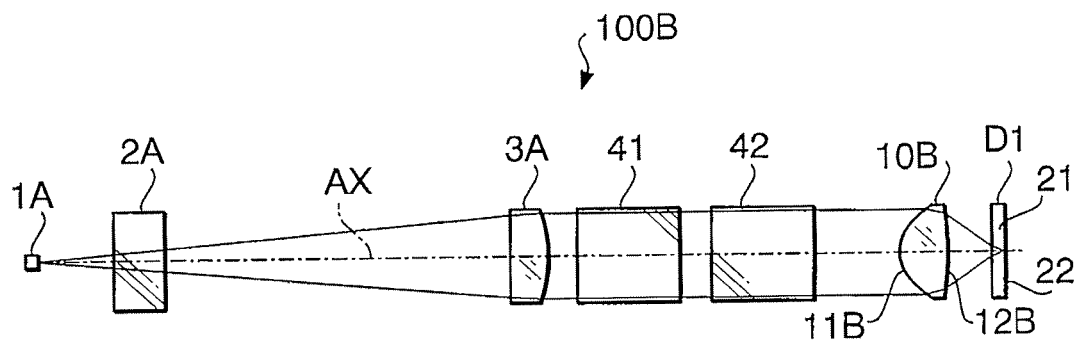
FIG. 6A is a partial optical block diagram of an optical disc drive according to a second embodiment illustrating an optical system for the first optical disc.
Figure 6B:
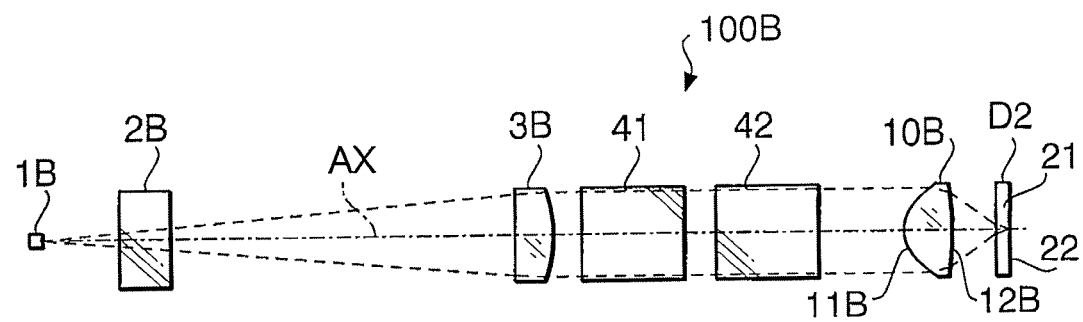
FIG. 6B is a partial optical block diagram of the optical disc drive according to the second embodiment illustrating an optical system for the second optical disc.
Figure 6C:
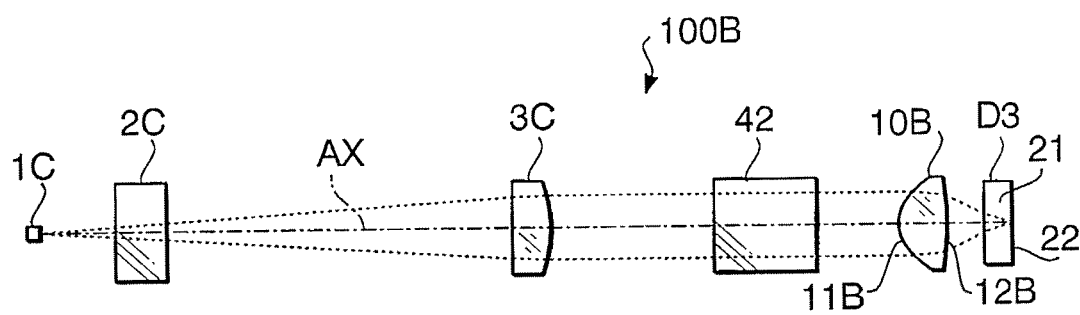
FIG. 6C is a partial optical block diagram of the optical disc drive according to the second embodiment illustrating an optical system for the third optical disc.

FIG. 6A is a partial optical block diagram of the optical disc drive 100B illustrating an optical system (an optical path) for the optical disc D1, FIG. 6B is a partial optical block diagram of the optical disc drive 100B illustrating an optical system (an optical path) for the optical disc D2, and FIG. 6C is a partial optical block diagram of the optical disc drive 100B illustrating an optical system (an optical path) for the optical disc D3. In FIGS. 6A to 6C, to elements which are the same as those of the first embodiment, the same reference numbers are assigned and explanations thereof will not be repeated. Similarly to FIGS. 2A to 2C, the reference axis AX of the optical disc drive 100B is represented by a chain line.

In the second embodiment, the light sources 1A to 1C and the coupling lenses 3A to 3C are located such that the first to third laser beams are converted to the collimated beams by the coupling lenses 3A to 3C, respectively. By this configuration, the magnification of the objective lens is substantially equal to zero for each of the optical discs D1 to D3. In other words, each of the coupling lenses 3A to 3C functions as a collimator lens.

In this embodiment, a phase shift structure is formed on at least one of surfaces 11B and 12B of the objective lens 10B. The phase shift structure is configured to be capable of adjusting the spherical aberration, which are caused depending on change of a refractive index of the objective lens 10 due to the difference between wavelengths of the first to third laser beams and on the difference between thicknesses of the cover layers of the optical discs D1 to D3, to approximately zero. In this embodiment, the phase shift structure has at least two types of steps respectively giving different optical path length differences to an incident beam.

The phase shift structure of the objective lens 10B according to the second embodiment is configured to have a property of being able to control the spherical aberration caused by a refractive lens part of the objective lens 10B by a difference between the wavelengths of the first and second laser beams. That is, the phase shift structure formed in the first region has steps, each of which gives an optical path length difference substantially equal to an odd multiple of a wavelength of the first laser beam to the first laser beam.

More specifically, the optical path length difference (substantially equal to an odd multiple of a wavelength of the first laser beam) given by each step of the phase shift structure is defined by a condition:

$$2N+0.70 < |\Delta OPD1/\lambda 1| < 2N+1.30 \quad (13)$$

where $\lambda 1$ [nm] represents the wavelength of the first laser beam, $\Delta OPD1$ [nm] represents an optical path length difference given by at least one of the step types to the first laser beam, and N represents an integer.

By satisfying the condition (13), it is possible to suitably perform the recording or reproducing operation for the optical discs D1 and D2 having relatively high recoding densities. If $|\Delta OPD1/\lambda 1|$ gets larger than the upper limit of the condition (13), the diffraction efficiency of the first laser beam decreases. If $|\Delta OPD1/\lambda 1|$ gets lower than the lower limit of the condition (12), the diffraction efficiency of the second laser beam decreases.

More specifically, the optical path length difference $\Delta OPD1$ is defined the following condition (17) when N is 1, and is defined the following condition (19) when N is 2.

$$2.70 < |\Delta OPD1/\lambda 1| < 3.30 \quad (17)$$

$$4.70 < |\Delta OPD1/\lambda 1| < 5.30 \quad (19)$$

In order that the normal diffraction order light has a higher diffraction efficiency than the undesired diffraction order light in regard to the third laser beam, the phase shift structure is configured such that an optical path length difference $\Delta OPDc1$ given to the third laser beam satisfies the following condition (18) or (20) when steps defined by one of the step types of the phase shift structure in the first region satisfy the condition (13). More specifically, steps defined by the first type satisfying the condition (17) satisfies the condition (18), and steps defined by the first type satisfying the condition (19) satisfies the condition (20).

$$1.32 < |\Delta OPDc1/\lambda 3| < 1.62 \quad (18)$$

$$2.30 < |\Delta OPDc1/\lambda 3| < 2.60 \quad (20)$$

If the objective lens 10B is designed to satisfy the condition (17) (e.g., the condition (17) or (18)), the optical path length difference given to the first laser beam by at least one step type becomes substantially equal to $(2J+1)\lambda 1$. In this case, the light quantity of light used for the recordation or reproduction for the optical disc D3 may become small. In order to avoid reduction of the quantity of light used for the recordation or reproduction for the optical disc D3, a second step type providing an optical path length difference different from the $\Delta OPD1$ is designed such that the light quantity becomes high when the optical disc D3 is used. That is, the phase shift structure of the objective lens 10B is designed to satisfy a condition:

$$2L-0.20 < |\Delta OPD2/\lambda 1| < 2L+0.20 \quad (21)$$

where $\Delta OPD2$ [nm] represents an optical path length difference given by the second step type providing an optical path length difference different from the $\Delta OPD1$, and L is an integer. More specifically, the phase shift structure of the objective lens 10B is designed to satisfy a condition:

$$1.80 < |\Delta OPD2/\lambda 1| < 2.20 \quad (22).$$

By configuring the second step type of the phase shift structure in the first region to satisfy the condition (21) (e.g., the condition (22)), the diffraction efficiency can be enhance for the first laser beam as well as for the third laser beam. Consequently, the sufficiently large quantity of light can be secured for the optical discs D1 and D3.

The phase shift structure described above can be defined by two types of optical path difference functions. More specifically, if the two types of optical path difference functions are represented as first and second optical path difference functions, a ratio of diffraction orders (at which the first to third laser beams take respective maximum diffraction efficiencies) defined by the first optical path difference function is different from a ratio of diffraction orders (at which the first to third laser beams take respective maximum diffraction efficiencies) defined by the second optical path difference function.

The optical path difference function defining the phase shift structure is expressed by a following equation (14):

$$\phi i(h) = (P_2 i h^2 + P_4 i h^4 + P_6 i h^6 + P_8 i h^8 + P_{10} i h^{10} + P_{12} i h^{12}) m\lambda \quad (14)$$

where $\phi i(h)$ represents an i-th optical path difference function (i: an integer), $P_2 i$, $P_4 i$ and $P_6 i$ ... are coefficients of second, fourth, sixth ... orders of the i-th optical path difference function, h represents a height from the optical axis, m represents a diffraction order at which the diffraction efficiency is maximized, and $\lambda$ represents a working wavelength of a laser beam being used. The optical path difference function $\phi(h)$ represents the function of the objective lens 10B as a diffraction lens by an additional optical path length.

The phase shift structure of the objective lens 10B is configured such that, in a condition where the first laser beam is used, the height h from the optical axis is within an effective range, a light convergence point at which the undesired diffraction order light converges deviates from the recording surface of the optical disc D3 due to a value (an additional optical path length) obtained from the first optical path difference function $\phi 1(h)$. More specifically, the phase shift structure is configured to satisfy the following condition (15). The phase shift structure may be configured to further satisfy the following condition (16).

$$-20.00 < (f1 \times P_2 1)/(t3-t1) < 0.00 \quad (15)$$

$$-15.00 < (f1 \times P_2 1)/(t3-t1) < -2.50 \quad (16)$$

By satisfying the condition (15), a zero crossing point of the focus error signal based on the undesired diffraction order light can be placed sufficiently away from the zero crossing point of the focus error signal based on the normal diffraction order light when the optical disc D3 is used. Consequently, it is possible to keep a waveform of the focus error signal in a form of a letter S required for performing appropriately a focus detection function.

According to the second embodiment, even if the first to third laser beams are converted to the collimated beams for the optical disc D1 to D3, the spherical aberration can be suitably reduced for each of the optical discs D1 to D3. Further, it is possible to suitably suppress the coma and astigmatism caused during the tracking shift. It is also possible to prevent undesired diffraction order light from being generated when the optical disc D3 is used while keeping a proper focusing function.

Hereafter, variations of the optical disc drives according to the first and second embodiments are described.

The objective lens 10 may have a second region which is located outside the first region and has a phase shift structure different from the phase shift structure in the first region, and may have additionally a third region which is located outside the second region and has a phase shift structure different from those in the first and second region, depending on a difference between the sizes of effective bean diameters for securing numerical apertures required for the recordation or reproduction for the optical discs D1 to D3.

In this case, the phase shift structure in the second region is configured to have an diffraction function of suitably converging the first and second laser beams respectively onto the recording surfaces (22) of the optical discs D1 and D2 requiring higher numerical apertures that that for the optical disc D3.

The phase shift structure in the second region has steps not contributing to the convergence of the third laser beam. That is, in regard to the first laser beam (i.e., in the case where the first laser beam is incident on the objective lens), one of absolute value types of optical path length differences given by the steps in the second region is different from an absolute value of an optical path length difference give by each step in the first region. If the first region as more than one step type, a step type giving an optical path length difference nearer to an even multiple of the wavelength of the first laser beam is defined as the each step in the first region in the above mentioned structure. For example, if two step types exist in the first region as in the case of the second embodiment, the step type satisfying the condition (22) or (23) is defined as the each step in the first region in the above mentioned structure.

The third region is formed when a diameter of the first laser beam incident on the surface 11 of the objective lens 10 is different from an effective diameter of the second laser beam.

More specifically, the third region is formed on the objective lens 10 if the following condition (23) is satisfied:

$$f1 \times NA1 > f2 \times NA2 \quad (23).$$

The condition (23) indicates that an effective diameter of the first laser beam on an incident surface of the objective lens 10 is larger than an effective diameter of the second laser beam in the incident surface of the objective lens 10. In this case, the third region is formed on the surface 11 of the objective lens so that the phase shift structure in the third region converges the first laser beam onto the recording surface of the optical disc D1 while producing almost no aberrations.

Unlike the second region, the third region formed when the condition (23) is satisfied does not contribute to the convergence of the second laser beam. That is, the third region formed when the condition (23) functions as an aperture stop for the second laser beam. Therefore, the third region is configured such that an optical path length difference given by each boundary between adjacent refractive surface zones to the first laser beam is different from an optical path length difference given to the first laser beam in the second region. When the third region is designed, the third region is blazed so that the diffraction efficiency for the first laser beam is maximized.

The third region may be formed on the objective lens 19 if the following condition (24) is satisfied:

$$f1 \times NA1 < f2 \times NA2 \quad (24).$$

The condition (24) indicates that an effective diameter of the second laser beam on an incident surface of the objective lens 10 is larger than an effective diameter of the first laser beam in the incident surface of the objective lens 10. In this case, the third region is formed on the surface 11 of the objective lens so that the phase shift structure in the third region converges the second laser beam onto the recording surface of the optical disc D2 while producing almost no aberrations.

Unlike the second region, the third region formed when the condition (23) is satisfied does not contribute to the convergence of the first laser beam. That is, the third region formed when the condition (23) functions as an aperture stop for the first laser beam. Therefore, the third region is configured such that an optical path length difference given by each boundary between adjacent refractive surface zones to the second laser beam is different from an optical path length difference given to the second laser beam in the second region. When the third region is designed, the third region is blazed so that the diffraction efficiency for the second laser beam is maximized.

Hereafter, three concrete (first, second, and third) examples of the optical disc drive 100 employing the objective lens 10 according to the first embodiment, and three concrete (fourth, fifth, and sixth) examples of the optical disc drive 100B employing the objective lens 10B according to the second embodiment are described. Configurations of the first to third examples according to the first embodiment are explained with reference to FIGS. 1 and 2A to 2C, and configurations of the fourth to sixth examples according to the second embodiment are explained with reference to FIGS. 6A to 6C. In each of the first to sixth examples, an aperture stop is used to achieve a suitable numerical aperture for the optical disc D3. For this reason, as shown in FIGS. 2A to 2C and 6A to 6C, the effective diameter of the beam for the optical disc D3 is smaller than that for each of the optical disc D1 or D2.

In the following examples, it is assumed that the thicknesses t1, t2 and t3 of the cover layers of the optical discs D1, D2 and D3 are as follows.

t1≅0.6 mm t2≅0.6 mm t3≅1.2 mm

First Example

The objective lens 10 according to the first example is provided with the phase shift structure having steps producing a single type of optical path length difference. The phase shift structure is formed on the surface 11 of the objective lens 10. Specifications of the objective lens 10 according to the first example are shown in Table 1.

TABLE 1

|  | First laser beam | Second laser beam | Third laser beam |
| --- | --- | --- | --- |
| Design wavelength (nm) | 405 | 660 | 790 |
| Focal length f (mm) | 3.00 | 3.11 | 3.11 |
| NA | 0.65 | 0.63 | 0.46 |
| magnification | 0.000 | 0.000 | −0.027 |

In Table 1 (and in the following similar Tables), the design wavelength is a wavelength suitable for the recording/reproducing operation of the optical disc, f represents a focal length (unit: mm) of the objective lens 10, NA represents the numerical aperture. In Table 1, the performance specifications are indicated with regard to each of the first laser beam (the optical disc D1), the second laser beam (the optical disc D2) and the third laser beam (the optical disc D3).

As shown by values of the magnification in Table 1, each of the first and second laser beams is incident on the objective lens 10 as a collimated beam when each of the optical discs D1 and D2 is used. When the optical disc D3 is used, the third laser beam is incident on the objective lens 10 as a diverging beam.

Table 2 shows a numerical configuration of the optical disc drive 100 when the optical disc D1 (the first laser beam) is used, Table 3 shows a numerical configuration of the optical disc drive 100 when the optical disc D2 (the second laser beam) is used, and Table 4 shows a numerical configuration of the optical disc drive 100 when the optical disc D3 (the third laser beam) is used.

TABLE 2

| Surface Number | r | d | n (405 nm) | comments |
|---|---|---|---|---|
| #0 |  | 2.81 |  | light source |
| #1 | ∞ | 2.00 | 1.52972 | diffraction grating |
| #2 | ∞ | 13.00 |  |  |
| #3 | 85.710 | 1.50 | 1.52469 | coupling lens |
| #4 | −10.550 | 1.00 |  |  |
| #5 | ∞ | 4.00 | 1.52972 | beam splitter |
| #6 | ∞ | 1.00 |  |  |
| #7 | ∞ | 4.00 | 1.52972 | beam splitter |
| #8 | ∞ | 3.09 |  |  |
| #9 | 1.880 | 1.90 | 1.52469 | objective lens |
| #10 | −6.570 | 1.58 |  |  |
| #11 | ∞ | 0.60 | 1.62231 | optical disc |
| #12 | ∞ | — |  |  |

TABLE 3

| Surface Number | r | d | n (660 nm) | comments |
|---|---|---|---|---|
| #0 |  | 2.79 |  | light source |
| #1 | ∞ | 2.00 | 1.51374 | diffraction grating |
| #2 | ∞ | 13.00 |  |  |
| #3 | 101.820 | 1.50 | 1.54044 | coupling lens |
| #4 | −10.700 | 1.00 |  |  |
| #5 | ∞ | 4.00 | 1.51374 | beam splitter |
| #6 | ∞ | 1.00 |  |  |
| #7 | ∞ | 4.00 | 1.51374 | beam splitter |
| #8 | ∞ | 3.00 |  |  |
| #9 | 1.880 | 1.90 | 1.50635 | objective lens |
| #10 | −6.570 | 1.67 |  |  |
| #11 | ∞ | 0.60 | 1.57961 | optical disc |
| #12 | ∞ | — |  |  |

TABLE 4

| Surface Number | r | d | n (790 nm) | comments |
|---|---|---|---|---|
| #0 |  | 2.83 |  | light source |
| #1 | ∞ | 2.00 | 1.51052 | diffraction grating |
| #2 | ∞ | 15.00 |  |  |
| #3 | −118.250 | 1.50 | 1.53653 | coupling lens |
| #4 | −12.100 | 4.92 |  |  |
| #5 | ∞ | 4.00 | 1.51052 | beam splitter |
| #6 | ∞ | 3.29 |  |  |
| #7 | 1.880 | 1.90 | 1.50313 | objective lens |
| #8 | −6.570 | 1.37 |  |  |
| #9 | ∞ | 1.20 | 1.57307 | optical disc |
| #10 | ∞ | — |  |  |

In Tables 2-4 (and in the following similar Tables), "r" represents a radius of curvature (unit: mm) of each lens surface on the optical axis, "d" represents a thickness of a lens or a distance (unit: mm) from a lens surface to a next lens surface, and "n" represents a refractive index.

In Tables 2 to 4 (and in the following similar tables), "surface number" represents a surface number of each surface of optical components in the optical dick drive 100. In Tables 2 to 4, surfaces #0 represent the light source 1A, 1B and 1C, respectively, surfaces #1 and #2 represent the diffraction gratings 2A, 2B and 2C, respectively, and surfaces #3 and #4 represent the coupling lenses 3A, 3B and 3C, respectively. In Tables 2 and 3, surfaces #5 and #6 represent the beam splitter 41, surfaces #7 and #8 represent the beam splitter 42, surfaces #9 and #10 represent the surfaces 11 and 12 of the objective lens 10, and surfaces #11 and #12 represent the cover layer 21 and the recording surface 22 of the optical discs D1 and D2, respectively. In Table 4, surfaces #5 and #6 represent the beam splitter 42, surfaces #7 and #8 represent the surfaces 11 and 12 of the objective lens 10, and surfaces #9 and #10 represent the cover layer 21 and the recording surface 22 of the optical disc D3.

A second surface of each of the coupling lenses 3A to 3C is an aspherical surface. Each of the surfaces 11 and 12 of the objective lens 10 is an aspherical surface. Table 5 shows the conical coefficient and aspherical coefficients of the aspherical surfaces defined when the optical disc D1 is used. Table 6 shows the conical coefficient and aspherical coefficients of the aspherical surfaces defined when the optical disc D2 is used. Table 7 shows the conical coefficient and aspherical coefficients of the aspherical surfaces defined when the optical disc D3 is used. In Tables 5 to 7 (and in the following similar Tables), a notation symbol E indicates that 10 is used as a radix and a right side value of E is used as an exponent.

TABLE 5

| SURFACE NO. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6750 | 1.3770E−03 | 2.1750E−04 | −7.9150E−05 | −1.3660E−05 | −1.7720E−06 |
| 10 | 0.0000 | 2.1250E−02 | −6.6700E−03 | 1.4220E−03 | −1.8410E−04 | 1.0570E−05 |

TABLE 6

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6750 | 1.3770E−03 | 2.1750E−04 | −7.9150E−05 | −1.3660E−05 | −1.7720E−06 |
| 10 | 0.0000 | 2.1250E−02 | −6.6700E−03 | 1.4220E−03 | −1.8410E−04 | 1.0570E−05 |

TABLE 7

| SURFACE NO. | K | A4 | A6 | A8 | A10 | A12 |
|---|---|---|---|---|---|---|
| 4 | 0.0000 | 2.5760E−05 | 1.5490E−07 | 0.0000E+00 | 0.0000E+00 | 0.0000E+00 |
| 7 | −0.6750 | 1.3770E−03 | 2.1750E−04 | −7.9150E−05 | −1.3660E−05 | −1.7720E−06 |
| 8 | 0.0000 | 2.1250E−02 | −6.6700E−03 | 1.4220E−03 | −1.8410E−04 | 1.0570E−05 |

Table 8 shows values of the coefficients ($P_2$ . . . ) of the optical path difference function applied to the phase shift structure formed on the surface 11 of the objective lens 10.

TABLE 8

| | $P_2$ | $P_4$ | $P_6$ | $P_8$ | $P_{10}$ | $P_{12}$ |
|---|---|---|---|---|---|---|
| (surface 11) | −1.0000E+00 | −7.3740E−01 | 1.5530E−02 | −2.5800E−02 | 0.0000E+00 | 0.0000E+00 |

Table 9 shows the diffraction order m at which the diffraction efficiency is maximized for each of the first to third laser beams.

TABLE 9

| | first laser beam | second laser beam | third laser beam |
|---|---|---|---|
| diffraction order m | 3 | 2 | 2 |

As be seen from Tables 1 and 8, each of terms of the conditions (3) and (4) (i.e., $(f1 \times P_2)/(t3-t1)$) is −5.00. Therefore, the first example satisfies the conditions (3) and (4).

Table 10 shows in detail the configuration of the phase shift structure formed on the surface 11 of the objective lens 10. In Table 10, a height range of each annular zone and an optical path length difference given to the first or third laser beam passing through each annular zone are shown. In Table 10 (and the following similar tables), numbers are assigned to annular zones in order of increasing distance from the optical axis, and the height range of each annular zone is represented by a minimum height hmin and a maximum height hmax of each annular zone.

TABLE 10

| Number of annular zone | hmin | hmax | |ΔOPD/λ1| | |ΔOPDc/λ3| |
|---|---|---|---|---|
| 0 | 0.000 | 0.624 | | |
| 1 | 0.624 | 0.948 | 3.00 | 1.47 |
| 2 | 0.948 | 1.128 | 3.00 | 1.47 |
| 3 | 1.128 | 1.255 | 3.00 | 1.47 |
| 4 | 1.255 | 1.353 | 3.00 | 1.47 |
| 5 | 1.353 | 1.434 | 3.00 | 1.47 |
| 6 | 1.434 | 1.502 | 3.00 | 1.47 |
| 7 | 1.502 | 1.561 | 3.00 | 1.47 |
| 8 | 1.561 | 1.613 | 3.00 | 1.47 |
| 9 | 1.613 | 1.659 | 3.00 | 1.47 |
| 10 | 1.659 | 1.701 | 3.00 | 1.47 |
| 11 | 1.701 | 1.739 | 3.00 | 1.47 |
| 12 | 1.739 | 1.774 | 3.00 | 1.47 |
| 13 | 1.774 | 1.806 | 3.00 | 1.47 |
| 14 | 1.806 | 1.836 | 3.00 | 1.47 |
| 15 | 1.836 | 1.864 | 3.00 | 1.47 |
| 16 | 1.864 | 1.891 | 3.00 | 1.47 |
| 17 | 1.891 | 1.915 | 3.00 | 1.47 |
| 18 | 1.915 | 1.939 | 3.00 | 1.47 |

TABLE 10-continued

| Number of annular zone | hmin | hmax | |ΔOPD/λ1| | |ΔOPDc/λ3| |
|---|---|---|---|---|
| 19 | 1.939 | 1.950 | 3.00 | 1.47 |

As shown in Table 10, the entire region in the effective diameter on the surface 11 of the objective lens 10 functions as the above mentioned first region.

Since Abbe number νd of the objective lens 10 of the first example is 58, the condition (5) is satisfied. As shown in Table 10, the optical path length difference |ΔOPD/λ1| given by each step between adjacent annular zones to the first laser beam is 3.00 (i.e., N=1). Therefore, conditions (1) and (6) are satisfied. As can be seen from Table 10, the optical path length difference given to the third laser beam by each step between adjacent annular zones |ΔOPDc/λ3| is 1.47. Therefore, the condition (12) is satisfied.

Table 11 shows a numerical configuration of an optical system configured in the optical disc drive 100 to detect a focus error signal when the optical disc D3 is used.

TABLE 11

| surface No. | r | d | n (790 nm) | comments |
|---|---|---|---|---|
| 11 | ∞ | 1.20 | 1.57307 | optical disc |
| 12 | ∞ | 1.37 | | |
| 13 | 6.570 | 1.90 | 1.50313 | objective lens |
| 14 | −1.880 | 3.29 | | |
| 15 | ∞ | 4.00 | 1.51052 | beam splitter |
| 16 | ∞ | 4.92 | | |
| 17 | 12.100 | 1.50 | 1.53653 | coupling lens |
| 18 | 118.250 | 9.00 | | |
| 19 | ∞ | 2.20 | 1.51052 | half mirror |
| 20 | ∞ | 9.62 | | |
| 21 | ∞ | — | | photoreceptor |

In Table 11, surfaces #11 and #12 represent the recording surface and the cover layer of the optical disc D3, surfaces #13 and #14 represent the objective lens 10, surfaces #15 and #16 represent the beam splitter 42, surfaces #17 and #18 represent the coupling lens 3C, surfaces #19 and #20 represent the half mirror 5C, and the surface #21 represents the photoreceptor 6C.

Figure 7:
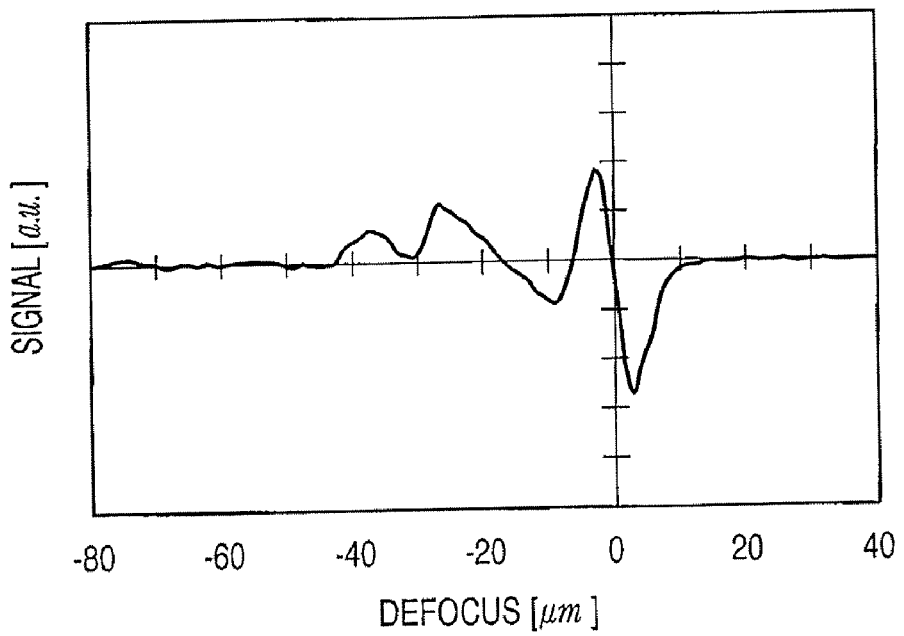
FIG. 7 illustrates a focus error signal detected by a photoreceptor when the third optical disc is used in an optical disc drive according to a first example.

FIG. 7 illustrates a focus error signal detected by the photoreceptor 6C when the optical disc D3 is used in the optical disc drive 100. As a comparative example, FIG. 8 illustrates a focus error signal formed by an objective lens configured to have the same configuration as the objective lens 10 with the exception of the terms of the conditions (3) and (4) taking a value of 0.00.

Figure 8:
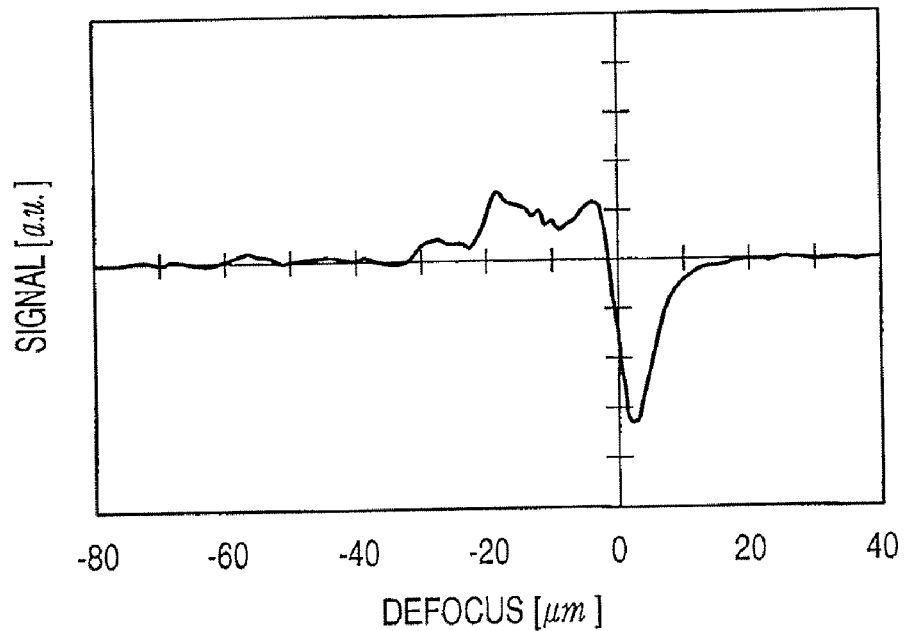
FIG. 8 illustrates a focus error signal formed by an objective lens according to a comparative example.

As can be seen from the comparison between FIGS. 7 and 8, the focus error signal detected by the photoreceptor 6C of the first example has a more suitable waveform formed in the shape of the letter S at the defocus amount of approximately 0 µm than the waveform shown in FIG. 8. By satisfying the conditions (3) and (4), the optical disc drive 100 according to the first example is able to prevent deformation of the focus error signal and thereby suitably suppress the deterioration of the focusing performance.

As can be seen from Table 1, in the optical disc drive 100 according to the first example, f1×M1 is 0.000, f2×M2 is 0.000, and f3×M3 is −0.08. Therefore, the conditions (7), (8) and (9) are satisfied.

Figure 9A:
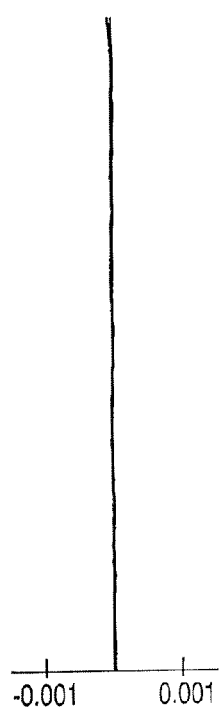
FIG. 9A is a graph illustrating spherical aberration caused when a first laser beam for the first optical disc is used in the optical disc drive according to the first example.
Figure 9B:
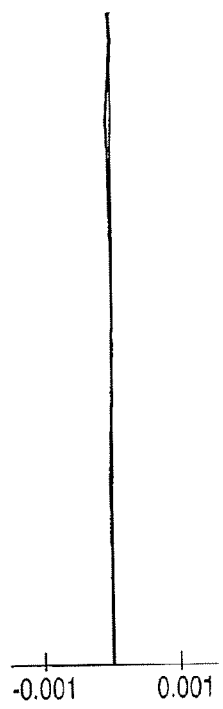
FIG. 9B is a graph illustrating the spherical aberration caused when a second laser beam for the second optical disc is used in the optical disc drive according to the first example.
Figure 9C:
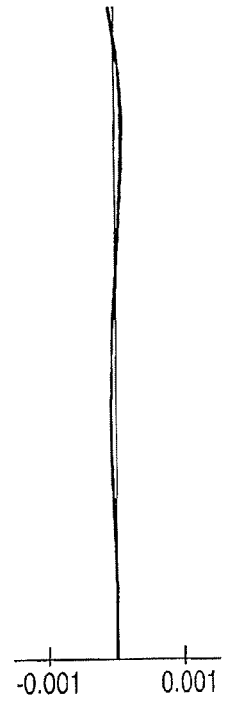
FIG. 9C is a graph illustrating the spherical aberration caused when a third laser beam for the third optical disc is used in the optical disc drive according to the first example.

FIG. 9A is a graph illustrating the spherical aberration caused when the first laser beam is used in the optical disc drive 100 according to the first example. FIG. 9B is a graph illustrating the spherical aberration caused when the second laser beam is used in the optical disc drive 100 according to the first example. FIG. 9C is a graph illustrating the spherical aberration caused when the third laser beam is used in the optical disc drive 100 according to the first example. As shown in FIGS. 9A to 9C, the spherical aberration is suitably compensated and a suitable beam spot is formed for each of the optical discs D1 to D3.

Second Example

The objective lens 10 according to the second example is provided with the phase shift structure having steps producing a single type of optical path length difference. The phase shift structure is formed on the surface 11 of the objective lens 10. Specifications of the objective lens 10 according to the second example are shown in Table 12.

TABLE 12

|  | First laser beam | Second laser beam | Third laser beam |
|---|---|---|---|
| Design wavelength (nm) | 405 | 660 | 790 |
| Focal length f (mm) | 2.30 | 2.37 | 2.38 |
| NA | 0.65 | 0.63 | 0.51 |
| magnification | 0.000 | 0.000 | −0.045 |

Table 13 shows a numerical configuration of the optical disc drive 100 when the optical disc D1 (the first laser beam) is used, Table 14 shows a numerical configuration of the optical disc drive 100 when the optical disc D2 (the second laser beam) is used, and Table 15 shows a numerical configuration of the optical disc drive 100 when the optical disc D3 (the third laser beam) is used.

TABLE 13

| Surface Number | r | d | n (405 nm) | comments |
|---|---|---|---|---|
| #0 |  | 2.32 |  | light source |
| #1 | ∞ | 1.50 | 1.52972 | diffraction grating |
| #2 | ∞ | 8.00 |  |  |
| #3 | 54.170 | 1.20 | 1.52469 | coupling lens |
| #4 | −7.070 | 1.00 |  |  |
| #5 | ∞ | 3.20 | 1.52972 | beam splitter |
| #6 | ∞ | 1.00 |  |  |

TABLE 13-continued

| Surface Number | r | d | n (405 nm) | comments |
|---|---|---|---|---|
| #7 | ∞ | 3.20 | 1.52972 | beam splitter |
| #8 | ∞ | 3.05 |  |  |
| #9 | 1.460 | 1.50 | 1.52469 | objective lens |
| #10 | −5.087 | 1.10 |  |  |
| #11 | ∞ | 0.60 | 1.62231 | optical disc |
| #12 | ∞ | — |  |  |

TABLE 14

| Surface Number | r | d | n (660 nm) | comments |
|---|---|---|---|---|
| #0 |  | 2.31 |  | light source |
| #1 | ∞ | 1.50 | 1.51374 | diffraction grating |
| #2 | ∞ | 8.00 |  |  |
| #3 | 45.520 | 1.20 | 1.54044 | coupling lens |
| #4 | −6.950 | 1.00 |  |  |
| #5 | ∞ | 3.20 | 1.51374 | beam splitter |
| #6 | ∞ | 1.00 |  |  |
| #7 | ∞ | 3.20 | 1.51374 | beam splitter |
| #8 | ∞ | 3.00 |  |  |
| #9 | 1.460 | 1.50 | 1.50635 | objective lens |
| #10 | −5.087 | 1.15 |  |  |
| #11 | ∞ | 0.60 | 1.57961 | optical disc |
| #12 | ∞ | — |  |  |

TABLE 15

| Surface Number | r | d | n (790 nm) | comments |
|---|---|---|---|---|
| #0 |  | 2.36 |  | light source |
| #1 | ∞ | 1.50 | 1.51052 | diffraction grating |
| #2 | ∞ | 7.00 |  |  |
| #3 | −41.950 | 1.20 | 1.53653 | coupling lens |
| #4 | −6.820 | 4.13 |  |  |
| #5 | ∞ | 3.20 | 1.51052 | beam splitter |
| #6 | ∞ | 3.27 |  |  |
| #7 | 1.460 | 1.50 | 1.50313 | objective lens |
| #8 | −5.087 | 0.87 |  |  |
| #9 | ∞ | 1.20 | 1.57307 | optical disc |
| #10 | ∞ | — |  |  |

In Tables 13 to 15, surfaces #0 represent the light source 1A, 1B and 1C, respectively, surfaces #1 and #2 represent the diffraction gratings 2A, 2B and 2C, respectively, and surfaces #3 and #4 represent the coupling lenses 3A, 3B and 3C, respectively. In Tables 13 and 14, surfaces #5 and #6 represent the beam splitter 41, surfaces #7 and #8 represent the beam splitter 42, surfaces #9 and #10 represent the surfaces 11 and 12 of the objective lens 10, and surfaces #11 and #12 represent the cover layer 21 and the recording surface 22 of the optical discs D1 and D2, respectively. In Table 15, surfaces #5 and #6 represent the beam splitter 42, surfaces #7 and #8 represent the surfaces 11 and 12 of the objective lens 10, and surfaces #9 and #10 represent the cover layer 21 and the recording surface 22 of the optical disc D3.

A second surface of each of the coupling lenses 3A to 3C is an aspherical surface. Each of the surfaces 11 and 12 of the objective lens 10 is an aspherical surface. Table 16 shows the conical coefficient and aspherical coefficients of the aspherical surfaces defined when the optical disc D1 is used. Table 17 shows the conical coefficient and aspherical coefficients of the aspherical surfaces defined when the optical disc D2 is used. Table 18 shows the conical coefficient and aspherical coefficients of the aspherical surfaces defined when the optical disc D3 is used.

TABLE 16

| SURFACE NO. | K | A4 | A6 | A8 | A10 | A12 |
|---|---|---|---|---|---|---|
| 4 | 0.0000 | 2.6290E−04 | 3.9680E−06 | 0.0000E+00 | 0.0000E+00 | 0.0000E+00 |
| 9 | −0.5000 | −2.2190E−03 | −3.5560E−04 | −3.5480E−04 | −9.8620E−05 | 3.0090E−05 |
| 10 | 0.0000 | 5.2490E−02 | −2.6770E−02 | 1.2530E−02 | −3.5890E−03 | 4.5800E−04 |

TABLE 17

| SURFACE NO. | K | A4 | A6 | A8 | A10 | A12 |
|---|---|---|---|---|---|---|
| 4 | 0.0000 | 2.8660E−04 | 4.4200E−06 | 0.0000E+00 | 0.0000E+00 | 0.0000E+00 |
| 9 | −0.5000 | −2.2190E−03 | −3.5560E−04 | −3.5480E−04 | −9.8620E−05 | 3.0090E−05 |
| 10 | 0.0000 | 5.2490E−02 | −2.6770E−02 | 1.2530E−02 | −3.5890E−03 | 4.5800E−04 |

TABLE 18

| SURFACE NO. | K | A4 | A6 | A8 | A10 | A12 |
|---|---|---|---|---|---|---|
| 4 | 0.0000 | 1.1100E−04 | 2.2200E−06 | 0.0000E+00 | 0.0000E+00 | 0.0000E+00 |
| 7 | −0.5000 | −2.2190E−03 | −3.5560E−04 | −3.5480E−04 | −9.8620E−05 | 3.0090E−05 |
| 8 | 0.0000 | 5.2490E−02 | −2.6770E−02 | 1.2530E−02 | −3.5890E−03 | 4.5800E−04 |

Table 19 shows values of the coefficients ($P_2$ ... ) of the optical path difference function applied to the phase shift structure formed on the surface 11 of the objective lens 10.

TABLE 19

| | $P_2$ | $P_4$ | $P_6$ | $P_8$ | $P_{10}$ | $P_{12}$ |
|---|---|---|---|---|---|---|
| (surface 11) | −4.0000E+00 | −1.5510E+00 | −1.1170E−01 | −8.9540E−02 | 0.0000E+00 | 0.0000E+00 |

Table 20 shows the diffraction order m at which the diffraction efficiency is maximized for each of the first to third laser beams.

TABLE 20

| | first laser beam | second laser beam | third laser beam |
|---|---|---|---|
| diffraction order m | 3 | 2 | 2 |

As be seen from Tables 12 and 19, the term of the condition (3) (i.e., (f1×$P_2$)/(t3−t1)) is −15.33. Therefore, the second example satisfies the condition (3).

Table 21 shows in detail the configuration of the phase shift structure formed on the surface 11 of the objective lens 10. In Table 21, a height range of each annular zone and an optical path length difference given to the first or third laser beam passing through each annular zone are shown.

TABLE 21

| Number of annular zone | hmin | hmax | |ΔOPD/λ1| | |ΔOPDc/λ3| |
|---|---|---|---|---|
| 0 | 0.000 | 0.346 | | |
| 1 | 0.346 | 0.575 | 3.00 | 1.47 |
| 2 | 0.575 | 0.718 | 3.00 | 1.47 |
| 3 | 0.718 | 0.825 | 3.00 | 1.47 |
| 4 | 0.825 | 0.911 | 3.00 | 1.47 |
| 5 | 0.911 | 0.984 | 3.00 | 1.47 |
| 6 | 0.984 | 1.046 | 3.00 | 1.47 |
| 7 | 1.046 | 1.100 | 3.00 | 1.47 |
| 8 | 1.100 | 1.148 | 3.00 | 1.47 |
| 9 | 1.148 | 1.192 | 3.00 | 1.47 |
| 10 | 1.192 | 1.232 | 3.00 | 1.47 |
| 11 | 1.232 | 1.268 | 3.00 | 1.47 |
| 12 | 1.268 | 1.301 | 3.00 | 1.47 |
| 13 | 1.301 | 1.332 | 3.00 | 1.47 |
| 14 | 1.332 | 1.361 | 3.00 | 1.47 |
| 15 | 1.361 | 1.388 | 3.00 | 1.47 |
| 16 | 1.388 | 1.413 | 3.00 | 1.47 |
| 17 | 1.413 | 1.437 | 3.00 | 1.47 |
| 18 | 1.437 | 1.460 | 3.00 | 1.47 |
| 19 | 1.460 | 1.481 | 3.00 | 1.47 |
| 20 | 1.481 | 1.500 | 3.00 | 1.47 |

As shown in Table 21, the entire region in the effective diameter on the surface 11 of the objective lens 10 functions as the above mentioned first region.

Since Abbe number vd of the objective lens 10 of the second example is 58, the condition (5) is satisfied. As shown in Table 21, the optical path length difference |ΔOPD/λ1| given by each step between adjacent annular zones to the first laser beam is 3.00 (i.e., N=1). Therefore, conditions (1) and (6) are satisfied. As can be seen from Table 21, the optical path length difference |ΔOPDc/λ3| given to the third laser beam by each step between adjacent annular zones is 1.47. Therefore, the condition (12) is satisfied.

Table 22 shows a numerical configuration of an optical system configured in the optical drive 100 to detect a focus error signal when the optical disc D3 is used.

TABLE 22

| surface No. | r | d | n (790 nm) | comments |
|---|---|---|---|---|
| 11 | ∞ | 1.20 | 1.57307 | optical disc |
| 12 | ∞ | 0.87 | | |
| 13 | 5.087 | 1.50 | 1.50313 | objective lens |
| 14 | −1.460 | 3.27 | | |
| 15 | ∞ | 3.20 | 1.51052 | beam splitter |
| 16 | ∞ | 4.13 | | |
| 17 | 6.820 | 1.20 | 1.53653 | coupling lens |
| 18 | 41.950 | 4.50 | | |
| 19 | ∞ | 2.20 | 1.51052 | half mirror |
| 20 | ∞ | 5.42 | | |
| 21 | ∞ | — | | photoreceptor |

In Table 22, surfaces #11 and #12 represent the recording surface and the cover layer of the optical disc D3, surfaces #13 and #14 represent the objective lens 10, surfaces #15 and #15 represent the beam splitter 42, surfaces #17 and #18 represent the coupling lens 3C, surfaces #19 and #20 represent the half mirror 5C, and the surface #21 represents the photoreceptor 6C.

Figure 10:
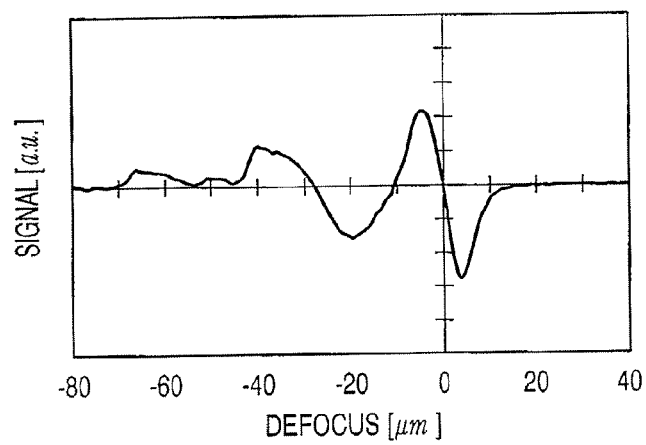
FIG. 10 illustrates a focus error signal detected by a photoreceptor when the third optical disc is used in the optical disc drive according to a second example.

FIG. 10 illustrates a focus error signal detected by the photoreceptor 6C when the optical disc D3 is used in the optical disc drive 100.

As can be seen from the comparison between FIG. 10 and FIG. 8 (i.e., the comparative example), the focus error signal detected by the photoreceptor 6C of the second example has a more suitable waveform formed in the shape of the letter S at the defocus amount of approximately 0 μm than the waveform shown in FIG. 8. By satisfying the condition (3), the optical disc drive 100 according to the second example is able to prevent deformation of the focus error signal and thereby suitably suppress the deterioration of the focusing performance.

As can be seen from Table 12, in the optical disc drive 100 according to the second example, f1×M1 is 0.000, f2×M2 is 0.000, and f3×M3 is −0.11. Therefore, the conditions (7), (8) and (9) are satisfied.

Figures 11A, 11B, 11C:
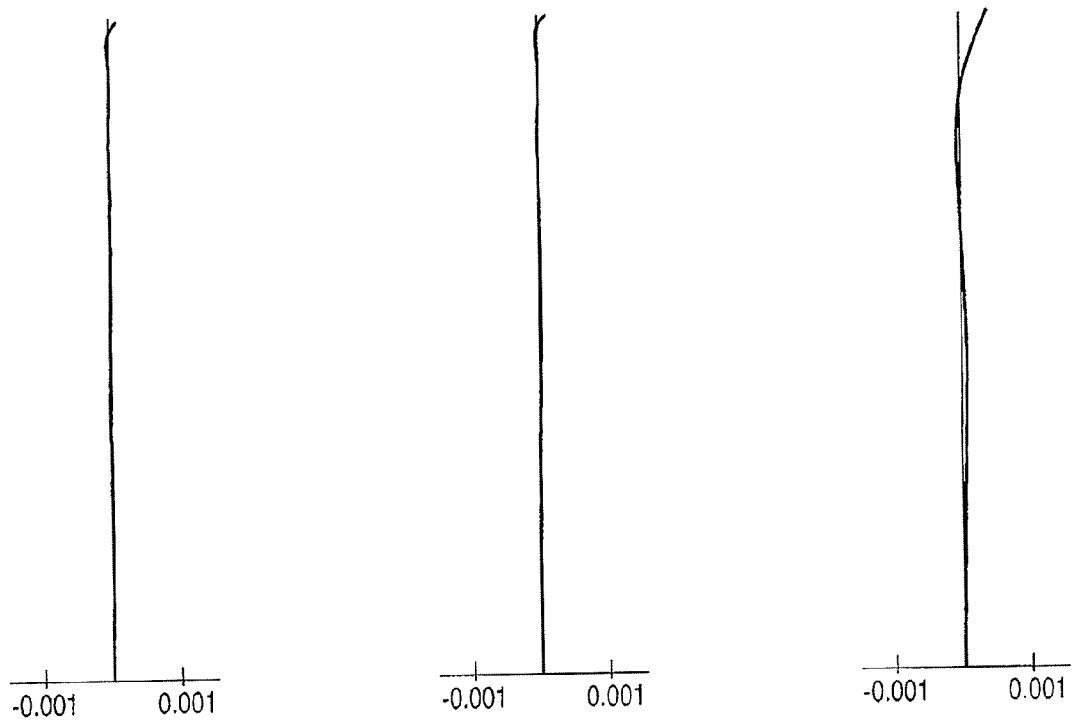
FIG. 11A is a graph illustrating spherical aberration caused when the first laser beam is used in the optical disc drive according to the second example.
FIG. 11B is a graph illustrating the spherical aberration caused when the second laser beam is used in the optical disc drive according to the second example.
FIG. 11C is a graph illustrating the spherical aberration caused when the third laser beam is used in the optical disc drive according to the second example.

FIG. 11A is a graph illustrating the spherical aberration caused when the first laser beam is used in the optical disc drive 100 according to the second example. FIG. 11B is a graph illustrating the spherical aberration caused when the second laser beam is used in the optical disc drive 100 according to the second example. FIG. 11C is a graph illustrating the spherical aberration caused when the third laser beam is used in the optical disc drive 100 according to the second example. As shown in FIGS. 11A to 11C, the spherical aberration is suitably compensated and a suitable beam spot is formed for each of the optical discs D1 to D3.

Third Example

The objective lens 10 according to the third example is provided with the phase shift structure having steps producing a single type of optical path length difference. The phase shift structure is formed on the surface 11 of the objective lens 10. The objective lens 10 is further provided with the second and third regions, each of which functions as an aperture stop for a predetermined wavelength. Specifications of the objective lens 10 according to the third example are shown in Table 23.

TABLE 23

| | First laser beam | Second laser beam | Third laser beam |
|---|---|---|---|
| Design wavelength (nm) | 405 | 660 | 790 |
| Focal length f (mm) | 3.00 | 3.10 | 3.10 |
| NA | 0.65 | 0.60 | 0.47 |
| magnification | 0.000 | 0.000 | −0.028 |

Table 24 shows a numerical configuration of the optical disc drive 100 when the optical disc D1 (the first laser beam) is used, Table 25 shows a numerical configuration of the optical disc drive 100 when the optical disc D2 (the second laser beam) is used, and Table 26 shows a numerical configuration of the optical disc drive 100 when the optical disc D3 (the third laser beam) is used.

TABLE 24

| Surface Number | r | d | n (405 nm) | comments |
|---|---|---|---|---|
| #0 | | 2.81 | | light source |
| #1 | ∞ | 2.00 | 1.52972 | diffraction grating |
| #2 | ∞ | 13.00 | | |
| #3 | 85.710 | 1.50 | 1.52469 | coupling lens |
| #4 | −10.550 | 1.00 | | |
| #5 | ∞ | 4.00 | 1.52972 | beam splitter |
| #6 | ∞ | 1.00 | | |
| #7 | ∞ | 4.00 | 1.52972 | beam splitter |
| #8 | ∞ | 3.08 | | |
| #9 (1st region) | 1.880 | 1.90 | 1.52469 | objective lens |
| #9 (2nd region) | 1.880 | | | |
| #9 (3rd region) | 1.880 | | | |
| #10 | −7.087 | 1.56 | | |
| #11 | ∞ | 0.60 | 1.62231 | optical disc |
| #12 | ∞ | — | | |

TABLE 25

| Surface Number | r | d | n (405 nm) | comments |
|---|---|---|---|---|
| #0 | | 2.79 | | light source |
| #1 | ∞ | 2.00 | 1.51374 | diffraction grating |
| #2 | ∞ | 13.00 | | |
| #3 | 101.820 | 1.50 | 1.54044 | coupling lens |
| #4 | −10.700 | 1.00 | | |
| #5 | ∞ | 4.00 | 1.51374 | beam splitter |
| #6 | ∞ | 1.00 | | |
| #7 | ∞ | 4.00 | 1.51374 | beam splitter |
| #8 | ∞ | 3.00 | | |

TABLE 25-continued

| Surface Number | r | d | n (405 nm) | comments |
|---|---|---|---|---|
| #9 (1st region) | 1.880 | 1.90 | 1.50635 | objective lens |
| #9 (2nd region) | 1.880 | | | |
| #9 (3rd region) | 1.880 | | | |
| #10 | −7.087 | 1.64 | | |
| #11 | ∞ | 0.60 | 1.57961 | optical disc |
| #12 | ∞ | — | | |

TABLE 26

| Surface Number | r | d | n (790 nm) | comments |
|---|---|---|---|---|
| #0 | | 2.88 | | light source |
| #1 | ∞ | 2.00 | 1.51052 | diffraction grating |
| #2 | ∞ | 11.00 | | |
| #3 | −163.400 | 1.20 | 1.53653 | coupling lens |
| #4 | −9.620 | 3.52 | | |
| #5 | ∞ | 4.00 | 1.51052 | beam splitter |
| #6 | ∞ | 3.30 | | |
| #7 (1st region) | 1.880 | 1.90 | 1.50313 | objective lens |
| #7 (2nd region) | 1.880 | | | |
| #7 (3rd region) | 1.880 | | | |
| #8 | −7.087 | 1.34 | | |
| #9 | ∞ | 1.20 | 1.57307 | optical disc |
| #10 | ∞ | — | | |

In Tables 24 to 26, surfaces #0 represent the light source 1A, 1B and 1C, respectively, surfaces #1 and #2 represent the diffraction gratings 2A, 2B and 2C, respectively, and surfaces #3 and #4 represent the coupling lenses 3A, 3B and 3C, respectively. In Tables 24 and 25, surfaces #5 and #6 represent the beam splitter 41, surfaces #7 and #8 represent the splitter 42, surfaces #9 and #10 represent the surfaces 11 and 12 of the objective lens 10, and surfaces #11 and #12 represent the cover layer 21 and the recording surface 22 of the optical discs D1 and D2, respectively. In Table 26, surfaces #5 and #6 represent the beam splitter 42, surfaces #7 and #8 represent the surfaces 11 and 12 of the objective lens 10, and surfaces #9 and #10 represent the cover layer 21 and the recording surface 22 of the optical disc D3.

As can seen from Table 23, f1×NA1 is 1.95 and f2×NA2 is 1.81. Therefore, the optical disc drive according to the third example satisfies the condition (23). In this example, the first region contributing to convergence of each of the first to third laser beams, the second region having the phase shift structure functioning as an aperture stop for the third laser beam, and the third region having the phase shift structure functioning as an aperture stop for the second and third laser beams. The height range of each region is indicated below.

| First region: | $h \leq 1.490$ |
|---|---|
| Second region | $1.490 < h \leq 1.860$ |
| Third region | $1.860 < h \leq 1.950$ |

A second surface of each of the coupling lenses 3A to 3C is an aspherical surface. Each of the surfaces 11 and 12 of the objective lens 10 is an aspherical surface. Table 27 shows the conical coefficient and aspherical coefficients of the aspherical surfaces defined when the optical disc D1 is used. Table 28 shows the conical coefficient and aspherical coefficients of the aspherical surfaces defined when the optical disc D2 is used. Table 29 shows the conical coefficient and aspherical coefficients of the aspherical surfaces defined when the optical disc D3 is used.

TABLE 27

| SURFACE NO. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 (1st region) | −0.6000 | 1.0570E−03 | 4.3530E−04 | −5.5200E−05 | 9.0800E−06 | −1.0240E−05 |
| 9 (2nd region) | −0.6000 | 3.4820E−03 | −7.8440E−04 | 3.8180E−04 | −1.1944E−04 | 2.3640E−06 |
| 9 (3rd region) | −0.6000 | 1.0760E−03 | 4.2770E−03 | −2.0770E−03 | 3.5066E−04 | −3.1472E−05 |
| 10 | 0.0000 | 2.6530E−02 | −7.2250E−03 | 5.0860E−04 | 1.2430E−04 | −2.0750E−05 |

TABLE 28

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 (1st region) | −0.6000 | 1.0570E−03 | 4.3530E−04 | −5.5200E−05 | 9.0800E−06 | −1.0240E−05 |
| 9 (2nd region) | −0.6000 | 3.4820E−03 | −7.8440E−04 | 3.8180E−04 | −1.1944E−04 | 2.3640E−06 |
| 9 (3rd region) | −0.6000 | 1.0760E−03 | 4.2770E−03 | −2.0770E−03 | 3.5066E−04 | −3.1472E−05 |
| 10 | 0.0000 | 2.6530E−02 | −7.2250E−03 | 5.0860E−04 | 1.2430E−04 | −2.0750E−05 |

TABLE 29

| SURFACE NO. | K | A4 | A6 | A8 | A10 | A12 |
|---|---|---|---|---|---|---|
| 4 | 0.0000 | 5.9130E−05 | 5.6000E−07 | 0.0000E+00 | 0.0000E+00 | 0.0000E+00 |
| 7 (1st region) | −0.6000 | 1.0570E−03 | 4.3530E−04 | −5.5200E−05 | 9.0800E−06 | −1.0240E−05 |

TABLE 29-continued

| SURFACE NO. | K | A4 | A6 | A8 | A10 | A12 |
|---|---|---|---|---|---|---|
| 7($2^{nd}$ region) | −0.6000 | 3.4820E−03 | −7.8440E−04 | 3.8180E−04 | −1.1944E−04 | 2.3640E−06 |
| 7($3^{rd}$ region) | −0.6000 | 1.0760E−03 | 4.2770E−03 | −2.0770E−03 | 3.5066E−04 | −3.1472E−05 |
| 8 | 0.0000 | 2.6530E−02 | −7.2250E−03 | 5.0860E−04 | 1.2430E−04 | −2.0750E−05 |

Table 30 shows values of the coefficients ($P_2$ ...) of the optical path difference function applied to the phase shift structure formed on the surface 11 of the objective lens 10. In this example, the second region is defined by two types of optical path difference functions.

TABLE 30

| (surface 11) | $P_2$ | $P_4$ | $P_6$ | $P_8$ | $P_{10}$ | $P_{12}$ |
|---|---|---|---|---|---|---|
| $1^{st}$ region | −2.7000E+00 | −8.7020E−01 | 1.4200E−02 | −8.3000E−03 | 0.0000E+00 | 0.0000E+00 |
| $2^{nd}$ region (j = 1) | −2.7000E+00 | −1.2590E+00 | 2.8200E−01 | −5.6800E−02 | 0.0000E+00 | 0.0000E+00 |
| $2^{nd}$ region (j = 2) | 0.0000E+00 | 7.5640E−01 | −3.2000E−01 | 3.0000E−02 | 0.0000E+00 | 0.0000E+00 |
| $3^{rd}$ region | −8.1000E+00 | 3.0190E+00 | −1.6080E+00 | 0.0000E+00 | 0.0000E+00 | 0.0000E+00 |

Table 31 shows the diffraction order m at which the diffraction efficiency is maximized for each of the first to third laser beams.

TABLE 31

| diffraction order m | first laser beam | second laser beam | third laser beam |
|---|---|---|---|
| $1^{st}$ region | 3 | 2 | 2 |
| $2^{nd}$ region (j = 1) | 3 | 2 | — |
| $2^{nd}$ region (j = 2) | 5 | 3 | — |
| $3^{rd}$ region | 3 | — | — |

As can be seen from Tables 23 and 30, the terms of the conditions (3) and (4) (i.e., (f1×$P_2$)/(t3−t1)) is −13.50. Therefore, the third example satisfies the conditions (3) and (4).

Table 32 shows in detail the configuration of the phase shift structure formed on the surface 11 of the objective lens 10. In Table 32, a height range of each annular zone and an optical path length difference given to the first or third laser beam passing through each annular zone are shown.

TABLE 32

| *1 | region | hmin | hmax | |ΔOPD/λ1| | |ΔOPDc/λ3| |
|---|---|---|---|---|---|
| 0 | 1 | 0.000 | 0.419 | | |
| 1 | | 0.419 | 0.694 | 3.12 | 1.54 |
| 2 | | 0.694 | 0.864 | 3.12 | 1.54 |
| 3 | | 0.864 | 0.993 | 3.12 | 1.54 |
| 4 | | 0.993 | 1.097 | 3.12 | 1.54 |
| 5 | | 1.097 | 1.185 | 3.12 | 1.54 |
| 6 | | 1.185 | 1.262 | 3.12 | 1.54 |
| 7 | | 1.262 | 1.330 | 3.12 | 1.54 |
| 8 | | 1.330 | 1.391 | 3.12 | 1.54 |
| 9 | | 1.391 | 1.447 | 3.12 | 1.54 |
| 10 | | 1.447 | 1.490 | 3.12 | 1.54 |
| | | | | |ΔOPD1/λ1| | |ΔOPD2/λ1| |
| 11 | 2 | 1.490 | 1.539 | 3.00 | |
| 12 | | 1.539 | 1.584 | 3.00 | |
| 13 | | 1.584 | 1.626 | 3.00 | |
| 14 | | 1.626 | 1.665 | 3.00 | |
| 15 | | 1.665 | 1.701 | 3.00 | |
| 16 | | 1.701 | 1.735 | 3.00 | |
| 17 | | 1.735 | 1.766 | 3.00 | |
| 18 | | 1.766 | 1.796 | 3.00 | 5.00 |
| 19 | | 1.796 | 1.824 | 3.00 | |
| 20 | | 1.824 | 1.851 | 3.00 | |
| 21 | | 1.851 | 1.860 | 3.00 | |
| 22 | 3 | 1.860 | 1.866 | 1.00 | |
| 23 | | 1.866 | 1.872 | 1.00 | |
| 24 | | 1.872 | 1.878 | 1.00 | |
| 25 | | 1.878 | 1.883 | 1.00 | |
| 26 | | 1.883 | 1.889 | 1.00 | |
| 27 | | 1.889 | 1.894 | 1.00 | |
| 28 | | 1.894 | 1.900 | 1.00 | |
| 29 | | 1.900 | 1.905 | 1.00 | |
| 30 | | 1.905 | 1.910 | 1.00 | |
| 31 | | 1.910 | 1.915 | 1.00 | |
| 32 | | 1.915 | 1.921 | 1.00 | |
| 33 | | 1.921 | 1.926 | 1.00 | |
| 34 | | 1.926 | 1.931 | 1.00 | |
| 35 | | 1.931 | 1.935 | 1.00 | |
| 36 | | 1.935 | 1.940 | 1.00 | |
| 37 | | 1.940 | 1.945 | 1.00 | |
| 38 | | 1.945 | 1.950 | 1.00 | |

*1: number of annular zone

In table 32, the step No. 18 is a special step which gives a change of an optical path length obtained as a sum of changes of optical path lengths given by a first type step and a second type step.

Since Abbe number νd of the objective lens 10 of the third example is 58, the condition (5) is satisfied. As shown in Table 32, the optical path length difference |ΔOPD/λ1| given by each step (in the first region) between adjacent annular zones to the first laser beam is 3.12. Therefore, conditions (1) and (6) are satisfied. As can be seen from Table 32, the optical path length difference |ΔOPDc/λ3| given to the third laser beam by each step (in the first region) between adjacent annular zones is 1.54. Therefore, the condition (12) is satisfied.

Table 33 shows a numerical configuration of an optical system configured in the optical disc drive 100 to detect a focus error signal when the optical disc D3 is used.

TABLE 33

| surface No. | r | d | n (790 nm) | comments |
|---|---|---|---|---|
| 11 | ∞ | 1.20 | 1.57307 | optical disc |
| 12 | ∞ | 1.34 | | |
| 13 | 7.087 | 1.90 | 1.50313 | objective lens |
| 14 (1st region) | −1.880 | 3.30 | | |
| 14 (2nd region) | −1.880 | | | |
| 14 (3rd region) | −1.880 | | | |
| 15 | ∞ | 4.00 | 1.51052 | beam splitter |
| 16 | ∞ | 3.52 | | |
| 17 | 9.620 | 1.20 | 1.53653 | coupling lens |
| 18 | 163.400 | 9.00 | | |
| 19 | ∞ | 2.20 | 1.51052 | half mirror |
| 20 | ∞ | 5.68 | | |
| 21 | ∞ | — | | photoreceptor |

In Table 33, surfaces #11 and #12 represent the recording surface and the cover layer of the optical disc D3, surfaces #13 and #14 represent the objective lens 10, surfaces #15 and #16 represent the beam splitter 42, surfaces #17 and #18 represent the coupling lens 3C, surfaces #19 and #20 represent the half mirror 5C, and the surface #21 represents the photoreceptor 6C.

Figure 12:
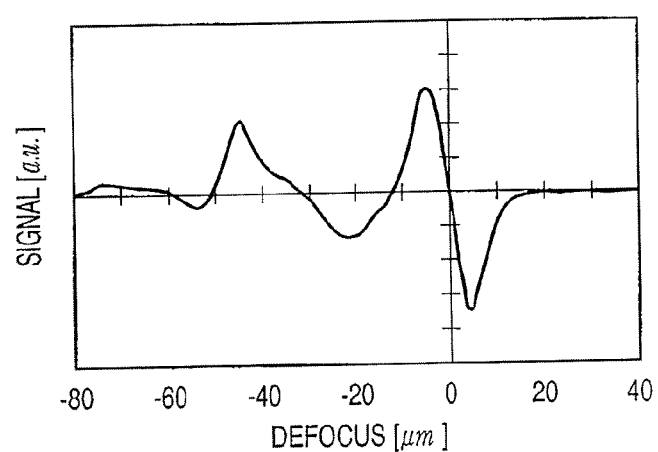
FIG. 12 illustrates a focus error signal detected by a photoreceptor when the third optical disc is used in the optical disc drive according to a third example.

FIG. 12 illustrates a focus error signal detected by the photoreceptor 6C when the optical disc D3 is used in the optical disc drive 100.

As can be seen from the comparison between FIG. 12 and FIG. 8 (i.e., the comparative example), the focus error signal detected by the photoreceptor 6C of the third example has a more suitable waveform formed in the shape of the letter S at the defocus amount of approximately 0 μm than the waveform shown in FIG. 8. By satisfying the conditions (3) and (4), the optical disc drive 100 according to the third example is able to prevent deformation of the focus error signal and thereby suitably suppress the deterioration of the focusing performance.

As can be seen from Table 23, in the optical disc drive 100 according to the third example, f1×M1 is 0.000, f2×M2 is 0.000, and f3×M3 is −0.09. Therefore, the conditions (7), (8) and (9) are satisfied.

FIG. 13A is a graph illustrating the spherical aberration caused when the first laser beam is used in the optical disc drive 100 according to the third example. FIG. 13B is a graph illustrating the spherical aberration caused when the second laser beam is used in the optical disc drive 100 according to the third example. FIG. 13C is a graph illustrating the spherical aberration caused when the third laser beam is used in the optical disc drive 100 according to the third example. As shown in FIGS. 13A to 13C, the spherical aberration is suitably compensated and a suitable beam spot is formed for each of the optical discs D1 to D3.

Fourth Example

The objective lens 10B according to the fourth example has the first region in which the phase shift structure having steps producing two types of optical path length differences is formed. The phase shift structure is formed on the surface 11B of the objective lens 10B. Specifications of the objective lens 10B according to the fourth example are shown in Table 34.

TABLE 34

| | First laser beam | Second laser beam | Third laser beam |
|---|---|---|---|
| Design wavelength (nm) | 405 | 660 | 790 |
| Focal length f (mm) | 3.00 | 3.10 | 3.10 |
| NA | 0.65 | 0.63 | 0.51 |
| magnification | 0.000 | 0.000 | 0.000 |

Table 35 shows a numerical configuration of the optical disc drive 100B when the optical disc D1 (the first laser beam) is used, Table 36 shows a numerical configuration of the optical disc drive 100B when the optical disc D2 (the second laser beam) is used, and Table 37 shows a numerical configuration of the optical disc drive 100B when the optical disc D3 (the third laser beam) is used.

TABLE 35

| Surface Number | r | d | n (405 nm) | comments |
|---|---|---|---|---|
| #0 | | 2.81 | | light source |
| #1 | ∞ | 2.00 | 1.52972 | diffraction grating |
| #2 | ∞ | 13.00 | | |
| #3 | 85.710 | 1.50 | 1.52469 | coupling lens |
| #4 | −10.550 | 1.00 | | |
| #5 | ∞ | 4.00 | 1.52972 | beam splitter |
| #6 | ∞ | 1.00 | | |
| #7 | ∞ | 4.00 | 1.52972 | beam splitter |
| #8 | ∞ | 3.08 | | |
| #9 | 1.888 | 1.90 | 1.52469 | objective lens |
| #10 | −6.869 | 1.57 | | |
| #11 | ∞ | 0.60 | 1.62231 | optical disc |
| #12 | ∞ | — | | |

TABLE 36

| Surface Number | r | d | n (660 nm) | comments |
|---|---|---|---|---|
| #0 | | 2.79 | | light source |
| #1 | ∞ | 2.00 | 1.51374 | diffraction grating |
| #2 | ∞ | 13.00 | | |
| #3 | 101.820 | 1.50 | 1.54044 | coupling lens |
| #4 | −10.700 | 1.00 | | |
| #5 | ∞ | 4.00 | 1.51374 | beam splitter |
| #6 | ∞ | 1.00 | | |
| #7 | ∞ | 4.00 | 1.51374 | beam splitter |
| #8 | ∞ | 3.00 | | |
| #9 | 1.888 | 1.90 | 1.50635 | objective lens |
| #10 | −6.869 | 1.64 | | |
| #11 | ∞ | 0.60 | 1.57961 | optical disc |
| #12 | ∞ | — | | |

TABLE 37

| Surface Number | r | d | n (790 nm) | comments |
|---|---|---|---|---|
| #0 | | 2.79 | | light source |
| #1 | ∞ | 2.00 | 1.51052 | diffraction grating |
| #2 | ∞ | 13.00 | | |
| #3 | 96.346 | 1.50 | 1.53653 | coupling lens |
| #4 | −10.675 | 5.00 | | |
| #5 | ∞ | 4.00 | 1.51052 | beam splitter |
| #6 | ∞ | 3.38 | | |
| #7 | 1.888 | 1.90 | 1.50313 | objective lens |
| #8 | −6.869 | 1.26 | | |
| #9 | ∞ | 1.20 | 1.57307 | optical disc |
| #10 | ∞ | — | | |

In Tables 35 to 37, surfaces #0 represent the light source 1A, 1B and 1C, respectively, surfaces #1 and #2 represent the diffraction gratings 2A, 2B and 2C, respectively, and surfaces #3 and #4 represent the coupling lenses 3A, 3B and 3C, respectively. In Tables 35 and 36, surfaces #5 and #6 represent the beam splitter 41, surfaces #7 and #8 represent the splitter 42, surfaces #9 and #10 represent the surfaces 11B and 12B of the objective lens 10B, and surfaces #11 and #12 represent the cover layer 21 and the recording surface 22 of the optical discs D1 and D2, respectively. In Table 37, surfaces #5 and #6 represent the beam splitter 42, surfaces #7 and #8 represent the surfaces 11B and 12B of the objective lens 10B, and surfaces #9 and #10 represent the cover layer 21 and the recording surface 22 of the optical disc D3.

A second surface of each of the coupling lenses 3A to 3C is an aspherical surface. Each of the surfaces 11B and 12B of the objective lens 10B is an aspherical surface. Table 38 shows the conical coefficient and aspherical coefficients of the aspherical surfaces defined when the optical disc D1 is used. Table 39 shows the conical coefficient and aspherical coefficients of the aspherical surfaces defined when the optical disc D2 is used. Table 40 shows the conical coefficient and aspherical coefficients of the aspherical surfaces defined when the optical disc D3 is used.

TABLE 38

| SURFACE NO. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6000 | −9.8150E−04 | −2.4550E−04 | −5.2510E−05 | −5.4770E−06 | −9.8940E−07 |
| 10 | 0.0000 | 2.1490E−02 | −6.3690E−03 | 1.4380E−03 | −2.0370E−04 | 1.3190E−05 |

TABLE 39

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6000 | −9.8150E−04 | −2.4550E−04 | −5.2510E−05 | −5.4770E−06 | −9.8940E−07 |
| 10 | 0.0000 | 2.1490E−02 | −6.3690E−03 | 1.4380E−03 | −2.0370E−04 | 1.3190E−05 |

TABLE 40

| SURFACE NO. | K | A4 | A6 | A8 | A10 | A12 |
|---|---|---|---|---|---|---|
| 4 | 0.0000 | 7.4420E−05 | 4.8950E−07 | 0.0000E+00 | 0.0000E+00 | 0.0000E+00 |
| 7 | −0.6000 | −9.8150E−04 | −2.4550E−04 | −5.2510E−05 | −5.4770E−06 | −9.8940E−07 |
| 8 | 0.0000 | 2.1490E−02 | −6.3690E−03 | 1.4380E−03 | −2.0370E−04 | 1.3190E−05 |

Table 41 shows values of the coefficients ($P_2i$ ... ) of the optical path difference function applied to the phase shift structure formed on the surface 11B of the objective lens 10B.

TABLE 41

| (surface 11) | $P_2$ | $P_4$ | $P_6$ | $P_8$ | $P_{10}$ | $P_{12}$ |
|---|---|---|---|---|---|---|
| i = 1 | −2.5000E+00 | −1.0530E+00 | −8.6600E−02 | −8.2000E−03 | 0.0000E+00 | 0.0000E+00 |
| i = 2 | 0.0000E+00 | −3.8200E−01 | −7.4100E−02 | 9.2000E−03 | 0.0000E+00 | 0.0000E+00 |

Table 42 shows the diffraction order m at which the diffraction efficiency is maximized for each of the first to third laser beams.

TABLE 42

| diffraction order m | first laser beam | second laser beam | third laser beam |
|---|---|---|---|
| i = 1 | 3 | 2 | 2 |
| i = 2 | 2 | 1 | 1 |

As can be seen from Tables 34 and 41, the terms of the conditions (15) and (16) (i.e., (f1×P$_2$1)/(t3−t1)) are −12.50. Therefore, the fourth example satisfies the conditions (15) and (16).

Table 43 shows in detail the configuration of the phase shift structure formed on the surface 11B of the objective lens 10B. In Table 43, a height range of each annular zone and an optical path length difference given to the first or third laser beam passing through each annular zone are shown.

TABLE 43

| Number of annular zone | hmin | hmax | \|ΔOPD1/λ1\| | \|ΔOPD2/λ1\| | \|ΔOPDc1/λ3\| |
|---|---|---|---|---|---|
| 0 | 0.000 | 0.430 | | | |
| 1 | 0.430 | 0.702 | 3.00 | | 1.47 |
| 2 | 0.702 | 0.865 | 3.00 | | 1.47 |
| 3 | 0.865 | 0.985 | 3.00 | | 1.47 |
| 4 | 0.985 | 1.027 | 3.00 | | 1.47 |
| 5 | 1.027 | 1.080 | | 2.00 | |
| 6 | 1.080 | 1.159 | 3.00 | | 1.47 |
| 7 | 1.159 | 1.228 | 3.00 | | 1.47 |
| 8 | 1.228 | 1.288 | 3.00 | | 1.47 |
| 9 | 1.288 | 1.327 | 3.00 | | 1.47 |
| 10 | 1.327 | 1.341 | | 2.00 | |
| 11 | 1.341 | 1.390 | 3.00 | | 1.47 |
| 12 | 1.390 | 1.434 | 3.00 | | 1.47 |
| 13 | 1.434 | 1.475 | 3.00 | | 1.47 |
| 14 | 1.475 | 1.494 | 3.00 | | 1.47 |
| 15 | 1.494 | 1.513 | | 2.00 | |
| 16 | 1.513 | 1.548 | 3.00 | | 1.47 |
| 17 | 1.548 | 1.581 | 3.00 | | 1.47 |
| 18 | 1.581 | 1.612 | 3.00 | | |
| 19 | 1.612 | 1.641 | 3.00 | 2.00 | |
| 20 | 1.641 | 1.669 | 3.00 | | |
| 21 | 1.669 | 1.695 | 3.00 | | |
| 22 | 1.695 | 1.715 | 3.00 | | |
| 23 | 1.715 | 1.720 | | 2.00 | |
| 24 | 1.720 | 1.744 | 3.00 | | |
| 25 | 1.744 | 1.767 | 3.00 | | |
| 26 | 1.767 | 1.789 | 3.00 | | |
| 27 | 1.789 | 1.799 | 3.00 | | |
| 28 | 1.799 | 1.810 | | 2.00 | |
| 29 | 1.810 | 1.831 | 3.00 | | |
| 30 | 1.831 | 1.850 | 3.00 | | |
| 31 | 1.850 | 1.869 | 3.00 | | |
| 32 | 1.869 | 1.887 | 3.00 | 2.00 | |
| 33 | 1.887 | 1.905 | 3.00 | | |
| 34 | 1.905 | 1.922 | 3.00 | | |
| 35 | 1.922 | 1.939 | 3.00 | | |
| 36 | 1.939 | 1.950 | 3.00 | | |

As shown in Table 43, the optical path length differences |ΔOPD1/λ1| and |ΔOPD2/λ1| given to the first laser beam by each step are 3.00 and 2.00, respectively. That is, in this example, "N" in the condition (13) is set for 1 and "L" in the condition (21) is set for 1. The optical path difference |ΔOPDs1/λ3| given to the third laser beam by each step is 1.47. Therefore, conditions (13), (17), (18), (21) and (22) are satisfied.

Table 44 shows a numerical configuration of an optical system configured in the optical disc drive 100B to detect a focus error signal when the optical disc D3 is used.

TABLE 44

| surface No. | r | d | n (790 nm) | comments |
|---|---|---|---|---|
| 11 | ∞ | 1.20 | 1.57307 | optical disc |
| 12 | ∞ | 1.26 | | |
| 13 | 6.869 | 1.90 | 1.50313 | objective lens |
| 14 | −1.888 | 3.38 | | |
| 15 | ∞ | 4.00 | 1.51052 | beam splitter |
| 16 | ∞ | 5.00 | | |

TABLE 44-continued

| surface No. | r | d | n (790 nm) | comments |
|---|---|---|---|---|
| 17 | 10.675 | 1.50 | 1.53653 | coupling lens |
| 18 | −96.346 | 9.00 | | |
| 19 | ∞ | 2.20 | 1.51052 | half mirror |
| 20 | ∞ | 7.58 | | |
| 21 | ∞ | — | | photoreceptor |

In Table 44, surfaces #11 and #12 represent the recording surface and the cover layer of the optical disc D3, surfaces #13 and #14 represent the objective lens 101B, surfaces #15 and #16 represent the beam splitter 42, surfaces #17 and #18 represent the coupling lens 3C, surfaces #19 and #20 represent the half mirror 5C, and the surface #21 represents the photoreceptor 6C.

FIG. 14 illustrates a focus error signal detected by the photoreceptor 6C when the optical disc D3 is used in the optical disc drive 100B.

As can be seen from the comparison between FIG. 14 and FIG. 8 (i.e., the comparative example), the focus error signal detected by the photoreceptor 6C of the fourth example has a more suitable waveform formed in the shape of the letter S at the defocus amount of approximately 0 μm than the waveform shown in FIG. 8. By satisfying the conditions (15) and (16), the optical disc drive 100B according to the fourth example is able to prevent deformation of the focus error signal and thereby suitably suppress the deterioration of the focusing performance.

As can be seen from Table 34, in the optical disc drive 100B according to the fourth example, all of (f1×M1), (f2×M2) and (f3×M3) are 0.00. Therefore, the aberrations can be prevented from occurring during the tracking operation for each of the optical discs D1 to D3.

Figures 15A, 15B, 15C:
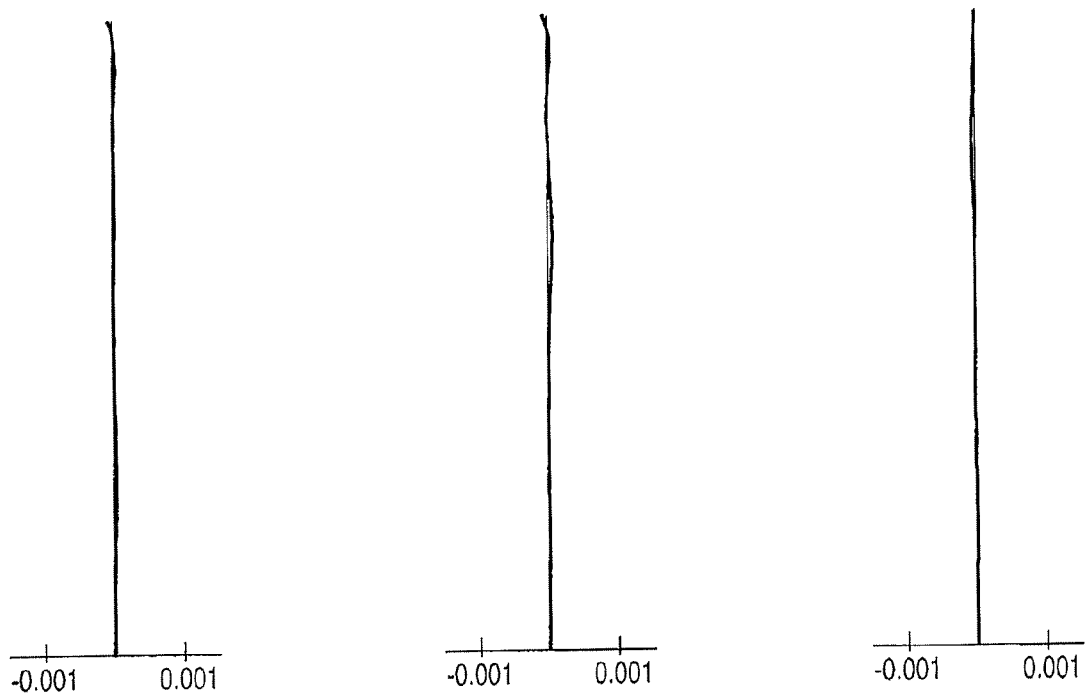
FIG. 15A is a graph illustrating spherical aberration caused when the first laser beam is used in the optical disc drive according to the fourth example.
FIG. 15B is a graph illustrating the spherical aberration caused when the second laser beam is used in the optical disc drive according to the fourth example.
FIG. 15C is a graph illustrating the spherical aberration caused when the third laser beam is used in the optical disc drive according to the fourth example.

FIG. 15A is a graph illustrating the spherical aberration caused when the first laser beam is used in the optical disc drive 100B according to the fourth example. FIG. 15B is a graph illustrating the spherical aberration caused when the second laser beam is used in the optical disc drive 100B according to the fourth example. FIG. 15C is a graph illustrating the spherical abberation caused when the third laser beam is used in the optical disc drive 100B according to the fourth example. As shown in FIGS. 15A to 15C, the spherical aberration is suitably compensated and a suitable beam spot is formed on each of the recording surfaces of the optical discs D1 to D3.

Fifth Example

The objective lens 10B according to the fifth example has the first region in which the phase shift structure having steps producing two types of optical path length differences is formed. The phase shift structure is formed on the surface 11B of the objective lens 10B. Specifications of the objective lens 10B according to the fifth example are shown in Table 45.

TABLE 45

| | First laser beam | Second laser beam | Third laser beam |
|---|---|---|---|
| Design wavelength (nm) | 405 | 660 | 790 |
| Focal length f (mm) | 2.30 | 2.38 | 2.39 |
| NA | 0.65 | 0.63 | 0.47 |
| magnification | 0.000 | 0.000 | 0.000 |

Table 46 shows a numerical configuration of the optical disc drive 100B when the optical disc D1 (the first laser beam) is used, Table 47 shows a numerical configuration of the optical disc drive 100B when the optical disc D2 (the second laser beam) is used, and Table 48 shows a numerical configuration of the optical disc drive 100B when the optical disc D3 (the third laser beam) is used.

TABLE 46

| Surface Number | r | d | n (405 nm) | comments |
|---|---|---|---|---|
| #0 |  | 2.81 |  | light source |
| #1 | ∞ | 2.00 | 1.52972 | diffraction grating |
| #2 | ∞ | 13.00 |  |  |
| #3 | 85.710 | 1.50 | 1.52469 | coupling lens |
| #4 | −10.550 | 1.00 |  |  |
| #5 | ∞ | 3.20 | 1.52972 | beam splitter |
| #6 | ∞ | 1.00 |  |  |
| #7 | ∞ | 3.20 | 1.52972 | beam splitter |
| #8 | ∞ | 3.06 |  |  |
| #9 | 1.450 | 1.50 | 1.52469 | objective lens |
| #10 | −5.008 | 1.10 |  |  |
| #11 | ∞ | 0.60 | 1.62231 | optical disc |
| #12 | ∞ | — |  |  |

TABLE 47

| Surface Number | r | d | n (660 nm) | comments |
|---|---|---|---|---|
| #0 |  | 2.79 |  | light source |
| #1 | ∞ | 2.00 | 1.51374 | diffraction grating |
| #2 | ∞ | 13.00 |  |  |
| #3 | 101.820 | 1.50 | 1.54044 | coupling lens |
| #4 | −10.700 | 1.00 |  |  |
| #5 | ∞ | 3.20 | 1.51374 | beam splitter |
| #6 | ∞ | 1.00 |  |  |
| #7 | ∞ | 3.20 | 1.51374 | beam splitter |
| #8 | ∞ | 3.00 |  |  |
| #9 | 1.450 | 1.50 | 1.50635 | objective lens |
| #10 | −5.008 | 1.16 |  |  |
| #11 | ∞ | 0.60 | 1.57961 | optical disc |
| #12 | ∞ | — |  |  |

TABLE 48

| Surface Number | r | d | n (790 nm) | comments |
|---|---|---|---|---|
| #0 |  | 2.80 |  | light source |
| #1 | ∞ | 2.00 | 1.51052 | diffraction grating |
| #2 | ∞ | 13.00 |  |  |
| #3 | 94.370 | 1.50 | 1.53653 | coupling lens |
| #4 | −10.700 | 5.00 |  |  |
| #5 | ∞ | 3.20 | 1.51052 | beam splitter |
| #6 | ∞ | 3.38 |  |  |
| #7 | 1.450 | 1.50 | 1.50313 | objective lens |
| #8 | −5.008 | 0.78 |  |  |
| #9 | ∞ | 1.20 | 1.57307 | optical disc |
| #10 | ∞ | — |  |  |

In Tables 46 to 48, surfaces #0 represent the light source 1A, 1B and 1C, respectively, surfaces #1 and #2 represent the diffraction gratings 2A, 2B and 2C, respectively, and surfaces #3 and #4 represent the coupling lenses 3A, 3B and 3C, respectively. In Tables 46 and 47, surfaces #5 and #6 represent the beam splitter 41, surfaces #7 and #8 represent the splitter 42, surfaces #9 and #10 represent the surfaces 11B and 12B of the objective lens 10, and surfaces #11 and #12 represent the cover layer 21 and the recording surface 22 of the optical discs D1 and D2, respectively. In Table 48, surfaces #5 and #6 represent the beam splitter 42, surfaces #7 and #8 represent the surfaces 11B and 12B of the objective lens 10B, and surfaces #9 and #10 represent the cover layer 21 and the recording surface 22 of the optical disc D3.

A second surface of each of the coupling lenses 3A to 3C is an aspherical surface. Each of the surfaces 11B and 12B of the objective lens 10B is an aspherical surface. Table 49 shows the conical coefficient and aspherical coefficients of the aspherical surfaces defined when the optical disc D1 is used. Table 50 shows the conical coefficient and aspherical coefficients of the aspherical surfaces defined when the optical disc D2 is used. Table 51 shows the conical coefficient and aspherical coefficients of the aspherical surfaces defined when the optical disc D3 is used.

TABLE 49

| SURFACE NO. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 | −0.6000 | −5.1430E−03 | −1.5640E−03 | −2.6040E−04 | −3.9770E−05 | −2.7750E−05 |
| 10 | 0.0000 | 4.3270E−02 | −1.7160E−02 | 5.1660E−03 | −1.0040E−03 | 9.2050E−05 |

TABLE 50

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 | −0.6000 | −5.1430E−03 | −1.5640E−03 | −2.6040E−04 | −3.9770E−05 | −2.7750E−05 |
| 10 | 0.0000 | 4.3270E−02 | −1.7160E−02 | 5.1660E−03 | −1.0040E−03 | 9.2050E−05 |

TABLE 51

| SURFACE NO. | K | A4 | A6 | A8 | A10 | A12 |
|---|---|---|---|---|---|---|
| 4 | 0.0000 | 7.4370E−05 | 4.9000E−07 | 0.0000E+00 | 0.0000E+00 | 0.0000E+00 |
| 7 | −0.6000 | −5.1430E−03 | −1.5640E−03 | −2.6040E−04 | −3.9770E−05 | −2.7750E−05 |
| 8 | 0.0000 | 4.3270E−02 | −1.7160E−02 | 5.1660E−03 | −1.0040E−03 | 9.2050E−05 |

Table 52 shows values of the coefficients ($P_2i \ldots$) of the optical path difference function applied to the phase shift structure formed on the surface 11B of the objective lens 10B.

TABLE 52

| (surface 11) | $P_2$ | $P_4$ | $P_6$ | $P_8$ | $P_{10}$ | $P_{12}$ |
|---|---|---|---|---|---|---|
| i = 1 | −1.5000E+00 | −2.5770E+00 | −4.8900E−01 | −3.4800E−02 | 0.0000E+00 | 0.0000E+00 |
| i = 2 | 0.0000E+00 | 8.4400E−01 | 2.3080E−01 | 6.6600E−02 | 0.0000E+00 | 0.0000E+00 |

Table 53 shows the diffraction order m at which the diffraction efficiency is maximized for each of the first to third laser beams.

TABLE 53

| diffraction order m | first laser beam | second laser beam | third laser beam |
|---|---|---|---|
| i = 1 | 5 | 3 | 3 |
| i = 2 | 2 | 1 | 1 |

As can be seen from Tables 45 and 52, the terms of the conditions (15) and (16) (i.e., (f1×$P_2$1)/(t3−t1)) are −5.75. Therefore, the fifth example satisfies the conditions (15) and (16).

Table 54 shows in detail the configuration of the phase shift structure formed on the surface 11B of the objective lens 10B. In Table 54, a height range of each annular zone and an optical path length difference given to the first or third laser beam passing through each annular zone are shown.

TABLE 54

| Number of annular zone | hmin | hmax | $|\Delta OPD1/\lambda1|$ | $|\Delta OPD2/\lambda1|$ | $|\Delta OPDc1/\lambda3|$ |
|---|---|---|---|---|---|
| 0 | 0.000 | 0.484 | | | |
| 1 | 0.484 | 0.714 | 5.21 | | 2.56 |
| 2 | 0.714 | 0.838 | 5.21 | | 2.56 |
| 3 | 0.838 | 0.925 | 5.21 | 2.00 | 2.56 |
| 4 | 0.925 | 0.994 | 5.21 | | 2.56 |
| 5 | 0.994 | 1.050 | 5.21 | | 2.56 |
| 6 | 1.050 | 1.060 | 5.21 | | 2.56 |
| 7 | 1.060 | 1.099 | | 2.00 | |
| 8 | 1.099 | 1.141 | 5.21 | | 2.56 |
| 9 | 1.141 | 1.179 | 5.21 | | 2.56 |
| 10 | 1.179 | 1.213 | 5.21 | 2.00 | 2.56 |
| 11 | 1.213 | 1.244 | 5.21 | | 2.56 |
| 12 | 1.244 | 1.262 | 5.21 | | 2.56 |
| 13 | 1.262 | 1.272 | | 2.00 | |
| 14 | 1.272 | 1.299 | 5.21 | | 2.56 |
| 15 | 1.299 | 1.324 | 5.21 | | 2.56 |
| 16 | 1.324 | 1.347 | 5.21 | 2.00 | 2.56 |
| 17 | 1.347 | 1.369 | 5.21 | | 2.56 |
| 18 | 1.369 | 1.379 | 5.21 | | 2.56 |
| 19 | 1.379 | 1.389 | | 2.00 | |
| 20 | 1.389 | 1.409 | 5.21 | | 2.56 |
| 21 | 1.409 | 1.428 | 5.21 | | 2.56 |
| 22 | 1.428 | 1.445 | 5.21 | 2.00 | 2.56 |
| 23 | 1.445 | 1.462 | 5.21 | | 2.56 |
| 24 | 1.462 | 1.479 | 5.21 | 2.00 | 2.56 |
| 25 | 1.479 | 1.494 | 5.21 | | 2.56 |
| 26 | 1.494 | 1.500 | 5.21 | | 2.56 |

As shown in Table 54, the optical path length differences $|\Delta OPD1/\lambda1|$ and $|\Delta OPD2/\lambda1|$ given to the first laser beam by each step are 5.21 and 2.00, respectively. That is, in this example, "N" in the condition (13) is set for 1 and "L" in the condition (21) is set for 1. The optical path difference $|\Delta OPDs1/\lambda3|$ given to the third laser beam by each step is 2.56. Therefore, conditions (13), (17), (18), (21) and (22) are satisfied.

Table 55 shows a numerical configuration of an optical system configured in the optical disc drive 100B to detect a focus error signal when the optical disc D3 is used.

TABLE 55

| surface No. | r | d | n(790 nm) | comments |
|---|---|---|---|---|
| 11 | ∞ | 1.20 | 1.57307 | optical disc |
| 12 | ∞ | 0.78 | | |
| 13 | 5.008 | 1.50 | 1.50313 | objective lens |
| 14 | −1.450 | 3.38 | | |
| 15 | ∞ | 3.20 | 1.51052 | beam splitter |
| 16 | ∞ | 5.00 | | |
| 17 | 10.700 | 1.50 | 1.53653 | coupling lens |
| 18 | −94.370 | 9.00 | | |
| 19 | ∞ | 2.20 | 1.51052 | half mirror |
| 20 | ∞ | 7.59 | | |
| 21 | ∞ | — | | photoreceptor |

In Table 55, surfaces #11 and #12 represent the recording surface and the cover layer of the optical disc D3, surfaces #13 and #14 represent the objective lens 10B, surfaces #15 and #16 represent the beam splitter 42, surfaces #17 and #18 represent the coupling lens 3C, surfaces #19 and #20 represent the half mirror 5C, and the surface #21 represents the photoreceptor 6C.

Figure 16:
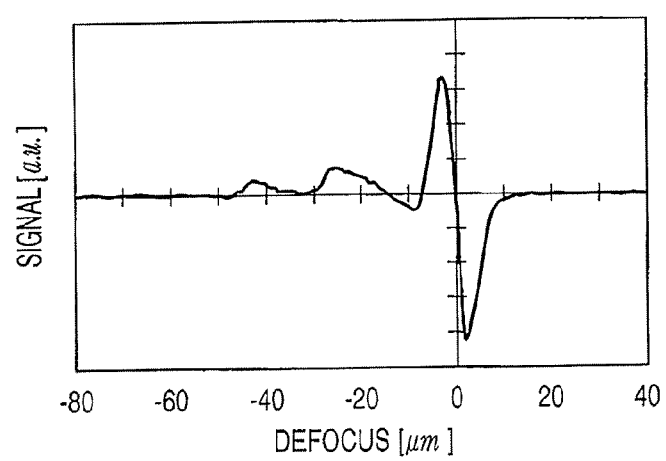
FIG. 16 illustrates a focus error signal detected by a photoreceptor when the third optical disc is used in the optical disc drive according to a fifth example.

FIG. 16 illustrates a focus error signal detected by the photoreceptor 6C when the optical disc D3 is used in the optical disc drive 100B.

As can be seen from FIG. 16, the focus error signal detected by the photoreceptor 6C of the fifth example has a suitable waveform formed in the shape of the letter S. By satisfying the conditions (15) and (16), the optical disc drive 100 according to the fifth example is able to prevent deformation of the focus error signal and thereby suitably suppress the deterioration of the focusing performance.

As can be seen from Table 45, in the optical disc drive 100B according to the fifth example, all of (f1×M1), (f2×M2) and (f3×M3) are 0.00. Therefore, the aberrations can be prevented from occurring during the tracking operation for each of the optical discs D1 to D3.

Figure 17A:
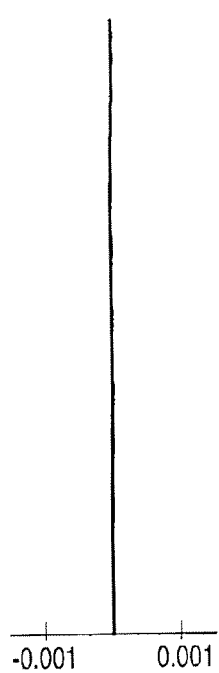
FIG. 17A is a graph illustrating spherical aberration caused when the first laser beam is used in the optical disc drive according to the fifth example.
Figure 17B:
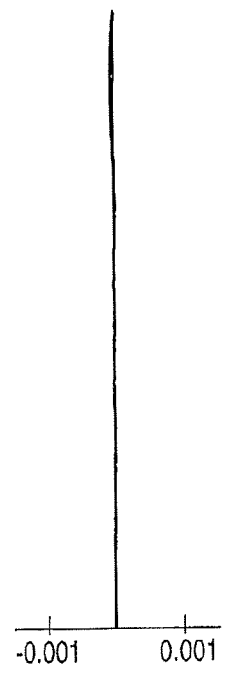
FIG. 17B is a graph illustrating the spherical aberration caused when the second laser beam is used in the optical disc drive according to the fifth example.
Figure 17C:
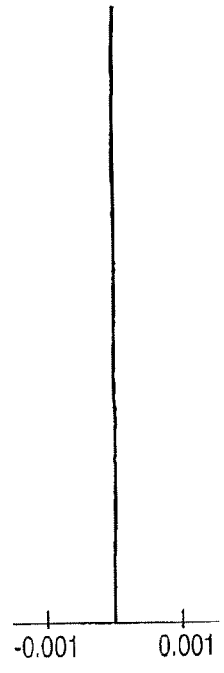
FIG. 17C is a graph illustrating the spherical aberration caused when the third laser beam is used in the optical disc drive according to the fifth example.

FIG. 17A is a graph illustrating the spherical aberration caused when the first laser beam is used in the optical disc drive 100B according to the fifth example. FIG. 17B is a graph illustrating the spherical aberration caused when the second laser beam is used in the optical disc drive 100B according to the fifth example. FIG. 17C is a graph illustrating the spherical aberration caused when the third laser beam is used in the optical disc drive 100B according to the fifth example. As shown in FIGS. 17A to 17C, the spherical aberration is suitably compensated and a suitable beam spot is formed on each of the recording surfaces of the optical discs D1 to D3.

Sixth Example

The objective lens 10B according to the sixth example has the first region in which the phase shift structure having steps producing two types of optical path length differences is formed. In this example, the second and third regions having a function as an aperture stop for predetermined wavelengths are formed outside the first region. The phase shift structure is formed on the surface 11B of the objective lens 10B. Specifications of the objective lens 10B according to the sixth example are shown in Table 56.

TABLE 56

|  | First laser beam | Second laser beam | Third laser beam |
|---|---|---|---|
| Design wavelength (nm) | 405 | 660 | 790 |
| Focal length f (mm) | 3.00 | 3.09 | 3.10 |
| NA | 0.65 | 0.65 | 0.51 |
| magnification | 0.000 | 0.000 | 0.000 |

Table 57 shows a numerical configuration of the optical disc drive 100B when the optical disc D1 (the first laser beam) is used, Table 58 shows a numerical configuration of the optical disc drive 100B when the optical disc D2 (the second laser beam) is used, and Table 59 shows a numerical configuration of the optical disc drive 100B when the optical disc D3 (the third laser beam) is used.

TABLE 57

| Surface Number | r | d | n (405 nm) | comments |
|---|---|---|---|---|
| #0 |  | 2.81 |  | light source |
| #1 | ∞ | 2.00 | 1.52972 | diffraction grating |
| #2 | ∞ | 13.00 |  |  |
| #3 | 85.710 | 1.50 | 1.52469 | coupling lens |
| #4 | −10.550 | 1.00 |  |  |
| #5 | ∞ | 4.10 | 1.52972 | beam splitter |
| #6 | ∞ | 1.00 |  |  |
| #7 | ∞ | 4.10 | 1.52972 | beam splitter |
| #8 | ∞ | 3.07 |  |  |
| #9(1$^{st}$ region) | 1.856 | 1.90 | 1.52469 | objective lens |
| #9(2$^{nd}$ region) | 1.886 |  |  |  |
| #9(3$^{rd}$ region) | 1.916 |  |  |  |
| #10 | −7.313 | 1.56 |  |  |
| #11 | ∞ | 0.60 | 1.62231 | optical disc |
| #12 | ∞ | — |  |  |

TABLE 58

| Surface Number | r | d | n (660 nm) | comments |
|---|---|---|---|---|
| #0 |  | 2.79 |  | light source |
| #1 | ∞ | 2.00 | 1.51374 | diffraction grating |
| #2 | ∞ | 13.00 |  |  |
| #3 | 101.820 | 1.50 | 1.54044 | coupling lens |
| #4 | −10.700 | 1.00 |  |  |
| #5 | ∞ | 4.10 | 1.51374 | beam splitter |
| #6 | ∞ | 1.00 |  |  |
| #7 | ∞ | 4.10 | 1.51374 | beam splitter |
| #8 | ∞ | 3.00 |  |  |
| #9(1$^{st}$ region) | 1.856 | 1.90 | 1.50635 | objective lens |
| #9(2$^{nd}$ region) | 1.886 |  |  |  |
| #9(3$^{rd}$ region) | 1.916 |  |  |  |
| #10 | −7.313 | 1.63 |  |  |

TABLE 58-continued

| Surface Number | r | d | n (660 nm) | comments |
|---|---|---|---|---|
| #11 | ∞ | 0.60 | 1.57961 | optical disc |
| #12 | ∞ | — |  |  |

TABLE 59

| Surface Number | r | d | n (790 nm) | comments |
|---|---|---|---|---|
| #0 |  | 2.79 |  | light source |
| #1 | ∞ | 2.00 | 1.51052 | diffraction grating |
| #2 | ∞ | 13.00 |  |  |
| #3 | 96.346 | 1.50 | 1.53653 | coupling lens |
| #4 | −10.675 | 5.00 |  |  |
| #5 | ∞ | 4.10 | 1.51052 | beam splitter |
| #6 | ∞ | 3.38 |  |  |
| #7(1$^{st}$ region) | 1.856 | 1.90 | 1.50313 | objective lens |
| #7(2$^{nd}$ region) | 1.886 |  |  |  |
| #7(3$^{rd}$ region) | 1.916 |  |  |  |
| #8 | −7.313 | 1.25 |  |  |
| #9 | ∞ | 1.20 | 1.57307 | optical disc |
| #10 | ∞ | — |  |  |

In Tables 57 to 59, surfaces #0 represent the light source 1A, 1B and 1C, respectively, surfaces #1 and #2 represent the diffraction gratings 2A, 2B and 2C, respectively, and surfaces #3 and #4 represent the coupling lenses 3A, 3B and 3C, respectively. In Tables 57 and 58, surfaces #5 and #6 represent the beam splitter 41, surfaces #7 and #8 represent the splitter 42, surfaces #9 and #10 represent the surfaces 11B and 121 of the objective lens 10B, and surfaces #11 and #12 represent the cover layer 21 and the recording surface 22 of the optical discs D1 and D2, respectively. In Table 59, surfaces #5 and #6 represent the beam splitter 42, surfaces #7 and #8 represent the surfaces 11B and 12B of the objective lens 10B, and surfaces #9 and #10 represent the cover layer 21 and the recording surface 22 of the optical disc D3.

As can seen from Table 56, f1×NA1 is 1.95 and f2×NA2 is 2.01. Therefore, the optical disc drive according to the sixth example satisfies the condition (24). In this example, the first region contributing to convergence of each of the first to third laser beams, the second region having the phase shift structure functioning as an aperture stop for the third laser beam, and the third region having the phase shift structure functioning as an aperture stop for the first and third laser beams. The height range of each region is indicated below.

| First region: | $h \leq 1.580$ |
| Second region | $1.580 < h \leq 1.950$ |
| Third region | $1.950 < h \leq 2.010$ |

A second surface of each of the coupling lenses 3A to 3C is an aspherical surface. Each of the surfaces 11B and 12B of the objective lens 10B is an aspherical surface. Table 60 shows the conical coefficient and aspherical coefficients of the aspherical surfaces defined when the optical disc D1 is used. Table 61 shows the conical coefficient and aspherical coefficients of the aspherical surfaces defined when the optical disc D2 is used. Table 62 shows the conical coefficient and aspherical coefficients of the aspherical surfaces defined when the optical disc D3 is used.

TABLE 60

| SURFACE NO. | K | A4 | A6 | A8 | A10 | A12 |
|---|---|---|---|---|---|---|
| 4 | 0.0000 | 7.8520E−05 | 5.3350E−07 | 0.0000E+00 | 0.0000E+00 | 0.0000E+00 |
| 9 ($1^{st}$ region) | −0.6000 | −7.2450E−04 | −4.2100E−05 | −8.5540E−05 | 4.3110E−06 | −8.1806E−06 |
| 9 ($2^{nd}$ region) | −0.6000 | 6.0530E−04 | 7.8500E−05 | 1.4030E−04 | −4.8840E−05 | −4.0300E−06 |
| 9 ($3^{rd}$ region) | −0.6000 | 8.7170E−03 | −5.0880E−03 | 1.5437E−03 | −1.8853E−04 | −5.0000E−09 |
| 10 | 0.0000 | 2.1900E−02 | −5.5600E−03 | 4.9880E−04 | 3.5810E−05 | −8.3530E−06 |

TABLE 61

| SURFACE NO. | K | A4 | A6 | A8 | A10 | A12 |
|---|---|---|---|---|---|---|
| 4 | 0.0000 | 7.3130E−05 | 4.8300E−07 | 0.0000E+00 | 0.0000E+00 | 0.0000E+00 |
| 9 ($1^{st}$ region) | −0.6000 | −7.2450E−04 | −4.2100E−05 | −8.5540E−05 | 4.3110E−06 | −8.1806E−06 |
| 9 ($2^{nd}$ region) | −0.6000 | 6.0530E−04 | 7.8500E−05 | 1.4030E−04 | −4.8840E−05 | −4.0300E−06 |
| 9 ($3^{rd}$ region) | −0.6000 | 8.7170E−03 | −5.0880E−03 | 1.5437E−03 | −1.8853E−04 | −5.0000E−09 |
| 10 | 0.0000 | 2.1900E−02 | −5.5600E−03 | 4.9880E−04 | 3.5810E−05 | −8.3530E−06 |

TABLE 62

| SURFACE NO. | K | A4 | A6 | A8 | A10 | A12 |
|---|---|---|---|---|---|---|
| 4 | 0.0000 | 7.4420E−05 | 4.8950E−07 | 0.0000E+00 | 0.0000E+00 | 0.0000E+00 |
| 7 ($1^{st}$ region) | −0.6000 | −7.2450E−04 | −4.2100E−05 | −8.5540E−05 | 4.3110E−06 | −8.1806E−06 |
| 7 ($2^{nd}$ region) | −0.6000 | 6.0530E−04 | 7.8500E−05 | 1.4030E−04 | −4.8840E−05 | −4.0300E−06 |
| 7 ($3^{rd}$ region) | −0.6000 | 8.7170E−03 | −5.0880E−03 | 1.5437E−03 | −1.8853E−04 | −5.0000E−09 |
| 8 | 0.0000 | 2.1900E−02 | −5.5600E−03 | 4.9880E−04 | 3.5810E−05 | −8.3530E−06 |

Table 63 shows values of the coefficients ($P_2 i$ ... ) of the optical path difference function applied to the phase shift structure formed on the surface 11B of the objective lens 10B. In this example, the first region is defined by two types of optical path difference functions.

TABLE 63

| (surface 11) | $P_2$ | $P_4$ | $P_6$ | $P_8$ | $P_{10}$ | $P_{12}$ |
|---|---|---|---|---|---|---|
| $1^{st}$ region (i = 1) | −2.7000E+00 | −1.0650E+00 | −7.2580E−02 | 1.3460E−02 | 0.0000E+00 | 0.0000E+00 |
| $1^{st}$ region (i = 2) | 1.2400E+00 | −3.8950E−01 | −5.0000E−02 | −4.0500E−03 | 0.0000E+00 | 0.0000E+00 |
| $2^{nd}$ region | −3.7239E+00 | −9.5450E−01 | 1.2440E−01 | −3.8690E−02 | 0.0000E+00 | 0.0000E+00 |
| $3^{rd}$ region | −1.0632E+01 | −1.3610E−01 | −2.4570E−01 | 0.0000E+00 | 0.0000E+00 | 0.0000E+00 |

Table 64 shows the diffraction order m at which the diffraction efficiency is maximized for each of the first to third laser beams.

TABLE 64

| diffraction order m | first laser beam | second laser beam | third laser beam |
|---|---|---|---|
| $1^{st}$ region (i = 1) | 3 | 2 | 2 |
| $1^{st}$ region (i = 2) | 2 | 1 | 1 |
| $2^{nd}$ region | 3 | 2 | — |
| $3^{rd}$ region | 3 | — | — |

As can be seen from Tables 56 and 63, the terms of the conditions (15) and (16) (i.e., (f1×$P_2$1)/(t3−t1)) are −13.50. Therefore, the sixth example satisfies the conditions (15) and (16).

Table 65 shows in detail the configuration of the phase shift structure formed on the surface 11B of the objective lens 10B. In Table 65, a height range of each annular zone and an optical path length difference given to the first or third laser beam passing through each annular zone are shown. In Table 65, |ΔOPDd1/λ2| represents an optical path length difference given to the second laser beam by a second step type.

TABLE 65

| *1 | region | hmin | hmax | \|ΔOPD1/λ1\| | \|ΔOPD2/λ1\| | \|ΔOPDd1/λ2\| | \|ΔOPDc1/λ3\| |
|---|---|---|---|---|---|---|---|
| 0 | 1 | 0.000 | 0.416 | | | | |
| 1 | | 0.416 | 0.683 | 3.00 | | 1.78 | 1.47 |
| 2 | | 0.683 | 0.693 | 3.00 | | 1.78 | 1.47 |
| 3 | | 0.693 | 0.845 | | 2.00 | | |
| 4 | | 0.845 | 0.964 | 3.00 | | 1.78 | 1.47 |
| 5 | | 0.964 | 1.060 | 3.00 | | 1.78 | 1.47 |
| 6 | | 1.060 | 1.140 | 3.00 | | 1.78 | 1.47 |
| 7 | | 1.140 | 1.208 | 3.00 | | 1.78 | 1.47 |
| 8 | | 1.208 | 1.269 | 3.00 | | 1.78 | 1.47 |
| 9 | | 1.269 | 1.323 | 3.00 | | 1.78 | 1.47 |
| 10 | | 1.323 | 1.372 | 3.00 | | 1.78 | 1.47 |
| 11 | | 1.372 | 1.399 | 3.00 | | 1.78 | 1.47 |
| 12 | | 1.399 | 1.416 | | 2.00 | | |
| 13 | | 1.416 | 1.457 | 3.00 | | 1.78 | 1.47 |
| 14 | | 1.457 | 1.495 | 3.00 | | 1.78 | 1.47 |
| 15 | | 1.495 | 1.530 | 3.00 | | 1.78 | 1.47 |
| 16 | | 1.530 | 1.563 | 3.00 | | 1.78 | 1.47 |
| 17 | | 1.563 | 1.580 | 3.00 | | 1.78 | 1.47 |
| 18 | 2 | 1.580 | 1.605 | 3.12 | | 1.85 | |
| 19 | | 1.605 | 1.639 | 3.12 | | 1.85 | |
| 20 | | 1.639 | 1.672 | 3.12 | | 1.85 | |
| 21 | | 1.672 | 1.702 | 3.12 | | 1.85 | |
| 22 | | 1.702 | 1.731 | 3.12 | | 1.85 | |
| 23 | | 1.731 | 1.758 | 3.12 | | 1.85 | |
| 24 | | 1.758 | 1.785 | 3.12 | | 1.85 | |
| 25 | | 1.785 | 1.809 | 3.12 | | 1.85 | |
| 26 | | 1.809 | 1.833 | 3.12 | | 1.85 | |
| 27 | | 1.833 | 1.856 | 3.12 | | 1.85 | |
| 28 | | 1.856 | 1.877 | 3.12 | | 1.85 | |
| 29 | | 1.877 | 1.898 | 3.12 | | 1.85 | |
| 30 | | 1.898 | 1.918 | 3.12 | | 1.85 | |
| 31 | | 1.918 | 1.937 | 3.12 | | 1.85 | |
| 32 | | 1.937 | 1.950 | 3.12 | | 1.85 | |
| 33 | 3 | 1.950 | 1.954 | | | | 1.00 |
| 34 | | 1.954 | 1.959 | | | | 1.00 |
| 35 | | 1.959 | 1.964 | | | | 1.00 |
| 36 | | 1.964 | 1.968 | | | | 1.00 |
| 37 | | 1.968 | 1.972 | | | | 1.00 |
| 38 | | 1.972 | 1.977 | | | | 1.00 |
| 39 | | 1.977 | 1.981 | | | | 1.00 |
| 40 | | 1.981 | 1.985 | | | | 1.00 |
| 41 | | 1.985 | 1.990 | | | | 1.00 |
| 42 | | 1.990 | 1.994 | | | | 1.00 |
| 43 | | 1.994 | 1.998 | | | | 1.00 |
| 44 | | 1.998 | 2.002 | | | | 1.00 |
| 45 | | 2.002 | 2.006 | | | | 1.00 |
| 46 | | 2.006 | 2.010 | | | | 1.00 |

*1: number of annular zone

Since Abbe number vd of the objective lens 10B of the third example is 58. Further, as shown in Table 65, the optical path length differences $|\Delta OPD1/\lambda|$ and $|\Delta OPD2/\lambda 1|$ given to the first laser beam by each step are 3.00 and 2.00, respectively. That is, in this example, "N" in the condition (13) is set for 1 and "L" in the condition (21) is set for 1. The optical path length difference $|\Delta OPDc1/\lambda 3|$ given to the third laser beam by a first type step is 1.47. Therefore, conditions (13), (17), (18), (21) and (22) are satisfied.

The optical path length difference $|\Delta OPDd1/\lambda 2|$ is different between the second region and the third region. The optical path length difference $|\Delta OPDd1/\lambda 2|$ in the third region is 1.00. That is, the third region has a phase shift structure defined by an optical path difference function different from an optical path difference function defining the second region. It is understood that the phase shift structure in the third region contributes only to convergence of the second laser beam.

Table 66 shows a numerical configuration of an optical system configured in the optical disc drive 100B to detect a focus error signal when the optical disc D3 is used.

TABLE 66

| surface No. | r | d | n(790 nm) | comments |
|---|---|---|---|---|
| 11 | ∞ | 1.20 | 1.57307 | optical disc |
| 12 | ∞ | 1.25 | | |
| 13 | 7.313 | 1.90 | 1.50313 | objective lens |
| 14(1st region) | −1.856 | 3.38 | | |
| 14(2nd region) | −1.856 | | | |
| 14(3rd region) | −1.856 | | | |
| 15 | ∞ | 4.10 | 1.51052 | beam splitter |
| 16 | ∞ | 5.00 | | |
| 17 | 10.675 | 1.50 | 1.53653 | coupling lens |
| 18 | −96.346 | 9.00 | | |
| 19 | ∞ | 2.20 | 1.51052 | half mirror |
| 20 | ∞ | 7.58 | | |
| 21 | ∞ | — | | photoreceptor |

In Table 66, surfaces #11 and #12 represent the recording surface and the cover layer of the optical disc D3, surfaces #13 and #14 represent the objective lens 10B, surfaces #15 and #15 represent the beam splitter 42, surfaces #17 and #18 represent the coupling lens 3C, surfaces #19 and #20 represent the half mirror 5C, and the surface #21 represents the photoreceptor 6C.

Figure 18:
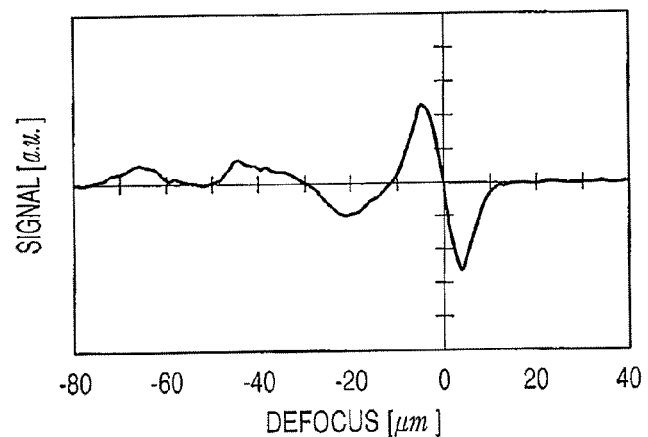
FIG. 18 illustrates a focus error signal detected by a photoreceptor when the third optical disc is used in the optical disc drive according to a sixth example.

FIG. 18 illustrates a focus error signal detected by the photoreceptor 6C when the optical disc D3 is used in the optical disc drive 100B.

As can be seen from FIG. 18, the focus error signal detected by the photoreceptor 6C of the sixth example has a suitable waveform formed in the shape of the letter S. By satisfying the conditions (14) and (15), the optical disc drive 100B according to the sixth example is able to prevent deformation of the focus error signal and thereby suitably suppress the deterioration of the focusing performance.

As can be seen from Table 56, in the optical disc drive 100B according to the sixth example, all of (f1×M1), (f2×M2) and (f3×M3) are 0.00. Therefore, the aberrations can be prevented from occurring during the tracking operation for each of the optical discs D1 to D3.

Figure 19A:
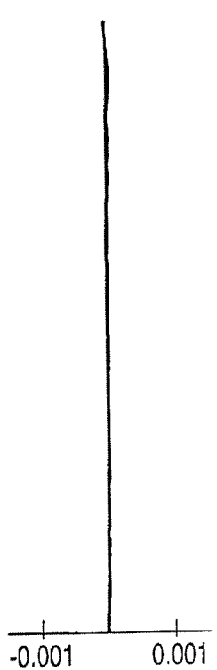
FIG. 19A is a graph illustrating spherical aberration caused when the first laser beam is used in the optical disc drive according to the sixth example.
Figure 19B:
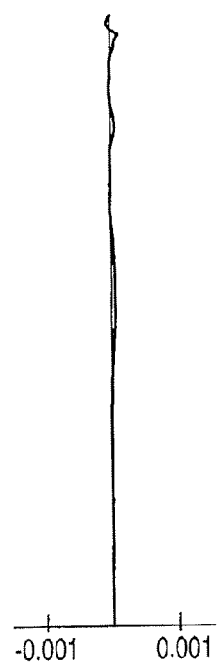
FIG. 19B is a graph illustrating the spherical aberration caused when the second laser beam is used in the optical disc drive according to the sixth example.
Figure 19C:
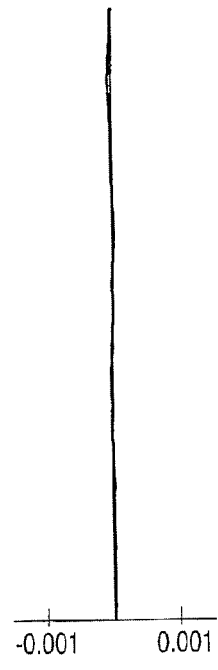
FIG. 19C is a graph illustrating the spherical aberration caused when the third laser beam is used in the optical disc drive according to the sixth example.

FIG. 19A is a graph illustrating the spherical aberration caused when the first laser beam is used in the optical disc drive 100B according to the sixth example. FIG. 19B is a graph illustrating the spherical aberration caused when the second laser beam is used in the optical disc drive 100B according to the sixth example. FIG. 19C is a graph illustrating the spherical aberration caused when the third laser beam is used in the optical disc drive 100B according to the sixth example. As shown in FIGS. 19A to 19C, the spherical aberration is suitably compensated and a suitable beam spot is formed on each of the recording surfaces of the optical discs D1 to D3.

Although the present invention has been described in considerable detail with reference to certain preferred embodiments thereof, other embodiments are possible.

The configuration of the objective lens according to the invention is not limited to the numeral configurations described in the above mentioned examples. For example, the optical disc drive may employ an objective lens system including more than one optical element. If the objective lens system is formed of more than one optical element, an optical element in the objective lens system may be provided with phase shift structures on both surfaces thereof.

The optical disc drive may be configured such that the first to third laser beams emitted by the light sources 1A, 1B and 1C are directed to the recording surface of the optical disc via a common coupling lens. In this case, if the light source 1A emitting the first laser beam and the light source 1B emitting the second laser beam are mounted on the same print circuit board (i.e., the light sources 1A and 1B are placed at the same distance form the common coupling lens), it is required that at least one of the first and second laser beams is incident on the objective lens as a converging or diverging beam because an focal length of a coupling lens (3A, 3B and 3C) varies depending on change of an refractive index due to wavelength differences. However, even if such a configuration is employed, the advantages achieved by the above mentioned examples can also be attained by reducing the magnification to a sufficiently low level (i.e., locating the objective lens to satisfy the conditions (7) and (8)).

This application claims priority of Japanese Patent Application No. P2005-282361, filed on Sep. 28, 2005. The entire subject matter of the application is incorporated herein by reference.

What is claimed is:

1. An optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams, the optical disc drive comprising an objective lens, at least one of surfaces of the objective lens comprising a step structure which has a plurality of concentric refractive surface zones and gives an optical path length difference to an incident beam at each step formed between adjacent refractive surface zones, wherein when the third laser beam passes through the objective lens, the objective lens produces normal diffraction order light converging to a recording surface of the third optical disc and undesired diffraction order light converging to a point deviating from the recording surface of the third optical disc, wherein a distance from a point to which the normal diffraction order light converges to a point to which the undesired diffraction order light converges is larger than or equal to twice a pull-in range of a focus error signal obtained when a recording operation or a reproducing operation for the third optical disc is performed.

2. The optical disc drive according to claim 1, wherein:

the step structure has a step giving an optical path length difference substantially equal to an odd multiple of a wavelength of the first light beam, to the first light beam;

the step structure has a region converging the third light beam onto the recording surface of the third optical disc; and a paraxial power component is set in the region such that the point to which the undesired diffraction order light converges deviates from the recording surface of the third optical disc.

3. The optical disc drive according to claim 2, wherein when a wavelength of the first light beam is represented by $\lambda 1$ (nm), an optical path length difference given by each step to the first light beam is represented by $\Delta OPD$ (nm), the step structure satisfies a condition:

$$2N+0.70 < \Delta OPD/\lambda 1 < 2N+1.30$$

where N represents an integer, wherein when an optical path difference function defining the step structure is expressed by an equation:

$$\phi(h)=(P_2h^2+P_4h^4+P_6h^6+P_8h^8+P_{10}h^{10}+P_{12}h^{12})m\lambda$$

where $P_2$, $P_4$ and $P_6$ ... are coefficients of second, fourth, sixth ... orders, h represents a height from an optical axis, m represents a diffraction order at which diffraction efficiency is maximized, and $\lambda$ represents a working wavelength of a light beam being used, the objective lens satisfies a condition:

$$-20.00 < (f1 \times P_2)/(t3-t1) < 0.00$$

where f1 represents a focal length of the objective lens defined when the first light beam is used, and t1 and t3 (where t1<t3) respectively represent thicknesses of cover layers of the first and third optical discs.

4. The optical disc drive according to claim 3, wherein the objective lens satisfies a condition:

$$-15.00 < (f1 \times P_2)/(t3-t1) < -2.50.$$

5. An optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams, the optical disc drive comprising an objective lens, when wavelengths of the first to third light beams are respectively represented by $\lambda 1$ (nm), $\lambda 2$ (nm) and $\lambda 3$ (nm), a relationship $\lambda 1 < \lambda 2 < \lambda 3$ being satisfied, when a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 being satisfied, when a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm being satisfied, each of the first and second light beams being incident on the objective lens as a substantially collimated beam, and the third light beam being incident on the objective lens as a diverging beam, at least one of surfaces of the objective lens comprising a first region converging the third light beam on a recoding surface of the third optical disc, the first region comprising a step structure which has a plurality of concentric refractive surface zones and gives an optical path length difference to an incident beam at each step formed between adjacent refractive surface zones, wherein, in the first region, at least a boundary part of the step structure satisfies a condition:

$$2N+0.70 < |\Delta OPD/\lambda 1| < 2N+1.30$$

where N represents an integer, and $\Delta OPD$ (nm) represents an optical path length difference given by the at least a boundary part of the first region to the first light beam, wherein when an optical path difference function $\phi(h)$ defining the step structure is expressed by an equation:

$$\phi(h)=(P_2h^2+P_4h^4+P_6h^6+P_8h^8+P_{10}h^{10}+P_{12}h^{12})m\lambda$$

where $P_2$, $P_4$ and $P_6$ ... are coefficients of second, fourth, sixth ... orders, h represents a height from an optical axis, m represents a diffraction order at which diffraction efficiency is maximized, and λ represents a working wavelength of a light beam being used, the objective lens satisfies a condition:

$$-20.00<(f1\times P_2)/(t3-t1)<0.00$$

where f1 represents a focal length of the objective lens defined when the first light beam is used.

6. The optical disc drive according to claim 5, wherein the objective lens further satisfies a condition:

$$-15.00<(f1\times P_2)/(t3-t1)<-2.50.$$

7. The optical disc drive according to claim 5,
wherein the objective lens is a single element lens having Abbe number satisfying a condition:

$$40\leq vd \leq 80,$$

wherein the step structure in the first region satisfies a condition:

$$2.70<|\Delta OPD/\lambda 1|<3.30,$$

wherein when a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02<f1\times M1<0.02,$$

$$-0.02<f2\times M2<0.02, \text{ and}$$

$$-0.12<f3\times M3<-0.04.$$

8. The optical disc drive according to claim 5,
wherein the objective lens is a single element lens having Abbe number satisfying a condition:

$$20vd<40,$$

wherein the step structure in the first region satisfies a condition:

$$2.70<|\Delta OPD/\lambda 1|<3.30,$$

wherein when a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$$-0.02<f1\times M1<0.02,$$

$$-0.02<f2\times M2<0.02, \text{ and}$$

$$-0.38<f3\times M3<-0.30.$$

9. The optical disc drive according to claim 7, wherein the objective lens satisfies a condition:

$$1.32<|\Delta OPDc/\lambda 3|<1.62$$

where ΔOPDc (nm) represents an optical path length difference given by each step in the step structure to the third laser beam.

10. The optical disc drive according to claim 5, wherein:
the objective lens includes a second region which is formed outside the first region and is configured to converge the first and second light beams on the recording surfaces of the first and second optical discs, respectively, and not to contribute to converging the third light beam;
the second region gives at least an optical path length difference to an incident beam at each step formed between adjacent refractive surface zones; and
an absolute value of an optical path length difference given by each step in the second region is different from an absolute value of an optical path length difference given by each step in the first region.

11. The optical disc drive according to claim 10, wherein:
the optical disc drive satisfies a condition:

$$f1\times NA1 > f2\times NA2;$$

the objective lens includes a third region which is formed outside the second region and is configured to converge only the first light beam on the recording surface of the first optical disc and not to contribute to converging the second and third light beams;
the third region gives at least an optical path length difference to an incident beam at each step formed between adjacent refractive surface zones;
an absolute value of an optical path length difference given by each step in the third region is different from an absolute value of an optical path length difference given by each step in the second region.

12. The optical disc drive according to claim 10, wherein:
the optical disc drive satisfies a condition:

$$f1\times NA1 < f2\times NA2;$$

the objective lens includes a third region which is formed outside the second region and is configured to converge only the second light beam on the recording surface of the second optical disc and not to contribute to converging the first and third light beams;
the third region gives at least an optical path length difference to an incident beam at each step formed between adjacent refractive surface zones;
an absolute value of an optical path length difference given by each step in the third region is different from an absolute value of an optical path length difference given by each step in the second region.

13. An optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams,
the optical disc drive comprising an objective lens,
each of the first to third light beams being incident on the objective lens as a substantially collimated beam,
when the wavelengths of the first to third light beams are respectively represented by λ1 (nm), λ2 (nm) and λ3 (nm), a relationship λ1<λ2<λ3 being satisfied,
when a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 being satisfied, when a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, $t1 \cong 0.6$ mm, $t2 \cong 0.6$ mm, and $t3 \cong 1.2$ mm being satisfied, at least one of surfaces of the objective lens comprising a first region converging the third light beam on a recoding surface of the third optical disc, the first region comprising a step structure which has a plurality of concentric refractive surface zones and has at least two types of steps formed between adjacent ones of the plurality of concentric refractive surface zones, the at least two types of steps giving different optical path length differences to an incident beam, wherein, in the first region, at least one step type of the two types of steps satisfies a condition:

$$2N+0.70 < |\Delta OPD1/\lambda 1| < 2N+1.30$$

where $\Delta OPD1$ (nm) represents an optical path length difference given by the at least one step to the first light beam, and N is an integer, wherein when the step structure is defined by at least two types of optical path difference functions expressed by:

$$\phi i(h) = (P_2 i h^2 + P_4 i h^4 + P_6 i h^6 + P_8 i h^8 + P_{10} i h^{10} + P_{12} i h^{12}) m \lambda \quad (14)$$

where $\phi i(h)$ represents an i-th optical path difference function (i: an integer), $P_2 i$, $P_4 i$ and $P_6 i$ ... are coefficients of second, fourth, sixth ... orders of the i-th optical path difference function, h represents a height from an optical axis of the objective lens, m represents a diffraction order at which diffraction efficiency of the incident beam is maximized, and $\lambda$ represents a working wavelength of the incident beam, a condition:

$$-20.00 < (f1 \times P_2 1)/(t3-t1) < 0.00$$

is satisfied for a first optical path difference function, where f1 represents a focal length of the objective lens for the wavelength of the first light beam.

14. The optical disc drive according to claim 13, wherein with regard to the first optical path difference function, the objective lens satisfies a condition:

$$-15.00 < (f1 \times P_2 1)/(t3-t1) < -2.50.$$

15. The optical disc drive according to claim 13, wherein the step structure in the first region satisfies a condition:

$$2.70 < |\Delta OPD1/\lambda 1| < 3.30.$$

16. The optical disc drive according to claim 15, wherein the objective lens satisfies a condition:

$$1.32 < |\Delta OPDc1/\lambda 3| < 1.62$$

where $\Delta OPDc1$ (nm) represents an optical path length difference given by each step in the step structure to the third laser beam.

17. The optical disc drive according to claim 13, wherein the step structure in the first region satisfies a condition:

$$4.70 < |\Delta OPD1/\lambda 1| < 5.30.$$

18. The optical disc drive according to claim 17, wherein the objective lens satisfies a condition:

$$2.30 < |\Delta OPDc1/\lambda 3| < 2.60.$$

where $OPDc1$ (nm) represents an optical path length difference given by the step structure in the first region to the third light beam.

19. The optical disc drive according to claim 13, wherein when an optical path length difference given by another step of the at least two types of steps different from the at least one step to the first light beam is represented by $\Delta OPD2$ (nm), the objective lens satisfies a condition:

$$2L-0.20 < |\Delta OPD2/\lambda 1| < 2L+0.20 \quad (21)$$

where L is an integer.

20. The optical disc drive according to claim 19, wherein the objective lens satisfies a condition:

$$1.80 < |\Delta OPD2/\lambda 1| < 2.20.$$

21. The optical disc drive according to claim 13, wherein:

the objective lens includes a second region which is formed outside the first region and is configured to converge the first and second light beams on the recording surfaces of the first and second optical discs, respectively, and not to contribute to converging the third light beam;

the second region gives at least an optical path length difference to an incident beam at each step formed between adjacent refractive surface zones; and an absolute value of an optical path length difference given by each step in the second region to the first light beam is different from $|\Delta OPD2/\lambda 1|$ where $\Delta OPD2$ (nm) is an optical path length difference given by another step of the at least two types of steps different from the at least one step to the first light beam.

22. The optical disc drive according to claim 21, wherein: the optical disc drive satisfies a condition:

$$f1 \times NA1 > f2 \times NA2;$$

the objective lens includes a third region which is formed outside the second region and is configured to converge only the first light beam on the recording surface of the first optical disc and not to contribute to converging the second and third light beams;

the third region gives at least an optical path length difference to an incident beam at each step formed between adjacent refractive surface zones;

an absolute value of an optical path length difference given by each step in the third region is different from an absolute value of an optical path length difference given by each step in the second region.

23. The optical disc drive according to claim 21, wherein: the optical disc drive satisfies a condition:

$$f1 \times NA1 < f2 \times NA2;$$

the objective lens includes a third region which is formed outside the second region and is configured to converge only the second light beam on the recording surface of the second optical disc and not to contribute to converging the first and third light beams;

the third region gives at least an optical path length difference to an incident beam at each step formed between adjacent refractive surface zones;

an absolute value of an optical path length difference given by each step in the third region is different from an absolute value of an optical path length difference given by each step in the second region.

24. An objective lens used for an optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams, when wavelengths of the first to third light beams are respectively represented by λ1 (nm), λ2 (nm) and λ3 (nm), a relationship λ1<λ2<λ3 being satisfied, when a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 being satisfied, when a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm being satisfied, each of the first and second light beams being incident on the objective lens as a substantially collimated beam, and the third light beam being incident on the objective lens as a diverging beam, at least one of surfaces of the objective lens comprising a first region converging the third light beam on a recoding surface of the third optical disc, the first region comprising a step structure which has a plurality of concentric refractive surface zones and gives an optical path length difference to an incident beam at each step formed between adjacent refractive surface zones, wherein, in the first region, at least a boundary part of the step structure satisfies a condition:

$2N+0.70<|\Delta OPD/\lambda 1|<2N+1.30$ where N represents an integer, and ΔOPD (nm) represents an optical path length difference given by the at least a boundary part of the first region to the first light beam, wherein when an optical path difference function φ(h) defining the step structure is expressed by an equation:

$\phi(h)=(P_2 h^2+P_4 h^4+P_6 h^6+P_8 h^8+P_{10} h^{10}+P_{12} h^{12})m\lambda$ where $P_2$, $P_4$ and $P_6$ ... are coefficients of second, fourth, sixth ... orders, h represents a height from an optical axis, m represents a diffraction order at which diffraction efficiency is maximized, and λ represents a working wavelength of a light beam being used, the objective lens satisfies a condition:

$-20.00<(f1\times P_2)/(t3-t1)<0.00$ where f1 represents a focal length of the objective lens defined when the first light beam is used.

25. The objective lens according to claim 24, wherein the objective lens further satisfies a condition:

$-15.00<(f1\times P_2)/(t3-t1)<-2.50$.

26. The objective lens according to claim 24, wherein the objective lens is a single element lens having Abbe number satisfying a condition:

$40\leq vd\leq 80$, wherein the step structure in the first region satisfies a condition:

$2.70<|\Delta OPD/\lambda 1|<3.30$, wherein when a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$-0.02<f1\times M1<0.02$, $-0.02<f2\times M2<0.02$, and $-0.12<f3\times M3<-0.04$.

27. The objective lens according to claim 24,
wherein the objective lens is a single element lens having Abbe number satisfying a condition:

$20\leq vd<40$, wherein the step structure in the first region satisfies a condition:

$2.70<|\Delta OPD/\lambda 1|<3.30$, wherein when a focal length and magnification of the objective lens when the first optical disc is used are respectively represented by f1 and M1, a focal length and magnification of the objective lens when the second optical disc is used are respectively represented by f2 and M2, and a focal length and magnification of the objective lens when the third optical disc is used are respectively represented by f3 and M3, the optical disc drive satisfies following conditions:

$-0.02<f1\times M1<0.02$ (7), $-0.02<f2\times M2<0.02$, and $-0.38<f3\times M3<-0.30$.

28. The objective lens according to claim 26, wherein the objective lens satisfies a condition:

$1.32<|\Delta OPDc/\lambda 3|<1.62$ where ΔOPDc (nm) represents an optical path length difference given by each step in the step structure to the third laser beam.

29. The objective lens according to claim 24, wherein:
the objective lens includes a second region which is formed outside the first region and is configured to converge the first and second light beams on the recording surfaces of the first and second optical discs, respectively, and not to contribute to converging the third light beam;

the second region gives at least an optical path length difference to an incident beam at each step formed between adjacent refractive surface zones; and an absolute value of an optical path length difference given by each step in the second region is different from an absolute value of an optical path length difference given by each step in the first region.

30. The objective lens according to claim 29, wherein:
the optical disc drive satisfies a condition:

$f1\times NA1>f2\times NA2$;

the objective lens includes a third region which is formed outside the second region and is configured to converge only the first light beam on the recording surface of the first optical disc and not to contribute to converging the second and third light beams;

the third region gives at least an optical path length difference to an incident beam at each step formed between adjacent refractive surface zones;

an absolute value of an optical path length difference given by each step in the third region is different from an absolute value of an optical path length difference given by each step in the second region.

31. The objective lens according to claim 29, wherein:

the optical disc drive satisfies a condition:

$$f1 \times NA1 < f2 \times NA2 \quad (24);$$

the objective lens includes a third region which is formed outside the second region and is configured to converge only the second light beam on the recording surface of the second optical disc and not to contribute to converging the first and third light beams;

the third region gives at least an optical path length difference to an incident beam at each step formed between adjacent refractive surface zones;

an absolute value of an optical path length difference given by each step in the third region is different from an absolute value of an optical path length difference given by each step in the second region.

32. An objective lens used for an optical disc drive for recording information to and/or reproducing information from three types of optical discs including a first optical disc having a highest recording density, a second optical disc having a second highest recording density and a third optical disc having a lowest recording density by selectively using one of three types of light beams including first, second and third light beams, each of the first to third light beams being incident on the objective lens as a substantially collimated beam, when the wavelengths of the first to third light beams are respectively represented by λ1 (nm), λ2 (nm) and λ3 (nm), a relationship λ1<λ2<λ3 being satisfied, when a numerical aperture necessary for recording information to or reproducing information from the first optical discs is represented by NA1, a numerical aperture necessary for recording information to or reproducing information from the second optical discs is represented by NA2, and a numerical aperture necessary for recording information to or reproducing information from the third optical discs is represented by NA3, a relationship NA1>NA3 and NA2>NA3 being satisfied, when a thickness of a cover layer of the first optical disc requiring use of the first light beam is represented by t1, a thickness of a cover layer of the second optical disc requiring use of the second light beam is represented by t2, and a thickness of a cover layer of the third optical disc requiring use of the third light beam is represented by t3, t1≅0.6 mm, t2≅0.6 mm, and t3≅1.2 mm being satisfied, at least one of surfaces of the objective lens comprising a first region converging the third light beam on a recoding surface of the third optical disc, the first region comprising a step structure which has a plurality of concentric refractive surface zones and has at least two types of steps formed between adjacent ones of the plurality of concentric refractive surface zones, the at least two types of steps giving different optical path length differences to an incident beam, wherein, in the first region, at least one step type of the two types of steps satisfies a condition:

$$2N+0.70<|\Delta OPD1/\lambda 1|<2N+1.30 \quad (13)$$

where ΔOPD1 (nm) represents an optical path length difference given by the at least one step to the first light beam, and N is an integer, wherein when the step structure is defined by at least two types of optical path difference functions expressed by:

$$\phi i(h)=(P_2 ih^2+P_4 ih^4+P_6 ih^6+P_8 ih^8+P_{10}ih^{10}+P_{12}ih^{12})m\lambda$$

where φi(h) represents an i-th optical path difference function (i: an integer), $P_2i$, $P_4i$ and $P_6i$ . . . are coefficients of second, fourth, sixth . . . orders of the i-th optical path difference function, h represents a height from an optical axis of the objective lens, m represents a diffraction order at which diffraction efficiency of the incident beam is maximized, and λ represents a working wavelength of the incident beam, a condition:

$$-20.00<(f1 \times P_2 1)/(t3-t1)<0.00$$

is satisfied for a first optical path difference function, where f1 represents a focal length of the objective lens for the wavelength of the first light beam.

33. The objective lens according to claim 32, wherein with regard to the first optical path difference function, the objective lens satisfies a condition:

$$-15.00<(f1 \times P_2 1)/(t3-t1)<-2.50.$$

34. The objective lens according to claim 32, wherein the step structure in the first region satisfies a condition:

$$2.70<|\Delta OPD1/\lambda 1|<3.30.$$

35. The objective lens according to claim 34, wherein the objective lens satisfies a condition:

$$1.32<|\Delta OPDc1/\lambda 3|<1.62$$

where ΔOPDc1 (nm) represents an optical path length difference given by each step in the step structure to the third laser beam.

36. The objective lens according to claim 32, wherein the step structure in the first region satisfies a condition:

$$4.70<|\Delta OPD1/\lambda 1|<5.30.$$

37. The objective lens according to claim 36, wherein the objective lens satisfies a condition:

$$2.30<|\Delta OPDc1/\lambda 3|<2.60$$

where OPDc1 (nm) represents an optical path length difference given by the step structure in the first region to the third light beam.

38. The objective lens according to claim 32, wherein when an optical path length difference given by another step of the at least two types of steps different from the at least one step to the first light beam is represented by ΔOPD2 (nm), the objective lens satisfies a condition:

$$2L-0.20<|\Delta OPD2/\lambda 1|<2L+0.20$$

where L is an integer.

39. The objective lens according to claim 38, wherein the objective lens satisfies a condition:

$$1.80<|\Delta OPD2/\lambda 1|<2.20 \quad (22).$$

40. The objective lens according to claim 32, wherein:

the objective lens includes a second region which is formed outside the first region and is configured to converge the first and second light beams on the recording surfaces of the first and second optical discs, respectively, and not to contribute to converging the third light beam;

the second region gives at least an optical path length difference to an incident beam at each step formed between adjacent refractive surface zones; and an absolute value of an optical path length difference given by each step in the second region to the first light beam is different from $|\Delta OPD2/\lambda 1|$ where $\Delta OPD2$ (nm) is an optical path length difference given by another step of the at least two types of steps different from the at least one step to the first light beam.

41. The objective lens according to claim 40, wherein:
the objective lens satisfies a condition:

$f1 \times NA1 > f2 \times NA2$;

the objective lens includes a third region which is formed outside the second region and is configured to converge only the first light beam on the recording surface of the first optical disc and not to contribute to converging the second and third light beams;

the third region gives at least an optical path length difference to an incident beam at each step formed between adjacent refractive surface zones; and an absolute value of an optical path length difference given by each step in the third region is different from an absolute value of an optical path length difference given by each step in the second region.

42. The objective lens according to claim 40, wherein:
the objective lens satisfies a condition:

$f1 \times NA1 < f2 \times NA2$;

the objective lens includes a third region which is formed outside the second region and is configured to converge only the second light beam on the recording surface of the second optical disc and not to contribute to converging the first and third light beams;

the third region gives at least an optical path length difference to an incident beam at each step formed between adjacent refractive surface zones; and an absolute value of an optical path length difference given by each step in the third region is different from an absolute value of an optical path length difference given by each step in the second region.

* * * * *